United States Patent
Rizzolatti et al.

(10) Patent No.: US 11,705,810 B2
(45) Date of Patent: Jul. 18, 2023

(54) MULTIPLE-STAGE POWER CONVERSION VIA REGULATED AND UNREGULATED CONVERSION

(71) Applicant: Infineon Technologies Austria AG, Villach (AT)

(72) Inventors: Roberto Rizzolatti, Villach (AT); Christian Rainer, Magdalensberg (AT)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 17/745,211

(22) Filed: May 16, 2022

(65) Prior Publication Data
US 2022/0271657 A1    Aug. 25, 2022

Related U.S. Application Data

(63) Continuation of application No. 16/818,354, filed on Mar. 13, 2020, now Pat. No. 11,362,585.

(51) Int. Cl.
H02M 3/07        (2006.01)
H02M 3/00        (2006.01)
(Continued)

(52) U.S. Cl.
CPC ............ *H02M 3/07* (2013.01); *H02M 1/007* (2021.05); *H02M 1/083* (2013.01); *H02M 3/01* (2021.05);
(Continued)

(58) Field of Classification Search
CPC ........... H02M 3/07–078; H02M 1/007; H02M 3/155–1588
See application file for complete search history.

(56) References Cited

U.S. PATENT DOCUMENTS

| 10,211,733 B1 | 2/2019 | Jiang et al. |
| 2017/0244318 A1* | 8/2017 | Giuliano ................. H02M 1/42 |
| 2020/0083805 A1 | 3/2020 | Mauri |

OTHER PUBLICATIONS

S. Saggini, S. Jiang, M. Ursino and C. Nan, "A 99% Efficient Dual-Phase Resonant Switched-Capacitor-Buck Converter for 48 V Data Center Bus Conversions," 2019 IEEE Applied Power Electronics Conference and Exposition (APEC), 2019, pp. 482-487, doi: 10.1109/APEC.2019.8721860. (Year: 2019).*

(Continued)

*Primary Examiner* — Peter M Novak
(74) *Attorney, Agent, or Firm* — Armis IP Law, LLC

(57) ABSTRACT

An apparatus includes a first power converter and a second power converter. The first power converter converts an input voltage into a first output voltage; the second power converter converts the first output voltage into a second output voltage that powers a load. The second power converter includes a switched-capacitor converter combined with a magnetic device. The switched-capacitor converter provides capacitive energy transfer; the magnetic device provides magnetic energy transfer. Additionally, the second power converter provides unregulated conversion of the first output voltage into the second output voltage via the capacitive energy transfer and the magnetic energy transfer. To maintain the magnitude of the second output voltage within a desired range or setpoint value, the first power converter regulates a magnitude of the first output voltage based on comparison of a magnitude of the second output voltage with respect to a desired setpoint reference voltage.

17 Claims, 29 Drawing Sheets

(51) Int. Cl.
    *H02M 1/08*         (2006.01)
    *H02M 1/00*         (2006.01)

(52) U.S. Cl.
    CPC ........ *H02M 1/0058* (2021.05); *H02M 1/0095* (2021.05)

(56) References Cited

OTHER PUBLICATIONS

"Primary Side MOSFET Selection for LLC Topology", Jun. 27, 2014, pp. 1-16, XP055444146, retrieved from the Internet: URL: https://www.infineon.com/dgdl/Infineon-ApplicationNote_MOSFET_CoolMOS_Primary_Side_MOSFET_Selection_for_LLC-AN-v01_00-EN.pdf?fileId=5546d46147a9c2e40147d3430e927e5d [retrieved on Jan. 24, 2018].

Bastian, Lang, et al., "Solving the Power Density Challenge", Mar. 10, 2020, pp. 32-33, XP055822532, URL: http://www.infineon.com/Dgdl/Infineon-MOSFET_OptiMOS_source_down_Bodos_power-Article-v01_00-EN.pdf.

Office action, EP 21 159 639.0, dated Oct. 10, 2022, pp. 1-7.

Xuan, Zhang, et al., "A GaN transistor based 90WAC/DC adapter with a buck-PFC stage and isolated Quasi-switched capacitor DC/DC stage", 2014 IEEE Applied Power Electronics Conference and Exposition—APEC 2014, IEEE, Mar. 16, 2014, pp. 109-116, XP032590789.

\* cited by examiner

MULTIPLE-STAGE POWER CONVERSION VIA REGULATED AND UNREGULATED CONVERSION

RELATED APPLICATION

This application is a continuation application of earlier filed U.S. patent application Ser. No. 16/818,354 entitled "MULTIPLE-STAGE POWER CONVERSION," filed on Mar. 13, 2020, the entire teachings of which are incorporated herein by this reference.

BACKGROUND

Data centers such as operated by Google™, Facebook™, and others provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Higher voltage distribution and efficient conversion systems are necessary to reduce losses and increase the overall power density of the conversion system. In the last few years 48V DC at the rack level has been introduced by vendors enabling several different scenarios to provide high power to digital load, such as CPU/ASIC/GPU. These architectures are coordinated, e.g., by the Open compute consortium, currently OCP 3.0 is the most modern architecture supporting 48V DC distribution within the rack.

Modern microprocessors and ASICs require a low input voltage, typically 1 VDC or even lower (roadmap down to 0.4V) with high currents that can reach 1000 Amperes or more. In such applications, there are several attributes which are driving the desirable solutions:

i) High power density: small footprint and low height allows one to place the converter close to the load (i.e. ASIC or microprocessor), reducing the PDN (Power Delivery Network) parasitic losses, and enabling power to the load, e.g., from the bottom of the ASIC in an active substrate or interposer or from the side/bottom while being located on the CPU board itself.

ii) Fast Transient Response and low Output Voltage ripple: ASIC and Microprocessors require extremely fast current transient which can reach 1000 A/µs and the system needs to keep the output voltage within a tight regulation. Specifically voltage undershoots may lead to CPU failures. Moreover, low voltage ripple is required (typically less than 20 mV), therefore paralleling of phases is required.

iii) High efficiency: firstly, efficiency is a key argument for the OPEX of data centers, secondly efficiency is a prerequirement when moving the power stage close to the load to prevent additional heating iv) Low EMI noise: due to the desired proximity of the power stage to the load (such as load being located within an active substrate or below the CPU in an interposer), EMI disturbance needs to be avoided. This requires typically zero voltage switching and absence of air gaps in the magnetic structure to avoid any coupling between high frequency data lines and the power delivery paths.

Conventional processors integrate an internal voltage regulator module (VRM), called fully integrated voltage regulator module (FIVR), to mitigate the requirement for the external VRM stage. FIVR modules require a considerable design and technology effort. Hence power conversion implemented as close as possible to the load such as an ASIC/CPU/GPU creates value for all companies having no access to the FIVR technology.

A traditional buck solution is a good candidate in such an application, because of its inherent potential to shrink the size of the inductor by increasing the switching frequency and reducing the input voltage of the buck converter, for a given power and transient requirement. However, the buck converter, implemented in multi-phase approach, requires an inductor and transistor rated with the full input voltage. In this scenario, due to high power density requirement, low inductor losses are difficult to achieve. Furthermore core losses are load dependent, because of the dependency of the DC magnetic flux on the load. In order to mitigate the high DC and AC magnetic flux density, a bigger inductance is needed, therefore the VRM module generally is placed on the side of the CPU or ASIC where the effect of the power delivery network (PDN) is a limiting factor in power capability and transient performance. This is paramount to consider, since nowadays such ASICs require extremely fast current transition at high current and low voltage.

BRIEF DESCRIPTION

This disclosure includes the observation that power conversion efficiency of conventional power supplies including switched-capacitor converters can be improved. For example, to this end, embodiments herein include novel ways of providing improved performance of power conversion via a switched-capacitor converter and efficient generation of a corresponding output voltage.

More specifically, embodiments herein include an apparatus including a first power converter and a second power converter. The first power converter converts an input voltage into a first output voltage; the second power converter converts the first output voltage into a second output voltage that powers a load. Via further example embodiments, the second power converter includes a switched-capacitor converter combined with a magnetic device (i.e. magnetic hardware). The switched-capacitor converter provides capacitive energy transfer; the magnetic device provides magnetic energy transfer. Additionally, the second power converter provides unregulated conversion of the first output voltage into the second output voltage via the capacitive energy transfer and the magnetic energy transfer. To maintain the magnitude of the second output voltage within a desired range or setpoint value, the first power converter regulates a magnitude of the first output voltage based on comparison of a magnitude of the second output voltage with respect to a desired setpoint reference voltage.

In accordance with further example embodiments, the switched-capacitor converter receives the first output voltage; the magnetic device outputs the second output voltage.

Further embodiments herein include implementing the switched-capacitor converter stage to include multiple switched capacitor cells. The magnetic device is electrically coupled to switching elements associated with the multiple switched capacitor cells. A combination of the magnetic device and the multiple switched capacitor cells form at least one resonant circuit path.

In still further example embodiments, the switched-capacitor converter includes multiple capacitors; the magnetic device includes one or more input windings coupled to the switched-capacitor converter. Via a controller, the multiple capacitors are controllably switched in a circuit path including an input winding of the magnetic device to convert the first output voltage into the second output voltage. As previously discussed, the magnetic device includes one or more output windings that outputs the second output voltage.

In further example embodiments, the second power converter is a non-isolated power converter.

In accordance with yet further example embodiments, the second power converter provides conveyance of respective energy from the received first output voltage to the second output voltage in each switching control cycle of operating the second power converter. More specifically, in one embodiment, the switched-capacitor converter and the magnetic device transfer energy in time intervals of equal duration. Still further, the load is powered in each powering cycle by the capacitive energy transfer (such as during a first portion of a respective switching control cycle) and the magnetic energy transfer (such as during a second portion of a respective switching control cycle), reducing overall conduction losses in passive and active components of the second power converter.

The second power converter can be configured to include any number of switched-capacitor converters. For example, in one embodiment, the second power converter includes at least a first switched-capacitor converter and second switched-capacitor converter connected in parallel. Each of the first switched-capacitor converter and the second switched-capacitor converter convert the first output voltage into the second output voltage.

Yet further embodiments herein include a monitor resource. The monitor resource monitors body diode conduction conditions of switches in both the first switched-capacitor converter and the second switched-capacitor converter. The monitor resource further dynamically adjusts dead-time settings of the first switched-capacitor converter and the second switched-capacitor converter based on detected body diode conduction conditions. In one embodiment, adjustment of the dead times of controlling each different power converter results in substantial equalizing of an impedance of the first switched-capacitor converter to the second switched-capacitor converter. For example, as previously discussed, each of multiple power converters of a respective power supply can be configured to operate in parallel and which operate at the same switching frequency. Certain embodiments herein include individually modulating the dead-time of each different power converter (or stage) without changing the common switching frequency applied to each of power converters to provide a lowest impedance setting for a respective power converter.

In accordance with further example embodiments, switches in the switched-capacitor converter are operated in a zero voltage switching mode via inductive energy provided by the magnetic device.

In still further example embodiments, a size of a magnetic core associated with the magnetic device does not depend on current ratings but instead on the second output voltage.

Further embodiments herein implementing the switched-capacitor converter to include one or more resonant circuit paths. Operation of the one or more resonant circuit path near its resonant frequency reduces a reactive impedance of the switched-capacitor converter in which the switched-capacitor converter becomes completely or nearly resistive only.

Still further embodiments herein include, via a respective controller, operating the first power converter to regulate conversion of the input voltage into the first output voltage based at least in part on an amount of current supplied by the second output voltage to the load.

Note that embodiments herein are useful over conventional techniques. For example, in contrast to conventional techniques, the novel power supply as described herein provides high efficiency of converting an input voltage to a respective output voltage via unique regulation and transfer of capacitive energy and magnetic energy.

These and other more specific embodiments are disclosed in more detail below.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate generation of an output voltage to power a load. The instructions, when executed by computer processor hardware, cause the computer processor hardware (such as one or more co-located or disparately located processor devices or hardware) to: via control of a first power converter, convert an input voltage into a first output voltage; via control of a second power converter, convert the first output voltage into a second output voltage that powers a load, the second power converter including a switched-capacitor converter providing capacitive energy transfer and a magnetic device providing magnetic energy transfer, the second power converter providing unregulated conversion of the first output voltage into the second output voltage via the capacitive energy transfer and the magnetic energy transfer; and via control of the first power converter, regulate a magnitude of the first output voltage based on comparison of a magnitude of the second output voltage with respect to a desired setpoint reference voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

Note further that although embodiments as discussed herein are applicable to controlling operation of a power supply including one or more regulated power converter stages and one or more switched-capacitor converters, the concepts disclosed herein may be advantageously applied to any other suitable voltage converter topologies.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
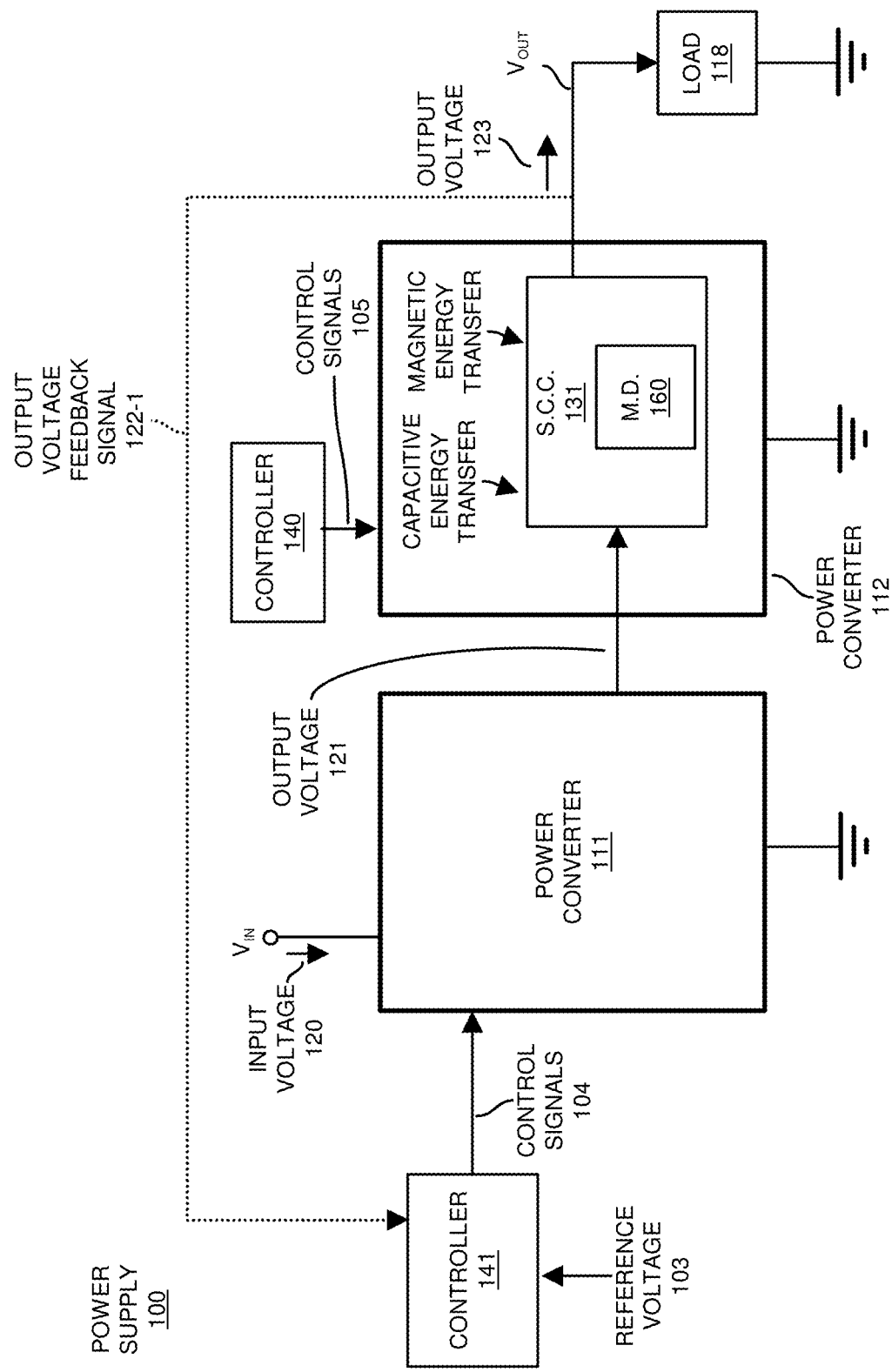
FIG. 1 is an example diagram illustrating a power supply including a multi-stage power converter including a first power converter and a second power converter according to embodiments herein.

The foregoing and other objects, features, and advantages of embodiments herein will be apparent from the following more particular description herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, as further discussed herein, an apparatus (such as power supply, circuitry, device, hardware, etc.) includes a first power converter and a second power converter. The first power converter converts an input voltage into a first output voltage; the second power converter converts the first output voltage into a second output voltage that powers a load. The second power converter includes a switched-capacitor converter combined with magnetic hardware. The switched-capacitor converter provides capacitive energy transfer; the magnetic hardware provides magnetic energy transfer. Additionally, the second power converter provides unregulated conversion of the first output voltage into the second output voltage via the capacitive energy transfer and the magnetic energy transfer.

In one embodiment, as its name suggests, implementation of an unregulated second power converter and corresponding unregulated switched-capacitor converter means that the switched-capacitor converter converts the input voltage into the output voltage without implementation of a feedback path from the output voltage, e.g. to a controller, used to modify switching operations (such as switching frequency, duty cycle, etc.) of the switched-capacitor converter to maintain the output voltage at a precise desired setpoint value. In other words, the switched-capacitor converter converts the input voltage into the output voltage without correcting a magnitude of the output voltage based on an output voltage error captured by feedback from the output voltage (in the switched-capacitor converter), e.g., as would be found in a typical regulated voltage converter application. The magnitude of the output voltage depends on the selection of components (switches, capacitor values, inductor values, transformer windings, etc.) and corresponding operation of the switched-capacitor converter at a desired setting (such as switching frequency, duty cycle, etc.).

However, in furtherance of maintaining the magnitude of the second output voltage within a desired range or at a setpoint value, the first power converter regulates a magnitude of the first output voltage based on comparison of a magnitude of the second output voltage with respect to a desired setpoint reference voltage.

Now, more specifically, FIG. 1 is an example diagram illustrating a power supply including a first power converter and a second power converter according to embodiments herein.

As shown in this example embodiment, power supply 100 (such as an apparatus, electronic device, electronic circuitry, etc.) includes a controller 140, controller 141, and multiple voltage converters such as power converter 111 (a.k.a., voltage converter) and power converter 112 (a.k.a., voltage converter).

Note that each of the resources as described herein can be instantiated in any suitable manner. For example, each of the controller 140, controller 141, switched-capacitor converter 131, magnetic device 160 (i.e., magnetic hardware), etc., can be instantiated as or include hardware (such as circuitry), software (executable instructions), or a combination of hardware and software resources where applicable.

Controller 141 is configured to control power converter 111. Power converter 111 is coupled to power converter 112. Controller 140 is configured to control power converter 112.

As a specific example of operating the power supply 100, via generation of control signals 104 based on a comparison of the output voltage feedback signal 122-1 to the reference voltage 103, the first power converter 111 (such as a regulated voltage converter) converts the input voltage 120 (such as an AC and/or DC voltage) into a first output voltage 121. The second power converter 112 (such as an unregulated voltage converter) receives the output voltage 121 and converts the first output voltage 121 into (second) output voltage 123 (Vout) that powers a load 118.

In one embodiment, the output voltage 123 is a ratio of the output voltage 121.

In one nonlimiting example embodiment, as further shown in FIG. 1, the second power converter 112 includes a switched-capacitor converter 131 combined with magnetic device 160. In such an implementation including the magnetic device 160 integrated with the switched-capacitor converter 131, via switching provided by controller 140, the switched-capacitor converter 131 provides capacitive energy transfer of energy associated with the received output voltage 121; the magnetic device 160 provides magnetic energy transfer of energy to the output voltage 123.

In non-limiting example embodiment, the second power converter 112 is a non-isolated power converter.

In accordance with further example embodiments, as previously discussed, note that the second power converter 112 can be configured to provide unregulated conversion of the first output voltage 121 into the second output voltage 123 via the corresponding capacitive energy transfer and the magnetic energy transfer. To maintain the magnitude of the second output voltage 123 within a desired range or setpoint value (as dictated by the reference voltage 103, which may be dynamically selected to achieve a different magnitude output voltage 123), the controller 141 controls switching associated with the first power converter 111. The control provided by the control signals 104 regulates a magnitude of the first output voltage 121 based on comparison of a magnitude of the second output voltage 123 with respect to the desired setpoint reference voltage 123. Additional details are discussed in FIG. 2.

Referring again to FIG. 1, the switched-capacitor converter 131 of the power converter 112 converts the first output voltage 121; the magnetic device 160 outputs the second output voltage 123.

If desired, the controller 141 can be configured to monitor and control the first power converter 112 via any suitable one or more parameters including the output voltage feedback signal 122-1. In one embodiment, the controller 140 additionally monitors an amount of current (such as current feedback) supplied by the power converter 112 (such as from voltage 123) to the load 118. In such an instance, the controller 141 operates the first power converter 111 to regulate conversion of the input voltage 120 into the first output voltage 121 based at least in part on an amount of current supplied by the second output voltage 123 to the load 118.

In one embodiment, as its name suggests, implementation of an unregulated second power converter 112 and corresponding switched-capacitor converter 131 means that the switched-capacitor converter 131 converts the received output voltage 121 from power converter 111 into the output voltage 123 without implementation of a feedback path from the output voltage 123 to a controller in the switched-capacitor converter 131 that modifies switching operating conditions of the switched-capacitor converter 131 to maintain the output voltage 123 at a precise desired setpoint value. Instead, implementation of the switched-capacitor converter 131 includes selection of components and corresponding operation of the switched-capacitor converter 131 at a desired switching frequency causes the switched-capacitor converter 131 to convert the received output voltage 121 into the output voltage 123 without correcting input to output conversion errors based on feedback from the output voltage 123 (in the switched-capacitor converter) as would be found in a typical regulated voltage converter applications. However, in furtherance of maintaining the magnitude of the second output voltage 123 within a desired range or at a desired setpoint voltage value, as shown, the first power converter 111 regulates a magnitude of the first output voltage 121 (inherently regulating a magnitude of the output voltage 123) based on comparison of a magnitude of the output voltage 123 with respect to a desired setpoint reference voltage 103.

Thus, embodiments herein include implementing the power converter 112 without a feedback control loop. In such an instance, operational control (such as control of the switching frequency, etc.) associated with switched-capacitor converter 131 does not depend on a variation of a magnitude of the output voltage 123 with respect to a desired setpoint value. As previously discussed, any shortcomings associated with the lack of implementing an output voltage feedback control loop in the switched-capacitor converter 131 are addressed via implementation of the outer feedback control loop implemented by the controller 141 and the power converter 111.

Note that embodiments herein are useful over conventional techniques. For example, in contrast to conventional techniques, and as further discussed herein, the novel power supply as described herein provides high efficiency of converting an input voltage to a respective output voltage via unique first stage regulation (such as via power converter 111) and second stage transfer of capacitive energy and magnetic energy (such as via power converter 112).

As further discussed herein, the power supply 100 can be configured to include any number of switched-capacitor converters. For example, in one embodiment, the power supply 100 includes at least a first switched-capacitor converter and second switched-capacitor converter connected in parallel. In such an instance, each of the first switched-capacitor converter and the second switched-capacitor converter convert the first output voltage into the second output voltage. Further embodiments herein include different configurations as discussed in FIGS. 14 through 19.

Figure 2:
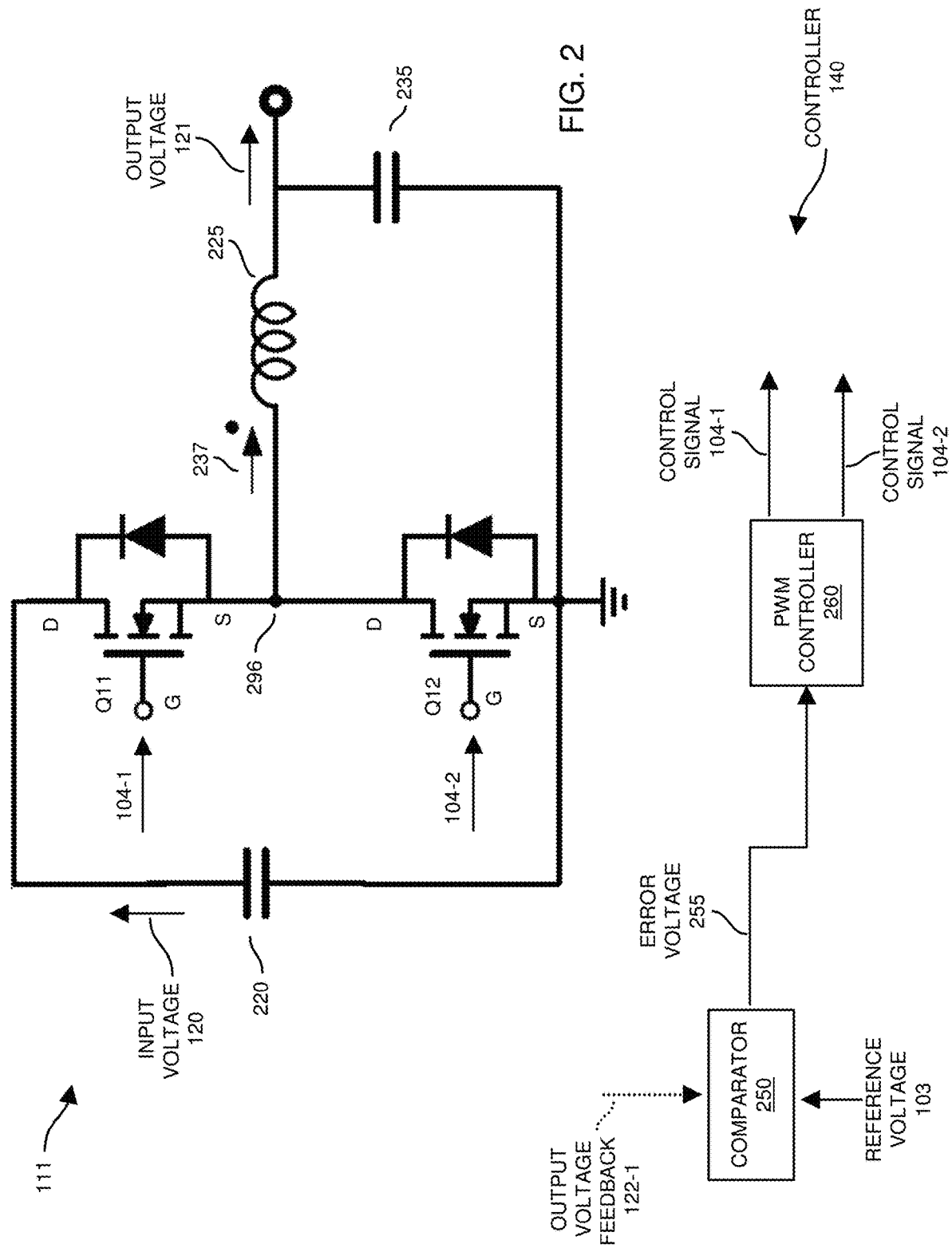
FIG. 2 is an example diagram illustrating a power converter according to embodiments herein.

FIG. 2 is an example diagram illustrating a power converter according to embodiments herein.

In this non-limiting example embodiment, the power converter 111 is configured as a buck converter including voltage source 220, switch Q11, switch Q12, inductor 225, and output capacitor 235.

Although the power converter 111 in FIG. 2 is a buck converter configuration, note that the power converter 111 can be instantiated as any suitable type of voltage converter providing regulation as described herein.

As shown, the switch Q11 is connected in series with switch Q12 between the input voltage 120 and corresponding ground reference. Via switching of the switches Q11 and Q12 based on control signals 104-1 and 104-2, node 296 coupling the source node of switch Q11 and the drain node of switch Q12 provides current 237 through the inductor 225, resulting in generation of the output voltage 121.

In one embodiment, the controller 141 controls switching of the switches Q11 and Q12 based on one or more feedback parameters. For example, as previously discussed, the controller 141 receives output voltage feedback signal 122-1 derived from the output voltage 123 supplied to power the load 118 as previously discussed in FIG. 1. Referring again to FIG. 2, via the comparator 250, the controller 141 compares the output voltage feedback signal 122-1 (such as output voltage 123 itself or derivative signal) to the reference voltage 103. As previously discussed, the reference voltage 103 is a desired setpoint in which to control a magnitude of the output voltage 123.

Based on the comparison as provided by comparator 240, the comparator 240 produces a respective error voltage 255 based on the difference between the output voltage feedback signal 122-1 and the reference voltage 103. A magnitude of the error voltage varies depending upon the degree to which the magnitude of the output voltage 123 is in or out of regulation (with respect to a reference voltage 103).

As further shown, the PWM controller 260 of the controller 141 controls operation of switching the switches Q11 and Q12 based upon the magnitude of the error voltage 255. For example, if the error voltage 255 indicates that the output voltage 123 (of the power converter 112) is less than a magnitude of the reference voltage 103, the PWM controller 260 increases a duty cycle of activating the high side switch Q11 (thus decreasing a duty cycle of activating the low-side switch Q12) in a respective switching control cycle.

Conversely, if the error voltage 255 indicates that the output voltage 123 (of the power converter 112) is greater than a magnitude of the reference voltage 103, the PWM controller 260 decreases a duty cycle of activating the high side switch Q11 (thus increasing a duty cycle of activating the low-side switch Q12) in a respective switching control cycle.

More specifically, as is known in the art, the controller 141 controls each of the switches Q11 and Q12 ON and OFF at different times to prevent short-circuiting of the input voltage 120 to the ground reference voltage. For example, when the switch Q11 is activated to an ON state, the switch Q12 is deactivated to an OFF state. Conversely, when the switch Q11 is deactivated to an OFF state, the switch Q12 is activated to an OFF state.

Via variations in the pulse with modulation of controlling the respective switches Q11 and Q12, the controller 141 controls generation of the output voltage 121 such that the output voltage 123 remains within a desired voltage range.

Figure 3:
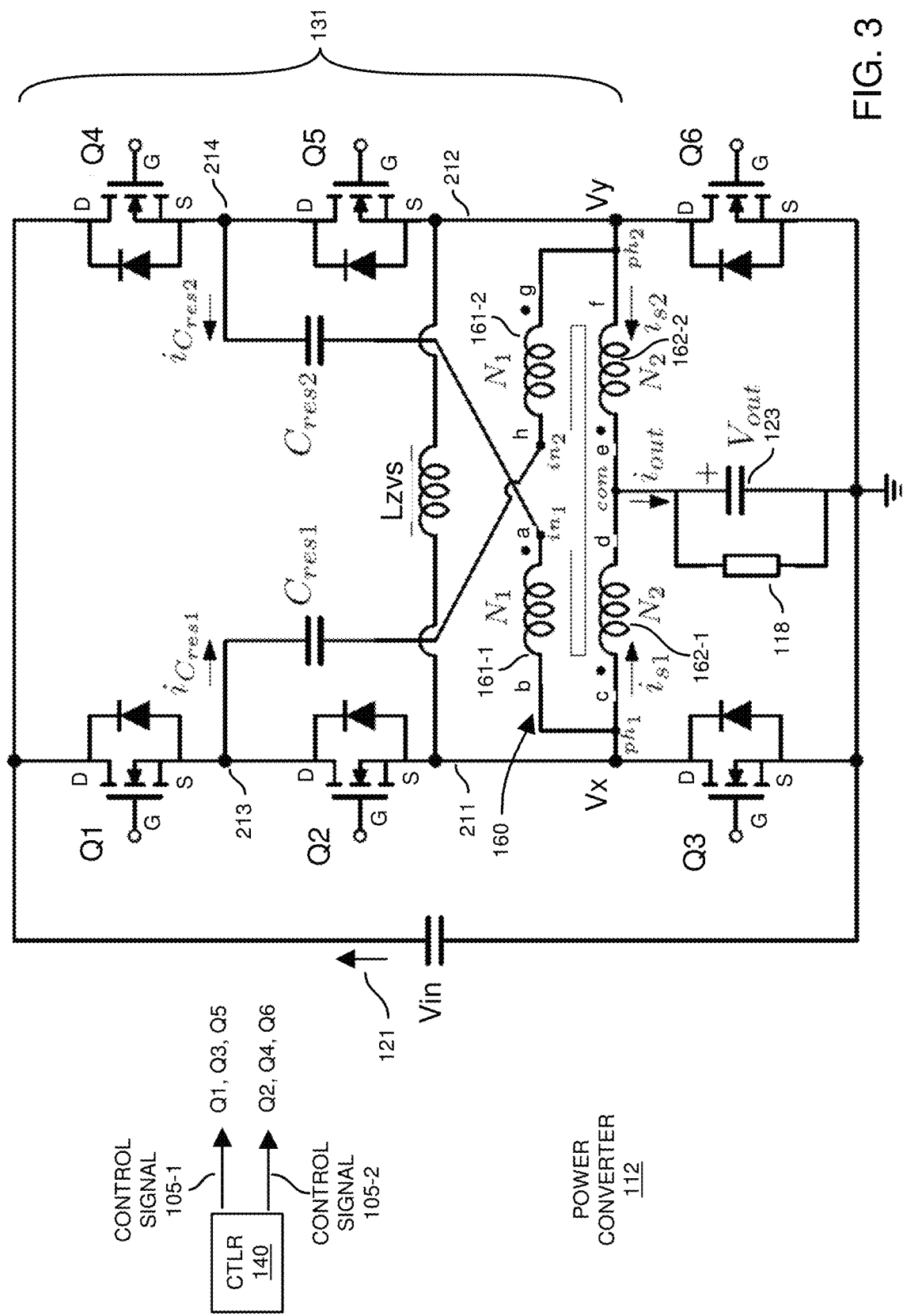
FIG. 3 is an example diagram illustrating a controller and a more detailed rendition of a power supply including a switched-capacitor converter and a magnetic hardware according to embodiments herein.

FIG. 3 is an example diagram illustrating a switched-capacitor converter according to embodiments herein.

As shown, the power supply 100 includes voltage source Vin, switched-capacitor converter 131, and magnetic device 160 such as a multi-tapped autotransformer or other suitable resource facilitating conveyance of magnetic energy.

In this example embodiment, the switched-capacitor converter 131 (apparatus such as hardware, circuitry, etc.) includes multiple switches Q1, Q2, Q3, Q4, Q5, and Q6 (such as field effect transistors or any other suitable type of switch). Additionally, the switched-capacitor converter 150 includes multiple circuit components including inductor Lzvs, capacitor Cres1, and capacitor Cres2.

Further in this example embodiment, the magnetic device 160 (such as transformer) includes input winding 161-1 (such as N1 turns), input winding 161-2 (such as N1 turns), output winding 162-1 (such as N2 turns), and output winding 162-2 (such as N2 turns).

In one embodiment, the windings 161-1 and 161-2 are considered input windings associated with the magnetic device 160. The windings 162-1 and 162-2 are considered output windings associated with the magnetic device 160.

The number of windings (N1, N2, etc.) associated with the input winding 161 and/or the output winding 162 can be any suitable value and vary depending on the embodiment.

In one embodiment, a combination of the input windings and output windings of magnetic device 160 are connected in series. For example, input winding 161-1 is connected in series with output winding 162-1; output winding 162-1 is connected in series with output winding 162-2; output winding 162-2 is connected in series with input winding 161-2.

In accordance with further embodiments, the output winding 162 (such as a tapped output winding, or multiple output windings connected in series) is inductively (magnetically) coupled to the first input winding 161-1 and second input winding 161-2. In other words, as shown, the first input winding 161-1, the second input winding 161-2, and the output winding(s) 162 are magnetically (inductively) coupled to each other. As its name suggests, the magnetic device 160 facilitates magnetic energy transfers.

Note that, if desired, the output winding 162 can be a center tapped winding facilitating generation of the output voltage 123 from a respective output of the center-tapped winding.

Further in this example embodiment, the drain node (D) of switch Q1 and the drain node (D) of switch Q4 are connected to the input voltage source Vin.

Further, the source node (S) of the switch Q1 is coupled to the drain node (D) of the switch Q2 (node 213). The source node (S) of the switch Q4 is coupled to the drain node (D) of the switch Q5 (node 214). The source node (S) of the switch Q2 is coupled to node 211. The source node (S) of the switch Q5 is coupled to node 212.

Capacitor Cres1 is connected between node 213 and a respective node of input winding 161-2. Capacitor Cres2 is connected between node 214 and a respective node of input winding 161-1.

Inductor Lzvs is coupled in parallel to input winding 161 and is disposed between node 211 and 212.

The drain (D) of switch Q3 is connected to node 211; the source (S) of switch Q3 is connected to ground. The drain (D) of switch Q6 is connected to node 212; the source (S) of switch Q6 is connected to ground.

The center tap (corn node) of the output winding 162 outputs current Tout and corresponding output voltage 123 to drive load 118 (a.k.a., Ro).

In non-limiting example embodiment, the magnitude of the output voltage 123 is Vin/8. Thus, if the output voltage 121 is 8 VDC, the magnitude of the output voltage 123 is 1 vDC. However, as discussed herein, settings of components in the power supply 100 can be adjusted to produce an output voltage 123 (Vout) of any suitable value. In general the output voltage 123, Vout=Vin*(N2/(2*(2N2+N1))), where N1=the number of turns on the input windings 161 and N2 is the number of turns on each of the output windings 162.

In one embodiment, N1 is defined as the turns of each input windings whilst N2 is defined as the turns of each output windings; in which case Vout=Vin*N2/(2*(2*N2+N1)).

As further shown, during operation, the controller 140 produces control signals 105-1 and 105-2 to control respective switches in the switched-capacitor converter.

Further in this example embodiment, control signal 105-1 generated by the controller 140 drives gates (G) of respective switches Q1, Q3, and Q5. Accordingly, control signal 105-1 controls a state of each of the switches Q1, Q3, and Q5.

Control signal 105-1 drives respective gates (G) of switches Q1, Q3, and Q5. Accordingly, control signal 105-2 controls a state of each of the switches Q2, Q4, and Q6.

Note that each of the switches as described herein can be any suitable devices such as (Metal Oxide Semiconductor) field effect transistors, bipolar junction transistors, etc.

The settings of capacitors Cres1 and Cres2 can be any suitable value. In one embodiment, the voltage converter 135 as described herein provides better performance when Cres1=Cres2, and works well even if Cres≠Cres2.

The inductor Lzvs can be any suitable value. See the discussion below in text associated with FIG. 5 indicating an example setting of inductor Lzvs to provide zero voltage switching to switches in the power supply 100.

Referring again to FIG. 3, in one embodiment, additional inductance (such as inductor Lzvs) in parallel with the magnetic device 160 is optionally present to achieve zero voltage switching (ZVS) for one or more switches Q1-Q6. As further discussed below, the Lzvs inductance alternatively can be integrated in the magnetic device 160 (such as with gaps in the respective core or using core with lower permeability). Thus, embodiments herein include switching switches in the switched-capacitor converter 131 in a zero voltage switching mode via energy provided by the magnetic device.

As previously discussed, switches in power supply 100 are divided into two switch groups: the first switch group including simultaneously controlled switches Q1, Q3, and Q5 controlled by respective control signal 105-1, and a second switch group including simultaneously controlled switches Q2, Q4, and Q6, controlled by respective control signal 105-2, which is generally a 180 degrees phase shift with respect to timing of control signal 105-1.

In one embodiment, the pulse width modulation of control signals 105 is approximately 50% to obtain the minimum RMS current.

The magnitude of the output voltage 123 in this example embodiment depends on the turns (# of windings ratio N1/N2 of the input winding to the output winding).

In one embodiment, the switching frequency does not change directly the magnitude of the output voltage 123, but in general is changing it because the losses are increasing or decreasing based on: i) the difference between Fres and Fsw, where Fres is the resonant frequency of the tank formed by Cres1 or Cres2 and the leakage of the multi-tapped autotransformer when Cres1=Cres2, and ii) the actual conduction losses in the converter which actually overall are giving the resistive behavior of the converter.

Embodiments herein include implementing the switched-capacitor converter to include one or more resonant circuit paths. As further discussed below, if desired, the controller 140 can be configured to monitor operation of switches (such as body diode conduction conditions) associated with the one or more resonant circuit paths. The controller 140 controls a switching frequency associated with control signals 105 such that each respective resonant circuit path operates near its resonant frequency, reducing a reactive impedance of the switched-capacitor converter in which the switched-capacitor converter becomes nearly resistive only. Additionally, in one embodiment, by monitoring a voltage of the body diode of a respective switch, the controller modulates (varies) the dead time amplitude by keeping the same overall switching frequency Fsw. Therefore, the on-time of respective switches is also varying. In general the variation of dead-time is not that important and does not influence dramatically the impedance of the resonant tank. Embodiments herein include limiting the switching losses associated with the switched-capacitor converter, which reduces the equivalent resistance of the converter (lower losses).

Yet further embodiments herein include taking advantage of the leakage inductance, Lk, of the multi-tapped autotransformer 160 to (soft) charge the capacitors Cres1 and Cres2 during different control cycles. For example, in one embodiment, the capacitors Cres1 and Cres2 function as flying capacitors, enabling use of lower voltage field effect transistors at the input side switched-capacitor converter 131) in comparison to a classic LLC topology.

Note that a further benefit of the switched-capacitor converter 131 as described herein is the symmetric behavior of such a circuit. For example, as further discussed herein, via the implementation of power supply 100: i) the switched-capacitor converter 131 is powered almost continuously from the input supply Vin (voltage 121) at different times in a respective control cycle, reducing the input current ripple as compared to other technologies, ii) in the equivalent resonant tank switched circuit paths of the switched-capacitor converter (such as first resonant circuit path including capacitor Cres1 and input winding 161-2 and second resonant circuit path including capacitor Cres2 and input winding 161-1), both resonant capacitors are resonating with the leakage inductance Lk of the magnetic device 160 (such as multi-tapped autotransformer).

In one embodiment, if Cres1≠Cres2 the resonant transitions are unbalanced, which actually is not an issue for operation. In general, if the difference is the maximum difference between Cres1 and Cres2 based on the tolerance (i.e. ±10%±20%), the converter is still running with high efficiency. In such an instance the converter is still working well because of ZVS operation.

Accordingly, embodiments herein include implementing the switched-capacitor converter 131 stage to include multiple switched capacitor cells. For example, a first switched-capacitor converter cell includes capacitor Cres1; a second switched-capacitor converter cell includes capacitor Cres2. The magnetic device 160 is electrically coupled to switching elements associated with the multiple switched capacitor cells. For example, capacitor Cres1 is coupled to winding 161-1 of the magnetic device 160; capacitor Cres2 is coupled to winding 161-2 of the magnetic device 160. A combination of the magnetic device 160 and the multiple switched capacitor cells form multiple resonant circuit paths.

Note further that one enabler of high efficiency and high-power density of the proposed power converter 131 is the ability to implement lower voltage rating field effect transistors and the implementation of Class II ceramic capacitors (such as capacitors Cres1 and Cers2), which inherently offer high capacitance density.

Moreover, as previously discussed, the additional inductor, Lzvs, provides the inductive energy to ensure ZVS transition for all field effect transistors in the switched-capacitor converter 131 such as during all switching conditions. For example, energy stored in the inductor Lzvs supplies charge to parasitic capacitors of the respective switches during dead times such as between time T1 and T2, between time T3 and T4, and so on as further discussed below.

Figure 4:
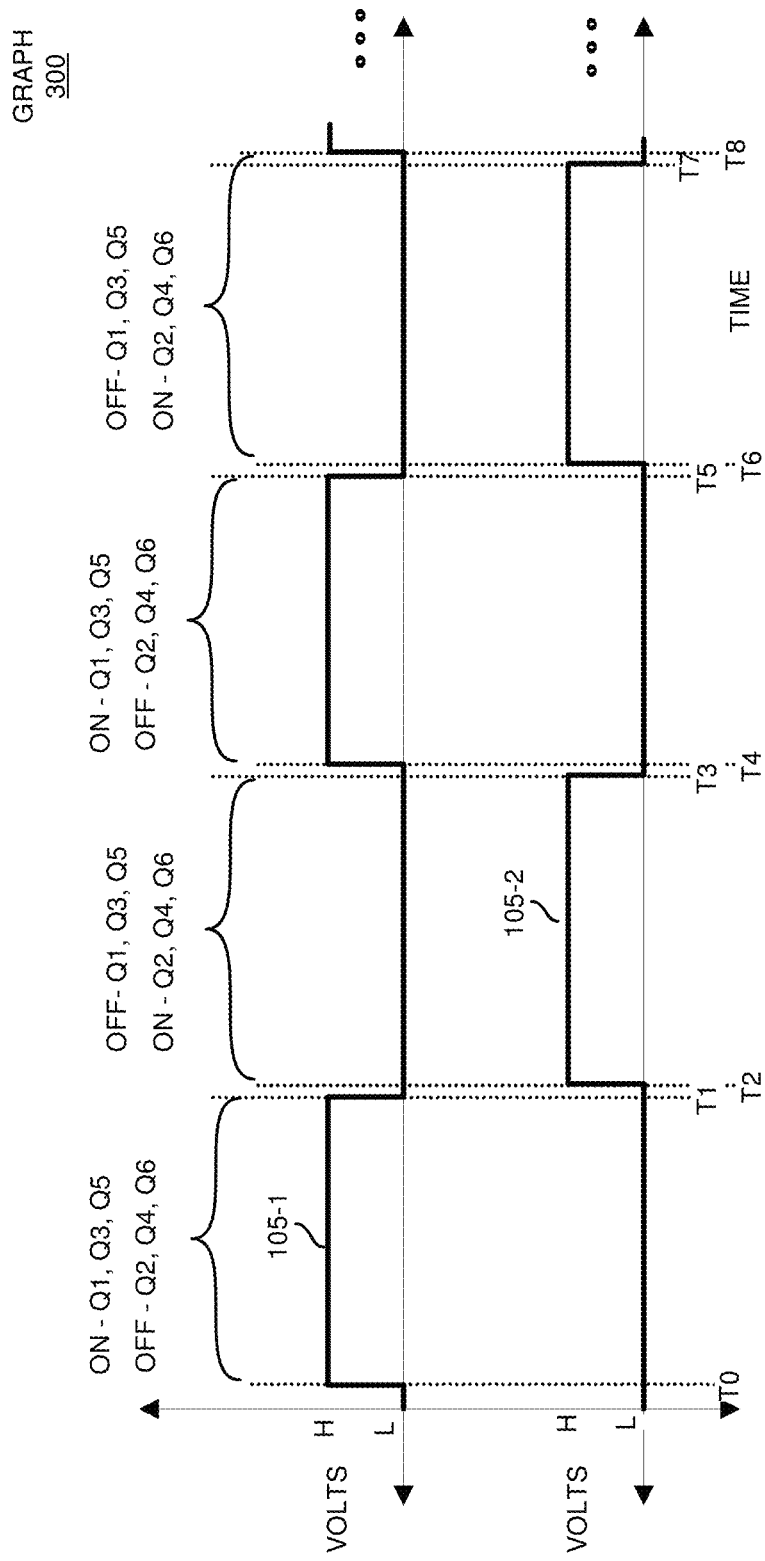
FIG. 4 is an example timing diagram illustrating timing of control signals according to embodiments herein.

FIG. 4 is an example diagram illustrating generation of controls signals that control a switched-capacitor converter and a respective voltage converter according to embodiments herein.

In general, as shown in graph 300, the controller 140 produces the control signal 105-2 to be an inversion of control signal 105-1. A pulse width of each control signal is approximately 49% or other suitable pulse width modulation value.

Between time T0 and time T1, when the control signal 105-1 (at a logic high) controls the set of switches Q1, Q3, and Q5, to an ON state (low impedance or short circuit), the control signal 105-2 (logic lo) controls the set of switches Q2, Q4, and Q6, to an OFF state (very high impedance or open circuit).

Conversely, between time T2 and time T3, when the control signal 105-2 (logic high) controls the set of switches Q2, Q4, and Q6, to an ON state, the control signal 105-1 (logic low) controls the set of switches Q1, Q3, and Q5, to an OFF state.

Note that the duration between times T1 and time T2, the duration between time T3 and time T4, duration between T5 and T6, etc., represents so-called dead times during which each of the switches (Q1-Q6) in the power converter 112 is deactivated to the OFF state.

As further shown, the control signals 105 are cyclical. For example, the settings of control signals 105 for subsequent cycles is the same as those for the cycle between time T0 and time T4. More specifically, the settings of control signals 105 produced by the controller 140 between time T3 and time T7 is the same as settings of control signals 105 between time T0 and time T3, and so on.

In one embodiment, the controller 140 controls the frequency or ON-time duration (i.e. to avoid body diode conduction) of the control signals (period is time between T0 and time T4) can be generated at any suitable frequency.

Additionally, as previously mentioned, the controller 140 controls the pulse duration of the control signals 105 to be around 49% depending on the dead-time duration, although the control signals 105 can be generated at any suitable pulse width modulation value.

As further discussed herein, certain embodiments include adjusting the dead time of each of one or more power converters 112 operating in parallel.

A magnitude of the output voltage 123 depends on the multi-tapped autotransformer 160 turns ratio (N1/N2). The ratio between the input voltage Vin and output voltage Vout is given by the following equation:

$$Vin/Vout = 4 + [(2*N1)/N2]$$

Thus, the power converter as described herein is scalable to different conversion ratios by designing only the ratio between N1 and N2, which actually leads to claim a new family of unregulated hybrid dc-dc converter with different possible ratios Vin/Vout (such as 5 to 1, 6 to 1, 7 to 1, 8 to 1, . . . ).

Note that further embodiments herein take advantage from the leakage inductance of the multi-tapped autotransformer 160 to soft charge the capacitors Cres1 and Cres2, which act as flying capacitors, enabling use of lower voltage related MOSFETs in the input side of the switched-capacitor converter 131 in comparison with conventional (classic) LLC converter topologies. Switches Q1 and Q4 block a portion of the input voltage which can be defined by the following equation:

$$Vmax(Q1,Q4) = Vin/2 + Vout*N1/N2$$

During operation, switch Q2 and switch Q5 have to block the entire input voltage Vin, while switch Q3 and Q6 have to block 2*Vout.

As previously discussed, another benefit of the power supply as described herein is its symmetric behavior, which provides a benefit that the dynamic load 118 is powered any time from the input supply Vin during each phase, reducing the current/voltage ripple on the output voltage 123.

The power converter 112 also provides conveyance of respective energy from the received first output voltage 121 to the second output voltage 123 in each switching control cycle of operating the second power converter 112. In one embodiment, the switched-capacitor converter 131 and the magnetic device 160 transfer energy in time intervals of equal duration. Still further, the load 118 is powered in each powering cycle (such as between time T0 and T4, T4 to T8, etc.) based on a combination of the capacitive energy transfer (provided by the switched-capacitor converter 131) and the magnetic energy transfer (provided by magnetic device 160), reducing overall conduction losses in passive and active components of the second power converter 112.

Note that there are multiple types of possible resonant converters:
  i) Mono phase resonant converter—In a mono resonant the current is flowing from the input bus voltage to the converter only in one powering phase. Power is supplied either directly from the input or from the switched capacitor.

ii) Multi-phase resonant converter—The proposed ZVS Tapped Hybrid SCC (such as switched-capacitor converter 131) is a dual phase resonant converter because it presents two powering phases within one switching cycle. In such a scenario the input current ripple is less compared with a mono phase resonant converter. The reduced ripple is useful in applications that are facing high current variation.

In one embodiment, the switched-capacitor converter 131 and corresponding integral magnetic device 160 (a.k.a., ZVS Tapped Hybrid SCC) shown in FIG. 3 is powered at any time from the input since it is a dual-phase resonant converter. Therefore, it is a valuable candidate as an HSC-CM, since the energy is always transferred from the input to the output of the converter for each switching cycle.

Note further that, in one embodiment, the magnitude of the output voltage 123 (Vout) depends on the turns (# of windings N1 and N2 associated with the input windings 161 and the output windings 162); N1 is the turns of each input winding and N2 is the turns of each output windings. Note that the magnitude of output voltage 123 depends also on the actual current because of the resistive behavior of the switched-capacitor converter 131 and because the resistance of transformer 160 provides an important contribution to the overall resistance.

In such an instance, there exists a following relation between input and output: Vin/Vout=4+[(2*N1)/N2]) and the switching frequency of the control signals 105. In general, if the switched-capacitor converter 131 operates at a switching frequency far different than its resonant frequency, the greater the variation of the output voltage is with respect to a desired value because losses (i.e. is not possible to modulate the voltage gain as in LLC). Therefore, it is better to cancel the dependence of the output voltage 123 with respect to switching frequency (fsw). These can be selected to be any suitable settings. Accordingly, attributes of the switched-capacitor converter 120 can be modified to convert any input voltage level to a respective desired (such as unregulated) output voltage level.

One enabler for high efficiency and high power density of the proposed power supply 100 and ZVS Tapped Hybrid-SCC (such as power converter 112) is the opportunity to use lower voltage rating switches (MOSFETs) and the chance to use Class II ceramic capacitors, which inherently offer high capacitance density. Moreover, the additional inductor L_zvs or alternatively the magnetizing inductance of the magnetic device 160 such as a multi-tapped autotransformer (MTA) provides the inductive energy to ensure ZVS transitions for all switches. Additionally, note that the multi-tapped autotransformer has inherently significant less windings losses compared with a classic LLC converter.

Another benefit of the embodiments herein includes a soft-switching scheme, which creates Zero voltage switching operation for all switches even if the FETs are switching under different voltage conditions. In general the soft-switching capability is defined by the energy stored in the L_ZVS inductance or by the magnetizing inductance of the magnetic device 160 (MTA) and by the intrinsic output capacitances C_oss of all FETs. In one embodiment, the soft-switching operation depends on few parameters and therefore the converter does not need any special control system to achieve soft-switching in all scenarios. Another benefit of embodiments herein is the reduced conduction losses for all FETs and windings, which are mitigated by using two energy transfer modes (namely, electrical and magnetic energy transfer modes) in each control switching cycle as previously discussed.

Further details of the energy transfer modes are discussed below. The concepts associated with the hybrid switched-capacitor converter 112 can be extended to any converter acting as Hybrid Switched Capacitor Current Multiplier.

Figure 5:
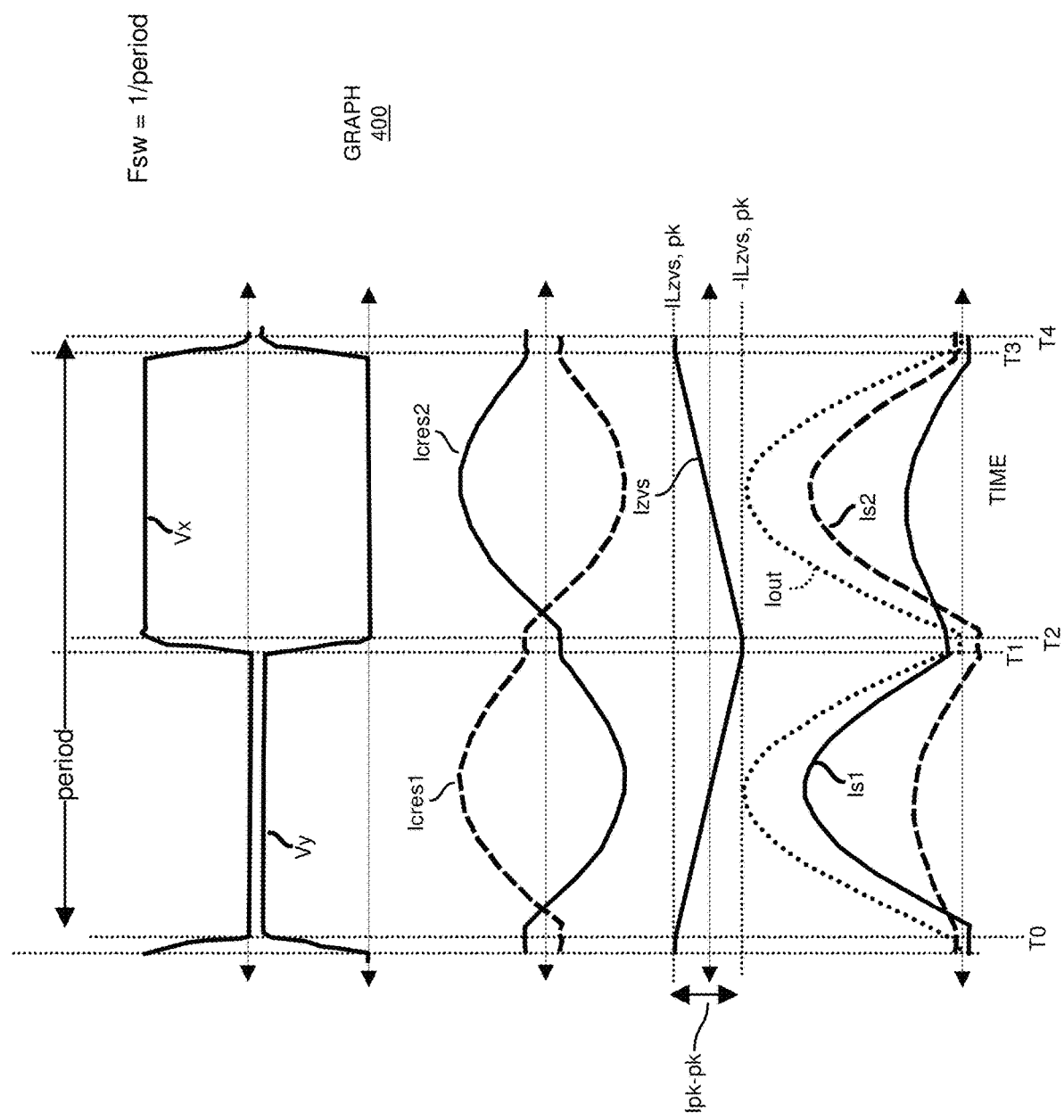
FIG. 5 is an example diagram illustrating a timing diagram of control signals and output signals according to embodiments herein.

FIG. 5 is an example diagram illustrating a timing diagram of output signals according to embodiments herein.

In this example embodiment, as previously discussed, the voltage Vx indicates the voltage at node 211 between the input winding 161-1 and the output winding 162-1; voltage Vy indicates the voltage at node 212 of the input winding 161-2 and output winding 162-2.

Icres1 represents current through the series combination of capacitor Cres1 and input winding 161-2; Icres2 represents current though the series combination of capacitor Cres2 and input winding 161-1.

Izvs represents current through the inductor Lzvs.

Is1 represents current through the output winding 162-1; Is2 represents current though the output winding 162-2.

Iout (summation of current Is1 and current Is2) represents the output current (Iout) supplied by the center tap of output winding 162 of the multi-tapped autotransformer 160 to a dynamic load 118. Between time T0 and time T1, when the resonant circuit path including capacitor Cres1 and input winding 161-2 are coupled to input voltage via activation of switch Q1, the corresponding generated current Is1 contributes a majority of the current to produce the current Iout. Conversely, between time T2 and time T3, when the resonant circuit path including capacitor Cres 2 and input winding 161-1 are coupled to input voltage via activation of switch Q2, the corresponding generated current Is2 contributes a majority of the current to produce the current Iout.

Thus, the switched-capacitor converter 131 includes multiple capacitors; the magnetic device 160 includes an input winding or windings (such as winding 161-1 and 161-2) coupled to the switched-capacitor converter 131. Via controller 140, the multiple capacitors Cres1 and Cres2 are controllably switched in a circuit path including the input winding 161-1 and 161-2 of the magnetic device 160 to convert the first output voltage 121 into voltage Vx and Vy. The magnetic device 160 includes one or more output windings 162-1 and 162-2 that convert the voltage Vx and Vy into the output voltage 123.

Figure 6:
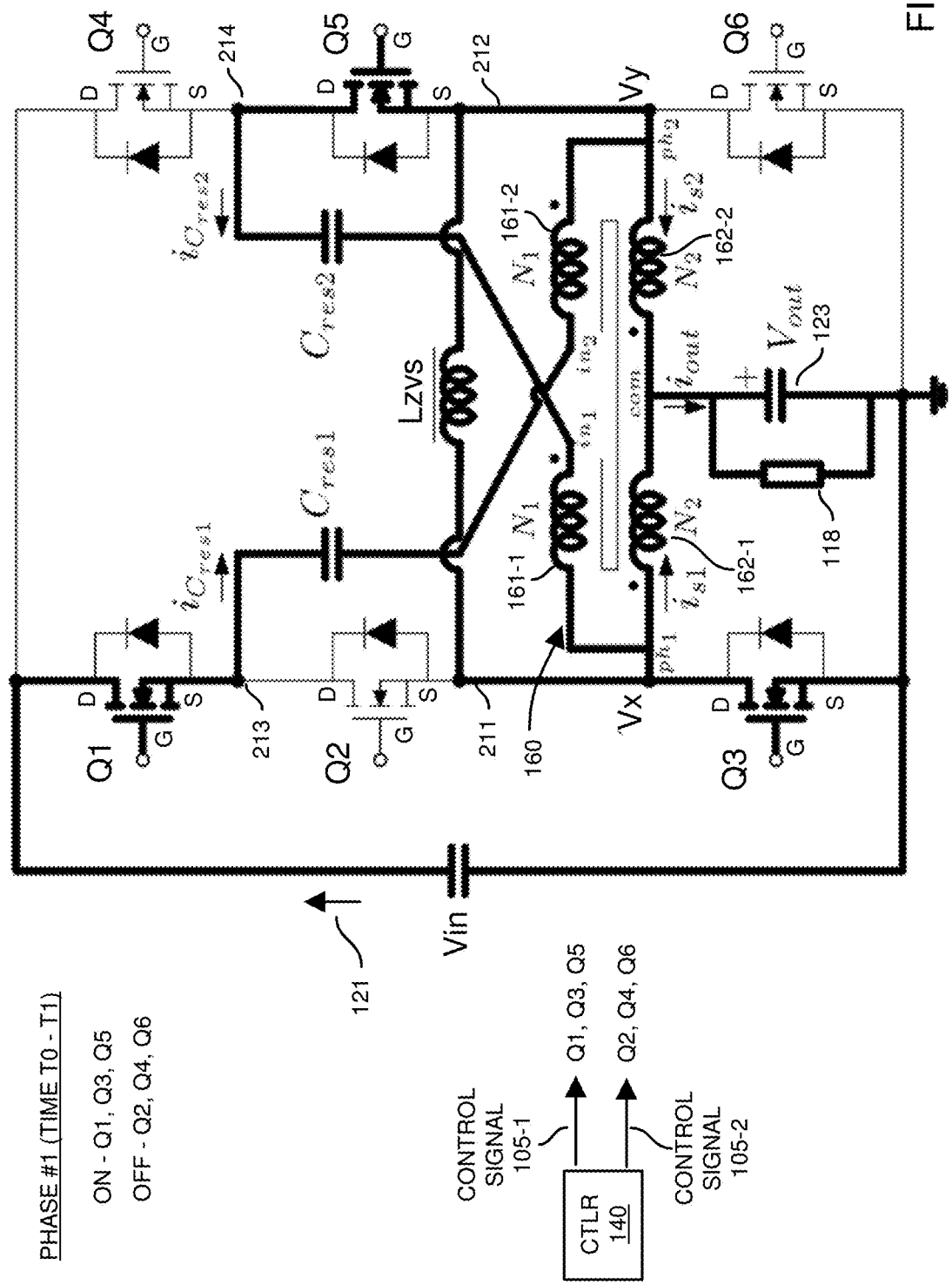
FIG. 6 is an example diagram illustrating a first mode of controlling switches in a hybrid switched-capacitor converter according to embodiments herein.

FIG. 6 is an example diagram illustrating a first mode (phase #1) of controlling switches in a switched-capacitor converter and voltage converter according to embodiments herein.

For the phase #1, between time T0 and time T1, switches Q2, Q4, and Q6 are turned OFF; switches Q1, Q3, and Q5 are turned ON in ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the magnetic device 160 such as multi-tapped autotransformer.

In such an instance, during phase #1, capacitor Cres1 is soft-charged from the input voltage source Vin while capacitor Cres2 is soft-discharged.

More specifically, as previously discussed, the input winding 161 of the magnetic device 160 (such as multi-tapped autotransformer) includes a first node 211 and a second node 212. During time T0 to time T1 (a first resonant frequency mode), the controller 140 creates a first switched circuit path connecting the capacitor Cres1 to the input voltage Vin; the controller 140 further creates a second switched circuit path by connecting the capacitor Cres2 to node 212. As previously discussed, in such an instance, the capacitor Cres1 is soft charged via input voltage Vin, the capacitor Cres2 (flying capacitor charged to Vin/2) is soft discharged. Accordingly, during phase #1, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then i(Cres1)(t)=−i(Cres2)(t), and considering i(Cres1)(t)=Ires (t) it follows that Is2($t$)=2*Ires(t). In this scenario, the following equation are valid in phase #1:

$$N1*Ires(t)+N1*Ires(t)=N2*Is1(t)-N2*Is2(t)$$

which can be written as:

$$Is1(t)=[(2*N1)/N2+2]*Ires(t) \text{ as shown in FIG. 5.}$$

In such phase #1, the converter presents, in general, two resonant modes based on the actual value of Cres1 and Cres2. For example, Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

This converter presents a better copper utilization over prior art DC-DC converter transformers. In one embodiment, since all the windings of the magnetic device 160 are connected in series, as described in an MTA and MMTA structure, this magnetic device present two energy transfer modes. For example, during T0 to T1, i_(i_s1) (t) is powering the load and this actually presents a magnetic transfer mode, instead, i_(i_s2) (t) is powered to the load through an electric transfer mode. This behavior improves the conversion efficiency by reducing both the windings and switches' current stress.

Figure 7:
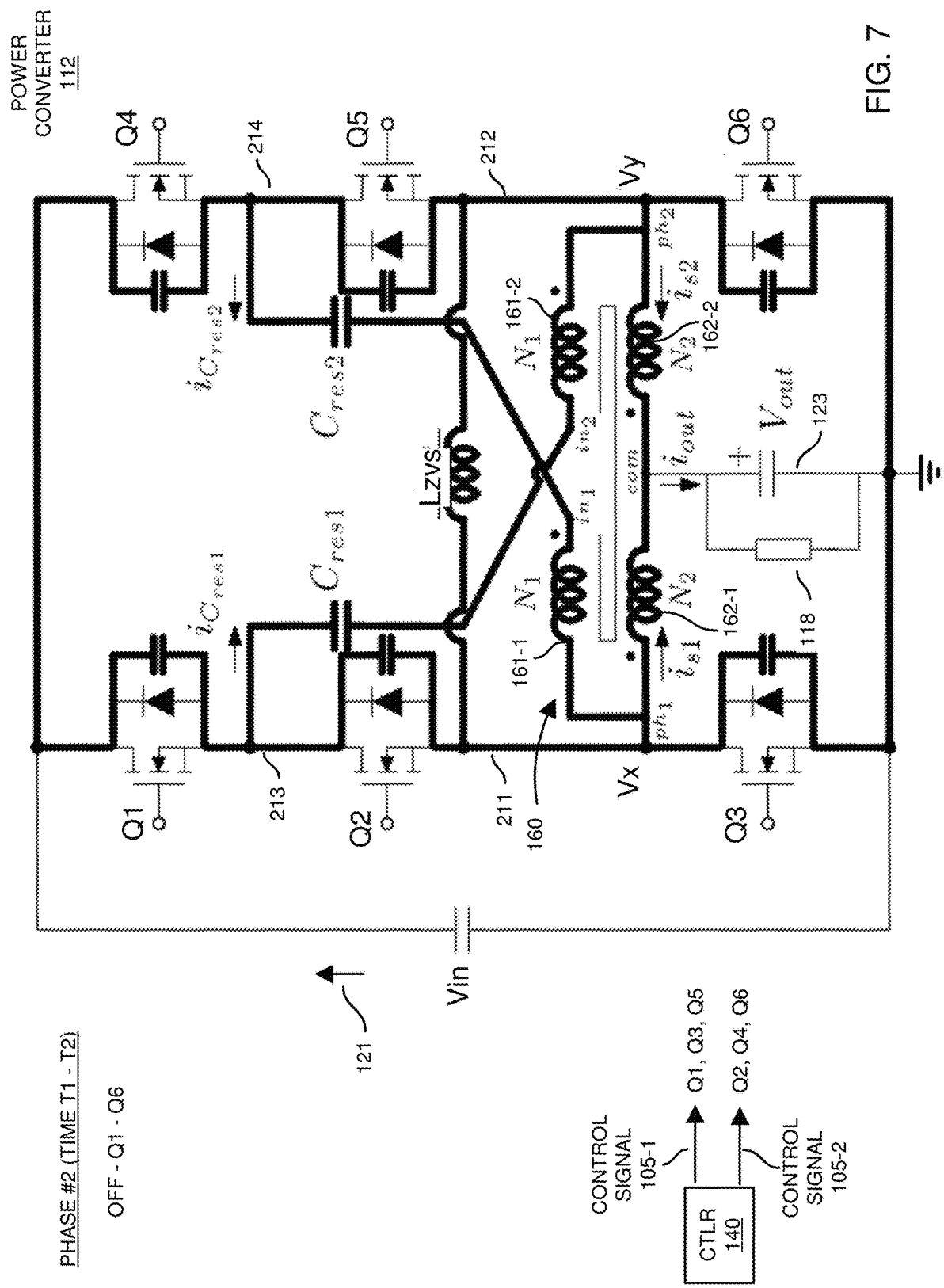
FIG. 7 is an example diagram illustrating a dead time or deactivation of switches in a hybrid switched-capacitor converter according to embodiments herein.

FIG. 7 is an example diagram illustrating a dead time or deactivation of all switches in a switched-capacitor converter and voltage converter according to embodiments herein.

Between time T1 and time T2, controller 140 turns OFF switches Q1, Q3 and Q5. The parasitic capacitance of Q1 is charged to Vin/2+Vout*N1/N2; switch Q3 is charged to 2*Vout; switch Q5 is charged at the input voltage Vin, whilst the parasitic capacitance of switches Q2, Q4 and Q6 are discharged to zero, using the inductive energy stored in the inductor Lzvs. When the capacitance of switch Q2, Q4, and Q6 are discharged to zero, their body diodes start to conduct to enable ZVS turn on. The current Izvs(T1) that enables ZVS operation, is denoted as i(Lzvs,pk)) as shown in FIG. 5 which is given by the following equation:

$$I_{L_{zvx,pk}} = \frac{V_{out}}{2 * L_{zvs} * f_{sw}}$$

In one embodiment, the value of Lzvs is strongly dependent on the application basically it depends on the input voltage, output voltage, and the MOSFET used in the application.

The same equation is valid for the magnetizing inductance of the MTA or MMTA where the only difference is coming from the actual model of the inductance.

As discussed, one of the main benefits of such an approach, due to the combination of switched capacitor cell and a magnetic device, all the FETs are running in soft-switching because of all the switches are facing the inductive energy from the L_zvs inductance. The soft-switching condition is achieved once the inductive energy stored in the L_zvs inductance or in the integrated L_zvs in the MTA is higher than the capacitance energy needed to charge and discharge all the FETs in order to achieve Zero Voltage Switching behavior within the dead-time interval T1 to T2 or T3 to T4.

Figure 8:
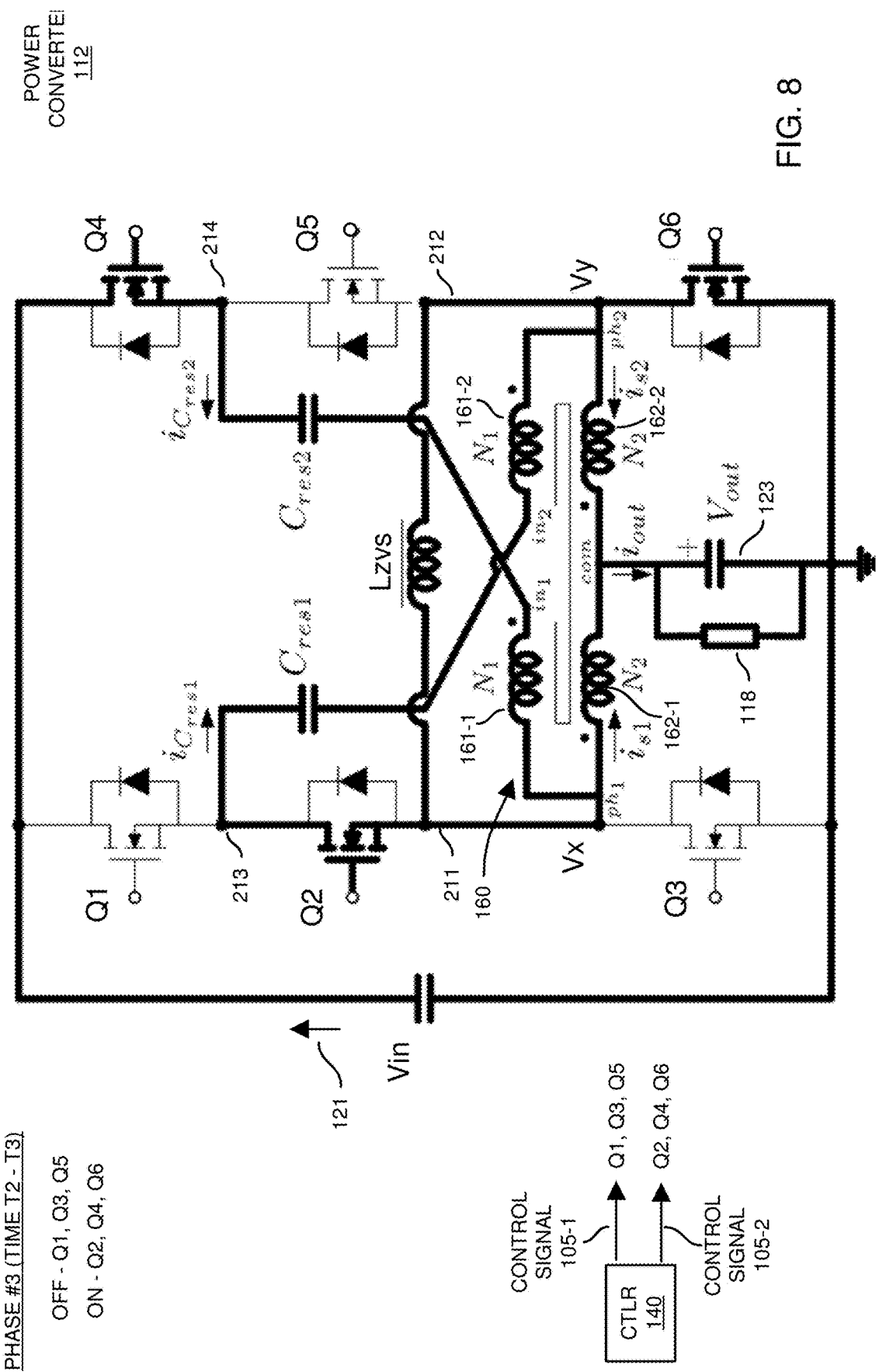
FIG. 8 is an example diagram illustrating a second mode of controlling switches in a hybrid switched-capacitor converter according to embodiments herein.

FIG. 8 is an example diagram illustrating a second mode (a.k.a., phase #3) of controlling switches in a switched-capacitor converter and voltage converter according to embodiments herein.

For the phase #3, between time T2 and time T3, at t=T2 witches Q2, Q4 and Q6 are turned ON in ZVS and ZCS; switches Q1, Q3, and Q5 are OFF. In ZVS and in zero current switching (ZCS) and the first resonant mode transition takes place between capacitor Cres1 and the leakage inductance of the multi-tapped autotransformer, whilst the second resonant mode transition takes place between capacitor Cres2 and the leakage inductance of the magnetic device such as multi-tapped autotransformer.

In such an instance, during phase #3, capacitor Cres2 is soft-charged from the input voltage source Vin while capacitor Cres1 is soft-discharged.

More specifically, as previously discussed, the input winding 161 of the magnetic device 160 such as multi-tapped autotransformer includes a first node 211 and a second node 212. During time T2 to time T3 (a second resonant frequency mode), the controller 140 creates a first switched circuit path connecting the capacitor Cres2 to the input voltage Vin via switch Q4; the controller 140 further creates a second switched circuit path by connecting the capacitor Cres1 to the node 211. As previously discussed, in such an instance, the capacitor Cres1 (flying capacitor) is soft discharged, the capacitor Cres2 (charged to Vin/2) is soft charged. Accordingly, during phase #3, to a different degree, both resonant circuit paths contribute to generation of the output voltage 123 that powers the load 118.

When capacitances are substantially equal such as capacitance of Cres1=capacitance of Cres2, the RMS (Root Mean Square) current through each capacitor is approximately the same. If perfect balance is present between the actual resonant current through capacitors Cres1 and Cres2, then ICres1($t$)=−ICres2($t$), and considering ICres1($t$)=Ires(t), it follows that Is1($t$)=2*Ires(t). In this scenario, the following equation are valid in phase #3:

$$N1*Ires(t)-N1*Ires(t)=N2*Is1(t)-N2*Is2(t)$$

which can be written as:

$$Is2(t)=[(2*N1)/N2+2]*Ires(t) \text{ as shown in FIG. 5.}$$

This converter includes two separate resonant tank circuits. In such an instance, there are two resonant frequencies based on the actual value of Cres1 and Cres2. For example Cres1 is facing a resonant current with resonant switching defined by Fres1=1/(2*pi*sqrt(Cres1*Lk)) where Lk is leakage of the multi-tapped autotransformer.

Whilst Cres2 is facing a resonant current with resonant switching defined by Fres2=1/(2*pi*sqrt(Cres2*Lk)) where Lk is leakage of the multi-tapped autotransformer.

During time interval T2 to T3, i_(i_s2) (t) is powering the load 118 and this actually presents a magnetic transfer mode, instead, i_(i_s1) (t) is powered to the load through an electric transfer mode.

Figure 9:
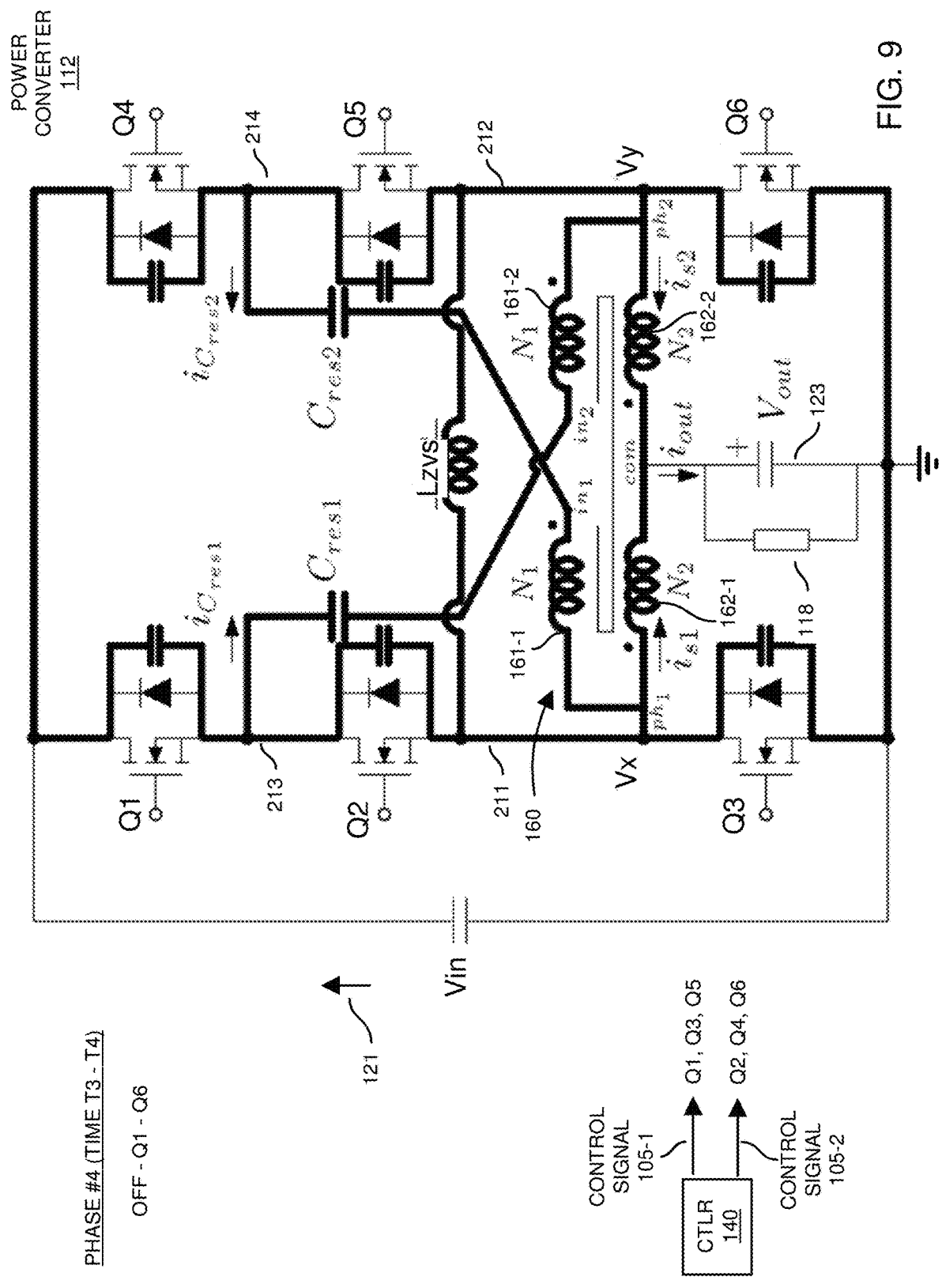
FIG. 9 is an example diagram illustrating a dead time or deactivation of switches in a hybrid switched-capacitor converter according to embodiments herein.

FIG. 9 is an example diagram illustrating a dead time or deactivation of all switches in a switched-capacitor converter and voltage converter according to embodiments herein.

Between time T3 and time T4, controller 140 turns OFF switches Q2, Q4, and Q6 and the parasitic capacitance of switch Q4 is charged to Vin/2+Vout*N1/N2, switch Q2 is charged at the input voltage, Vin, switch Q6 is charged to 2*Vout, whilst the parasitic capacitance of switches Q1, Q3, and Q5 are discharged to zero.

When the capacitance of switches Q1, Q3, and Q5 are discharged to zero, their respective body diodes start to conduct to enable ZVS turn on. The current that enables ZVS is Izvs(t3) which correspond with −IL(zvs,pk). Thus, IL(zvs,pk) is a good index to establish when ZVS condition is achieved for all switches.

At t=T4, switches Q1, Q3, and Q5 are turned ON in ZVS and ZCS (Zero Current Switching), concluding the switching period (i.e., time T0 to time T4).

As highlighted in the operation of the power supply 100 in different phases (in FIGS. 6-9), the power supply 100 converter achieves ZVS conditions in all load conditions regardless of the tolerance of the components.

In one embodiment, if the expected ZVS condition is designed for the worst case (Vin=V(in,min) and Lzvs+tolerance(Lzvs)), the converter as described herein can achieve soft switching operation in all load conditions for all input voltages and load conditions, which renders embodiments herein suitable for mass production. Moreover, as previously reported, the magnetic device 160 of the power converter 112 as described herein can be implemented with a multi-tapped matrix transformer (a.k.a., MMTA) resulting in lower windings and core losses.

Figure 10:
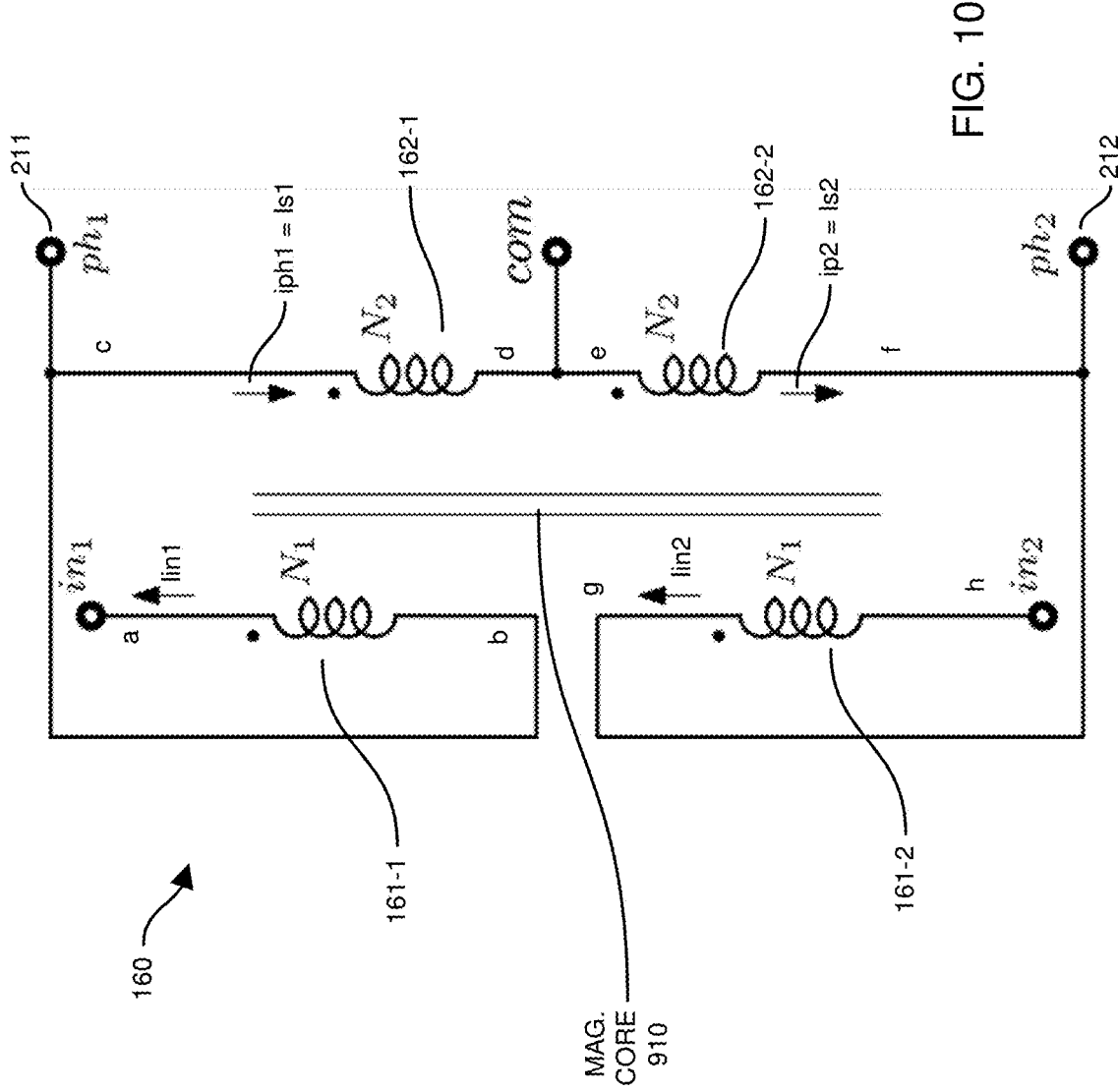
FIG. 10 is an example diagram illustrating details of a magnetic device implemented as a multi-tapped autotransformer according to embodiments herein.

FIG. 10 is an example diagram illustrating details of a multi-tapped autotransformer according to embodiments herein.

One benefit of implementing the magnetic device 160 as a multi-tapped autotransformer in the power converter 112 is high efficiency and high power density, enabling use of lower voltage rating MOSFETs (such as for switches Q1-Q4 in comparison to a classic LLC converter and enabling the choice of implementing Class II ceramic capacitors (such as for Cres1 and Cres2), which inherently offer high capacitance density.

Moreover, as previously discussed, the additional inductor Lzvs (alternatively implemented via the magnetizing inductance of the multi-tapped autotransformer) provides the inductive energy to ensure ZVS transition for all switches (such as MOSFETs) in the power converter 112.

In addition to these benefits, another benefit of the magnetic device 160 (such as a multi-tapped autotransformer) is the inherent lower windings losses in comparison to classic LLC converters; the overall conduction stresses for all FETs (such as switches Q1-Q6) are reduced, providing a higher reliability power.

As shown in FIG. 3 and FIG. 10, one example of a proposed magnetic device 160 such as multi-tapped autotransformer comprises: 4 windings. All windings are arranged in series, starting from terminal node in1 (node a) and ending at terminal node in2 (node h). More specifically, a combination of input winding 161-1 (between node a and node b), output winding 162-1 (between node c and node d), output winding 162-2 (between node e and node f), and input winding 161-2 (between node g and node h) are connected in series between node in1 and node in2. In one embodiment, the magnetic device 160 such as multi-tapped autotransformer includes so-called taps at node in1, tap node ph1, tap node com, tap node ph2, and node in2.

The discussion below provides a further understanding associated with the magnetic structure of an embodiment of the magnetic device 160.

More specifically, in this example embodiment of FIG. 10, the four windings of the multi-tapped autotransformer 161 are wound on or around a common magnetic core 910, forming an multi-tapped autotransformer. As previously discussed, the windings of magnetic device 160 include: i) a first group of input windings (any suitable number of windings) formed by the input windings between node in1 and node ph1 and between node in2 and node ph2; ii) a second group of output windings (any suitable number of windings) includes output winding 162-1 and output winding 162-2 such as between node PH1 and node PH2.

Based on this assumption, and if an ideal multi-tapped autotransformer is considered and considering that the Magneto Motive Force (MMF) is established by Is1 (a.k.a., Iph1) and Is2 (a.k.a., Iph2) at the output side, it must be countered by an MMF in the input side established by Iin1 and Iin2. In this scenario the following equations are always valid:

$$N1*Iin1+N1*Iin2=N2*iph1+N2*iph2$$

Figure 11:
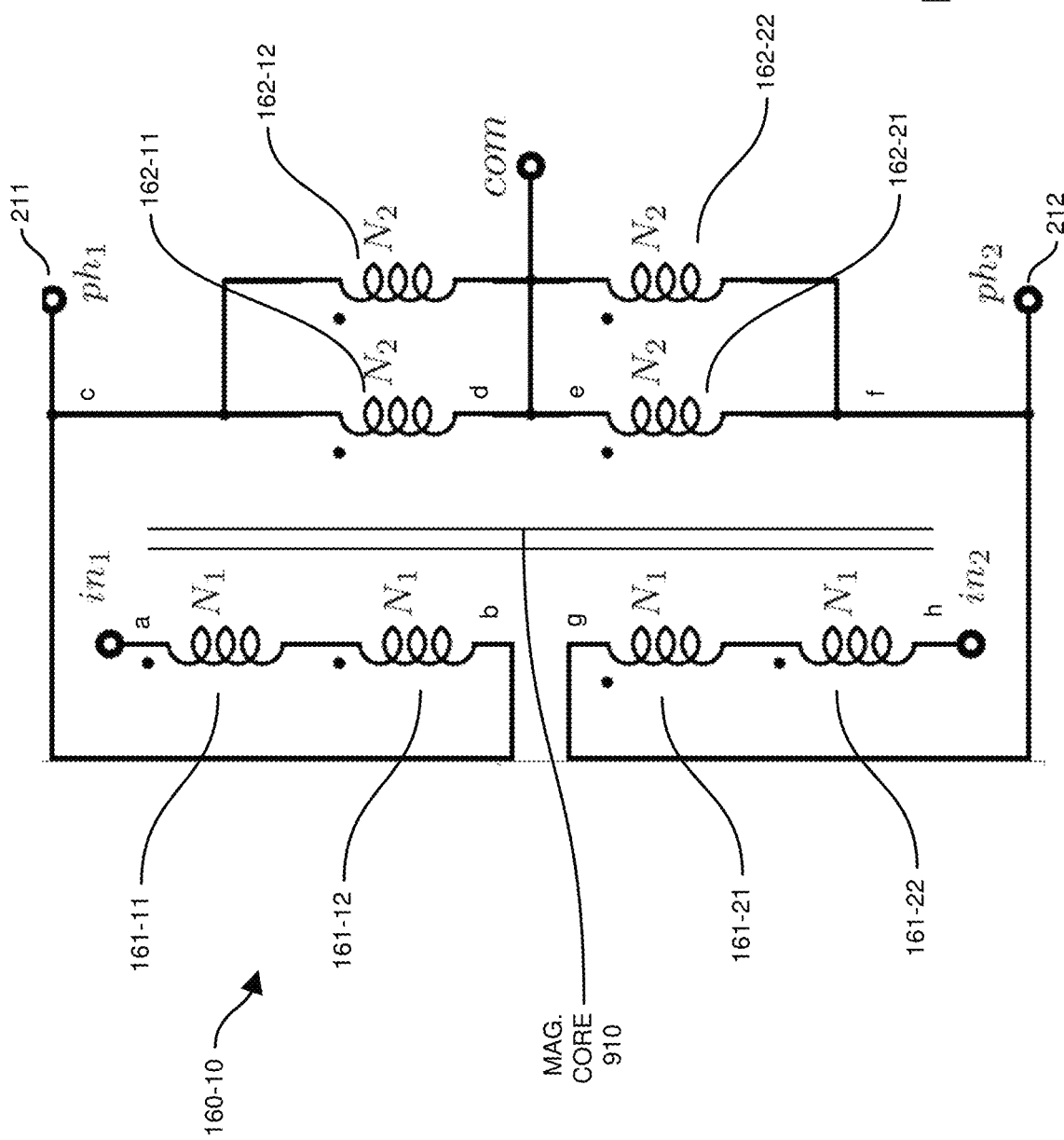
FIG. 11 is an example diagram illustrating details of a magnetic device implemented as a multi-tapped matrix autotransformer (MMTA with 2 elemental autotransformer) according to embodiments herein.

FIG. 11 is an example diagram illustrating details of a multi-tapped autotransformer according to embodiments herein.

To further increase the performance of the proposed power converter 112, the magnetic device 160 (such as multi-tapped autotransformer or other suitable entity) in FIG. 3 can be replaced with the enhanced multi-tapped autotransformer 160-10 as shown in FIG. 11.

In this example embodiment of FIG. 11, the multi-tapped autotransformer 160-10 is a multi-tapped matrix autotransformer including two inter-wired elements. Note that the number of inter-wired winding elements can vary depending on the embodiment. For example, the magnetic device 160 as described herein can include any number of input windings connected in series; the magnetic device 160 can include any number of output windings connected in parallel.

In this example embodiment of FIG. 11, the instantiation of the multi-tapped matrix autotransformer 160-10 includes: i) multiple (two) input windings 161-11 and 161-12 (N1 turns each) connected in series between nodes a and b, ii) multiple output windings 162-11 and 162-12 (N2 turns each) connected in parallel between nodes c and d, iii) multiple output windings 162-21 and 162-22 (N2 turns each) connected in parallel between nodes e and f, iv) multiple input winding windings 161-21 and 161-22 (N1 turns each) connected in series between nodes g and h.

As previously discussed, the actual ratio between input and output voltage depends on the ratio between windings N1 and N2 and number of windings in serial or parallel. When the multi-tapped matrix autotransformer (such as multi-tapped autotransformer 160-10 in FIG. 11) is implemented in the switched-capacitor converter 131 of prior figures, the ratio between input voltage Vin and output voltage Vout is given by the following equation:

$$Vin/Vout=4+2*(2N1)/N2$$

Figure 12:
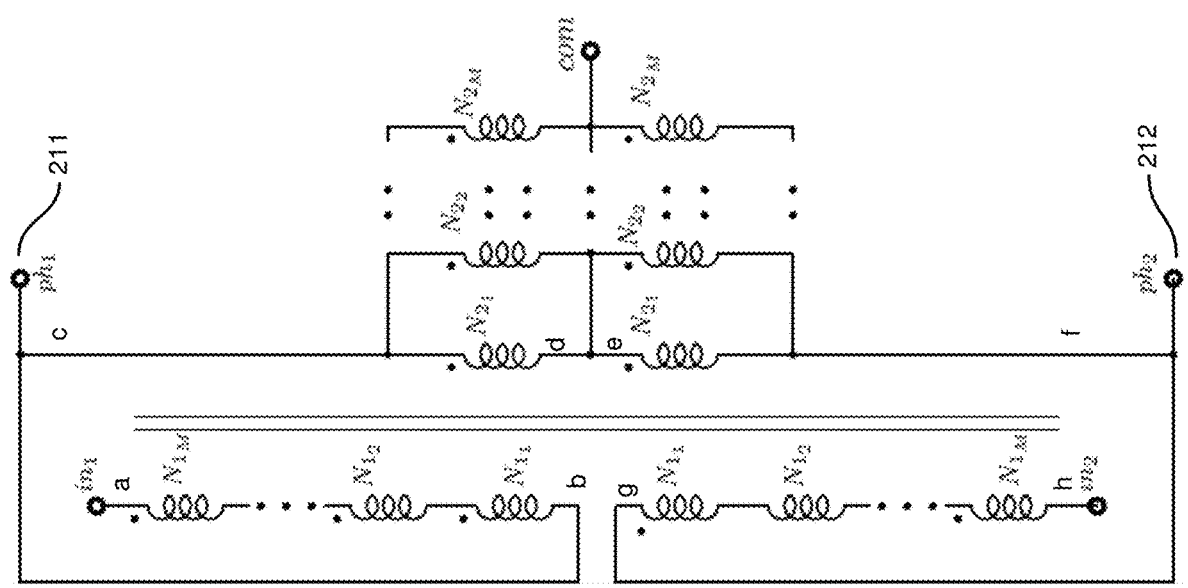
FIG. 12 is an example diagram illustrating details of a (matrix) multi-tapped autotransformer (with M elemental autotransformer) according to embodiments herein.

FIG. 12 is an example diagram illustrating details of a matrix multi-tapped autotransformer according to embodiments herein.

To further increase the performance of the proposed power converter 112, the magnetic device 160 can be implemented as an enhanced multi-tapped autotransformer 160-11 as shown in FIG. 12.

As shown in FIG. 12, the number of input windings and output windings in multi-tapped autotransformer 160-11 can vary depending on the embodiment. For example, in the above case of FIG. 10, there are M=2 input windings and output windings.

Note further that the magnetic device 160 as described herein as implemented in the switched-capacitor converter 131 can include any number of M (any integer value such as M=2, M=3, M=4, etc.) input windings (connected in series) and M (any integer value such as M=2, M=3, M=4, etc.) second windings (connected in parallel).

For example, multi-tapped matrix autotransformer 160-11 includes: multiple input windings N1M=N12=N11= ... = N1 coupled in series between node a and node b, multiple output windings N2M=N21=N22= ... =N2 coupled in parallel between node c and node d, multiple output windings (N21, N22, ... N2M) coupled in parallel between node e and node f, multiple input windings (N11, N12, ... N1M) coupled in series between node g and node h.

In such an instance, the ratio between input voltage Vin and output voltage Vout is given by the following equation:

$$Vin/Vout = 4 + 2(M*N1)/N2$$

where M (such as any in an integer value 1, 2, 3, 4, 5, 6, etc.) is the number of windings connected in series at the input side and the number of windings connected in parallel at output side output winding).

The benefits of implementing the magnetic device 160 as a multi-tapped autotransformer as magnetic device 160 as described herein, in the proposed topology, is that it can split current between output windings connected in parallel reducing the leakage inductance of the output side loop inductance and reducing the overall windings losses; moreover, if designed properly, this allows for flux cancellation.

In one embodiment, X=Y. Note that magnetic device 160 can be configured to include X input windings connected in series between nodes a and b; and X input windings connected in series between nodes g and h. In the same circuit, the magnetic device 160 can be configured to include X output windings connected in parallel between nodes c and d; and X second windings connected in parallel between nodes e and f.

Figure 13:
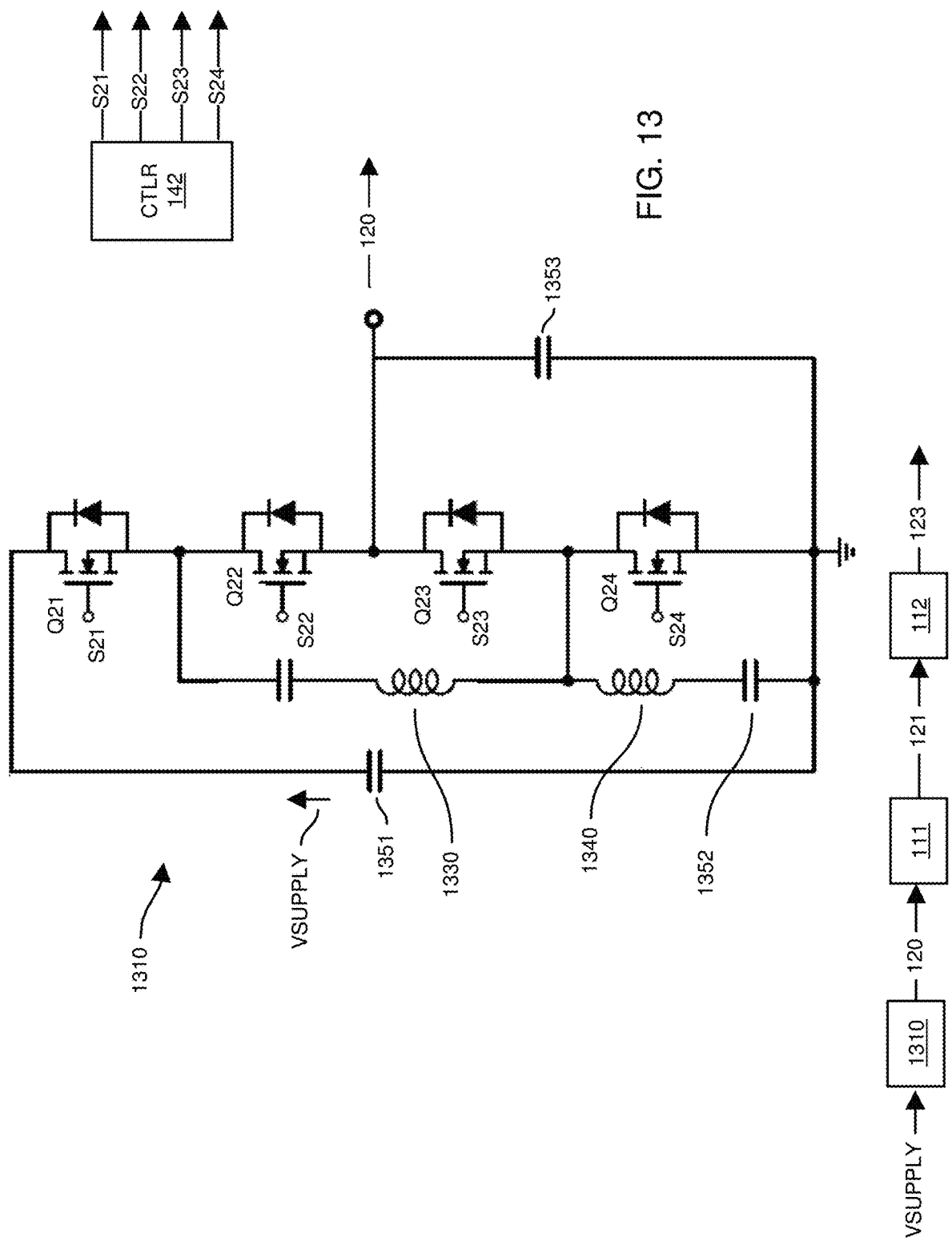
FIG. 13 is an example diagram illustrating conversion of a supply voltage (Vsupply) into an input voltage according to embodiments herein.

FIG. 13 is an example diagram illustrating a power converter according to embodiments herein.

In this example embodiment, the power supply 100 includes voltage converter 1310 including voltage source Vsupply, switches Q21, Q22, Q23, and Q24, inductors 1330 and 1340, capacitors 1351, 1352, and 1353.

In this example embodiment, the controller 142 generates controls signals S21, S22, S23, and S24. The control signals S21, S22, S23, and S24 control states of respective switches Q21, Q22, Q23, and Q24 to convert the received voltage Vsupply into the input voltage 120.

Note that implementation of the voltage converter 1310 in FIG. 13 is shown by way of a non-limiting example embodiment only. The voltage converter 1310 can be implemented in any suitable manner.

Note further that embodiments herein make it possible to reach high power density at high power level close to the load 118. For example, in one embodiment, the size of the magnetic component (such as magnetic device 160) is no longer defined by the output current level. By doing so, is there is only allow we are overcoming the limitations of the classic buck converter.

Figure 14:
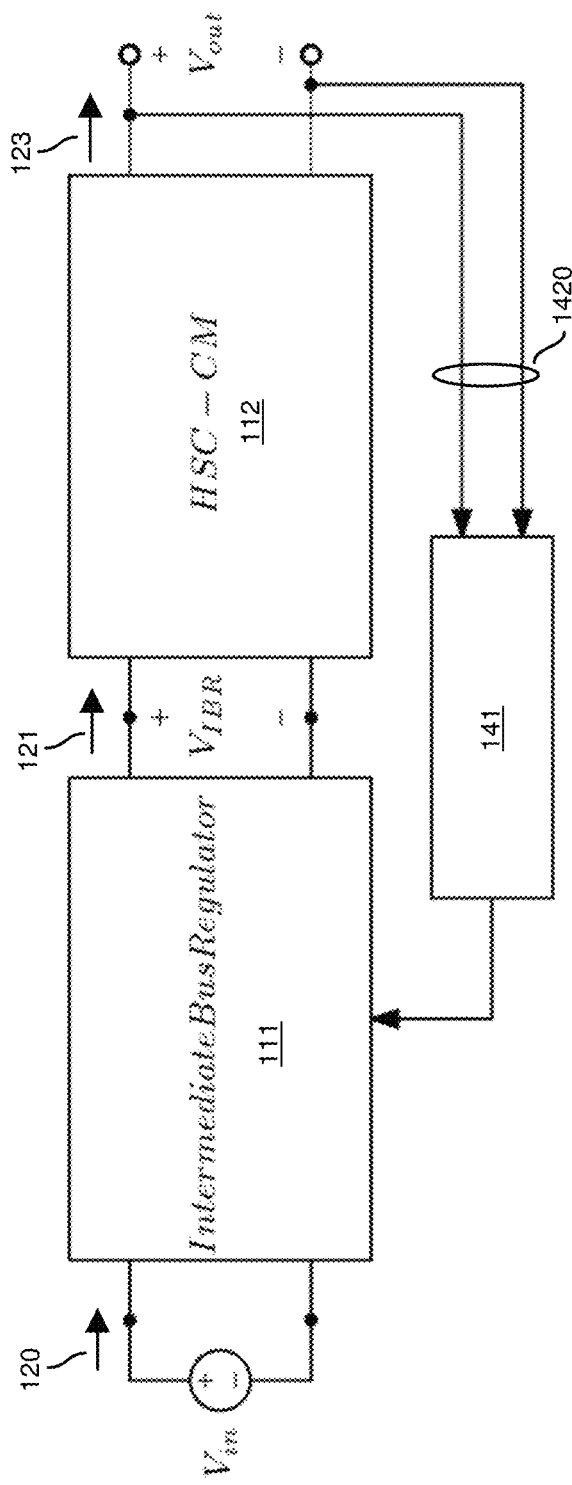
FIG. 14 is an example diagram illustrating a power supply according to embodiments herein.

More specifically, FIG. 14 shows an example power distribution architecture: a first stage (intermediate bus regulator such as an instantiation of power converter 111) receives power from a power source (Vin such as a 48V distribution bus on a server rack) and provides a regulated output voltage (VIBR such as output voltage 121) to a second stage power converter (HSC-CM such as power converter 112). The second stage is coupled at its input to an intermediate, regulated bus voltage and is coupled at its output to the digital load (such as load 118).

In one embodiment, the second stage (power converter 112) divides the input voltage at its output at a given ratio. The second stage is prone droop when the power converter 112 produces large output currents to div load 118. The second stage (HSC-CM) does not provide regulation. In accordance with further example embodiments, the first stage (such as power converter 111) receives a feedback signal (such as output voltage feedback signal 122-1) that is proportional to the output voltage 123 (Vout) of the second stage.

Since the dynamic behavior of the load 118 will affect the output voltage (Vout) with potential voltage drops along parasitic elements between the output of the second stage and the load itself, the feedback signal is better when corresponding respective traces (such as feedback path 1420 as shown) provide a voltage reading of the output voltage Vout as close as possible to the load 118. Ideally, the load 118 itself would provide this feedback by, for example, measuring the voltage within the load itself such as a CPU (Central Processing Unit).

Embodiments herein are novel and inventive in two major aspects: firstly by using a non-isolating power stage (such as power converter 112) as current multiplier, secondly by simultaneously providing electric power transfer and magnetic power transfer to the load 118 via the HSC-CM (power converter 112).

Further embodiments herein propose, more specifically a hybrid switched-capacitor converter, as a current multiplier, which includes a combination of switched capacitor elements with a multi-tapped autotransformer.

In one embodiment, the HSC-CM in FIG. 14 delivers a DC voltage 123 $V_{out}$ to the load 118. As previously discussed, the voltage 123, Vout, is a fixed fraction of the voltage 121, besides losses, of its input regulated voltage $V_{IBC}$. The voltage ratio step of HSC-CM is fixed by design, defined by n=$V_{IBR}/V_{out}$, which can be adjusted both through the Switching Capacitor (SC) cells of the HSC-CM arrangement and the implementation of the corresponding magnetic structure within same.

In one embodiment, the HSC-CM (such as power converter 112) in FIG. 14 is a non-isolated power converter featuring a very low output impedance.

In accordance with further embodiments, the HSC-CM in the architecture depicted in FIG. 14 is implemented as a current multiplier and voltage divider, which actually presents non-ideal behavior in different scenarios. For example, under a given load current $I_{out}$: HSC-CM has an internal effective resistance $R_{HSC-CM}$ which yields a voltage droop, which can be defined by the following equation:

$$\Delta V_{droop} = R_{HSC-CM} * I_{out}$$

In general the output voltage of HSC-CM presents roughly a linear dependency on the load as reported in the following equation.

$$V_{out} = \frac{V_{IBR}}{n} - R_{HSC-CM} * I_{out}$$

In this scenario to regulate the actual DC output voltage, the IBC regulates $V_{IBR}$ in order to get the target voltage $V_{ID}$ (i.e. targeted $V_{core}$ power input voltage of a digital load) on the output of HSC-CM.

under load transition $i_{out}$: during a transient event (change in current consumption by the load 118), the equivalent reactive impedance of HSC-CM can reduce the regulation capability of the system. In order to get the best dynamic performance, embodiments herein include operating the HSC-CM to essentially have a resistive behavior (i.e. reducing voltage dumps during an output current variation of HSC-CM).

In a typical voltage regulation application based on buck multiphase converter the behavior during a current variation presents a strong asymmetry between positive and negative load jumps or load increase and load release, respectively.

During a load increase (increase in current consumption by the load), the output voltage 123 dips as charge of the load is taken from the output capacitor, in this scenario, a high bandwidth control system (provided by controller 140) can mitigate this behavior by reacting fast at the load increase. In fact, in this phase the inductance receives charge from the input which actually allows a high slew rate in the output inductance of the buck.

Conversely, during load release, (transient reduction in current consumption by the load), the output voltage 123 is prone to overshoot because the stored energy in the output inductor and further parasitic inductances continue to deliver power to the load. In state-of-the-art multi-phase buck converters, the input voltage may vary between 12V and 6V, while the output voltage may vary between 1.8V and 0.7V.

In any case, the driving voltage across the inductor to increase the output current is always large in comparison to the negative driving voltage across the inductor to reduce the output current. Hence, there is an inevitable asymmetry in the response of the buck converter to dynamic load changes.

In a voltage mode control system using PID the only way to minimize the overshoot is to reduce the value of the output inductor and/or to add more decoupling capacitor on the output of the multiphase buck. In the proposed power architecture system as described herein, instead, by implementing a Hybrid Switching Capacitor (HSC) as a current multiplier, to supply the digital load, a symmetrical behavior is achieved both during a load increase and load release of the output current. This behavior is achieved because of the impedance of HSC-CM, which actually is behaving as a reservoir capacitor with a lumped resistive behavior.

In order to achieve an even better performance of the overall power system transferring power from e.g. 48V to the point-of-load, an additional stage (Intermediate Bus Converter) can be added before the Intermediate Bus Regulator converter stage. This architecture helps to reduce the voltage stress on the intermediate bus regulator, and allows use of lower voltage switches (such as MOSFETs) and hence better FoMs such as Ron*Qg and Ron*Qoss for the IBR stage.

Figure 15:
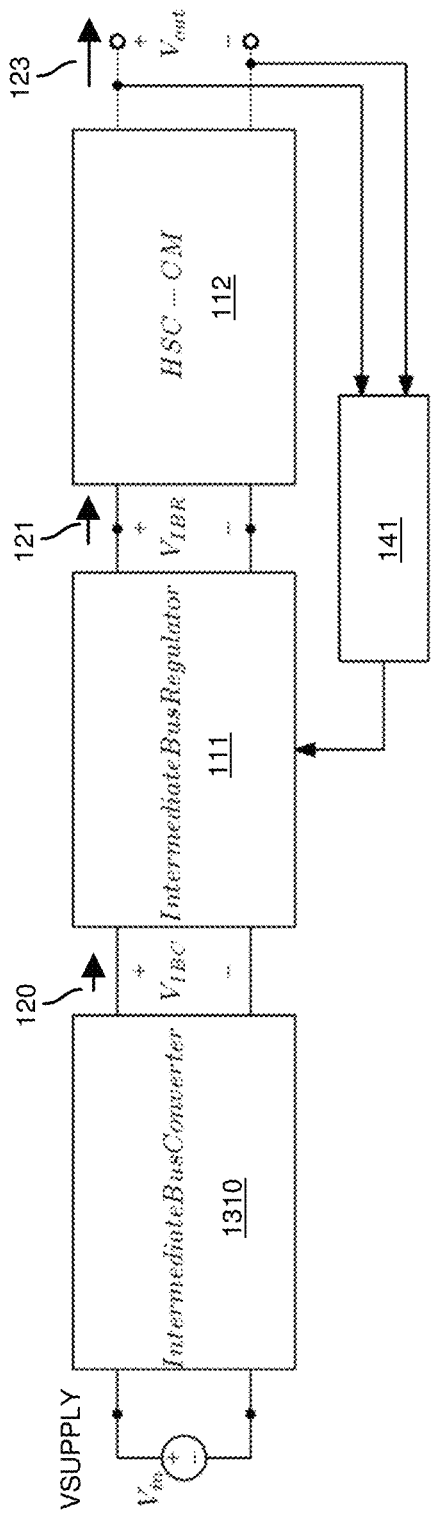
FIG. 15 is an example diagram illustrating a power supply according to embodiments herein.

FIG. 15 illustrates a proposed power system architecture with an additional intermediate bus converter 1310 providing a fraction of the input voltage Vin to the intermediate bus regulator 111. It is noteworthy that, in this concept, both the intermediate bus converter 1310 and the hybrid switched capacitor current-multiplier (HSC-CM) 112 are unregulated, while the intermediate bus regulator (middle stage such as power converter 111) is regulated as suggested by its name providing regulation.

Multi Rails Power Distribution Architecture

As modern multi-core processors for e.g. applications in Artificial Intelligence (AI) may have up to a few hundred individual cores, the input voltage for e.g. groups of cores may vary from each other. In other words there might not be one input voltage for the processor but the need for few up to e.g. a dozen of varying input voltages to a digital load such as an AI chip.

Figure 16B:
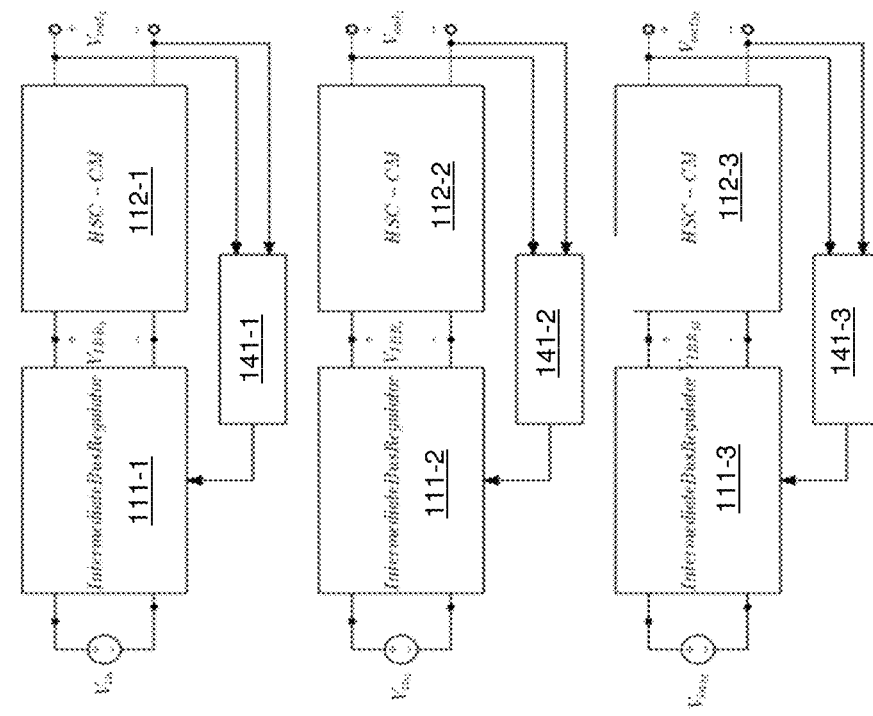
FIGS. 16A and 16B are example diagrams illustrating power supplies according to embodiments herein.
Figure 16A:
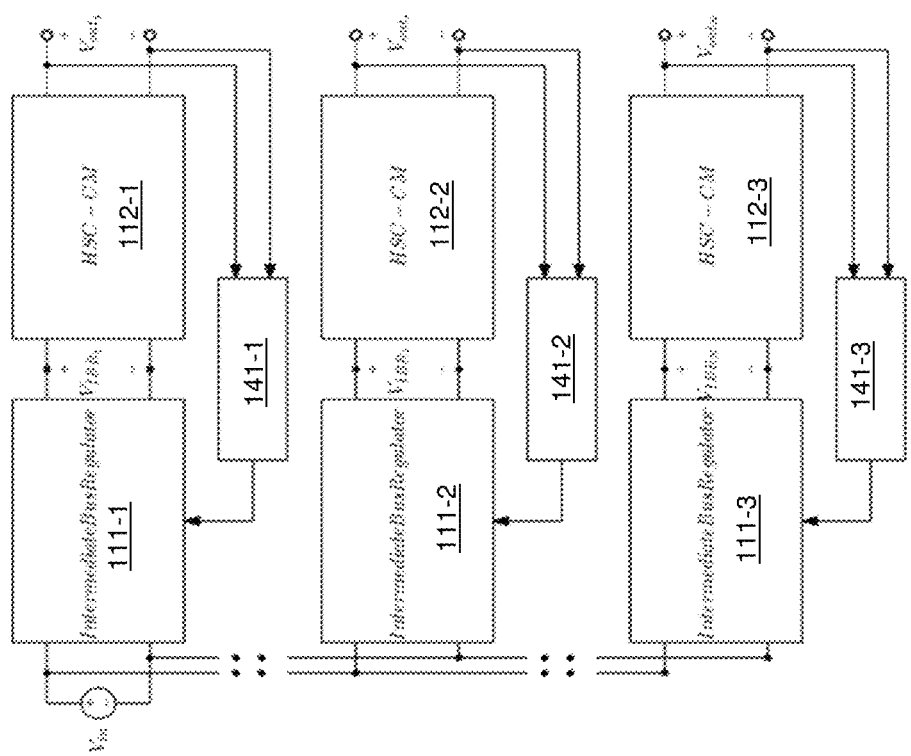

Embodiments herein propose hence an extension of the power architecture shown in FIG. 14 for multi-rail loads as shown in FIG. 16A.

Each voltage node is coupled to a series connection of an intermediate bus regulator and a HSC-CM.

In FIG. 16A, N intermediate bus regulator converters 111-1, 111-2, 111-3, etc., receive the power from the same input source (input voltage 120) converting the power to a $V_{IBR_i}$ rails which are distributed to voltage core rails $V_{out_i}$ through different HSC-CM converters 112 (i.e. one or more HSC-CM can be placed in parallel for the same voltage core defined by $V_{out_i}$).

In FIG. 16B, M intermediate bus regulator converters 111-1, 111-2, 111-3, etc., receive the power from M inputs source converting the power to a $V_{IBR_i}$ rails which are distributed to voltage core rails $V_{out_i}$ through different HSC-CM (i.e. one or more HSC-CM can be placed in parallel for the same voltage core defined by $V_{out_i}$).

Current Sharing Strategy in the Proposed Power System Architecture

Figure 17:
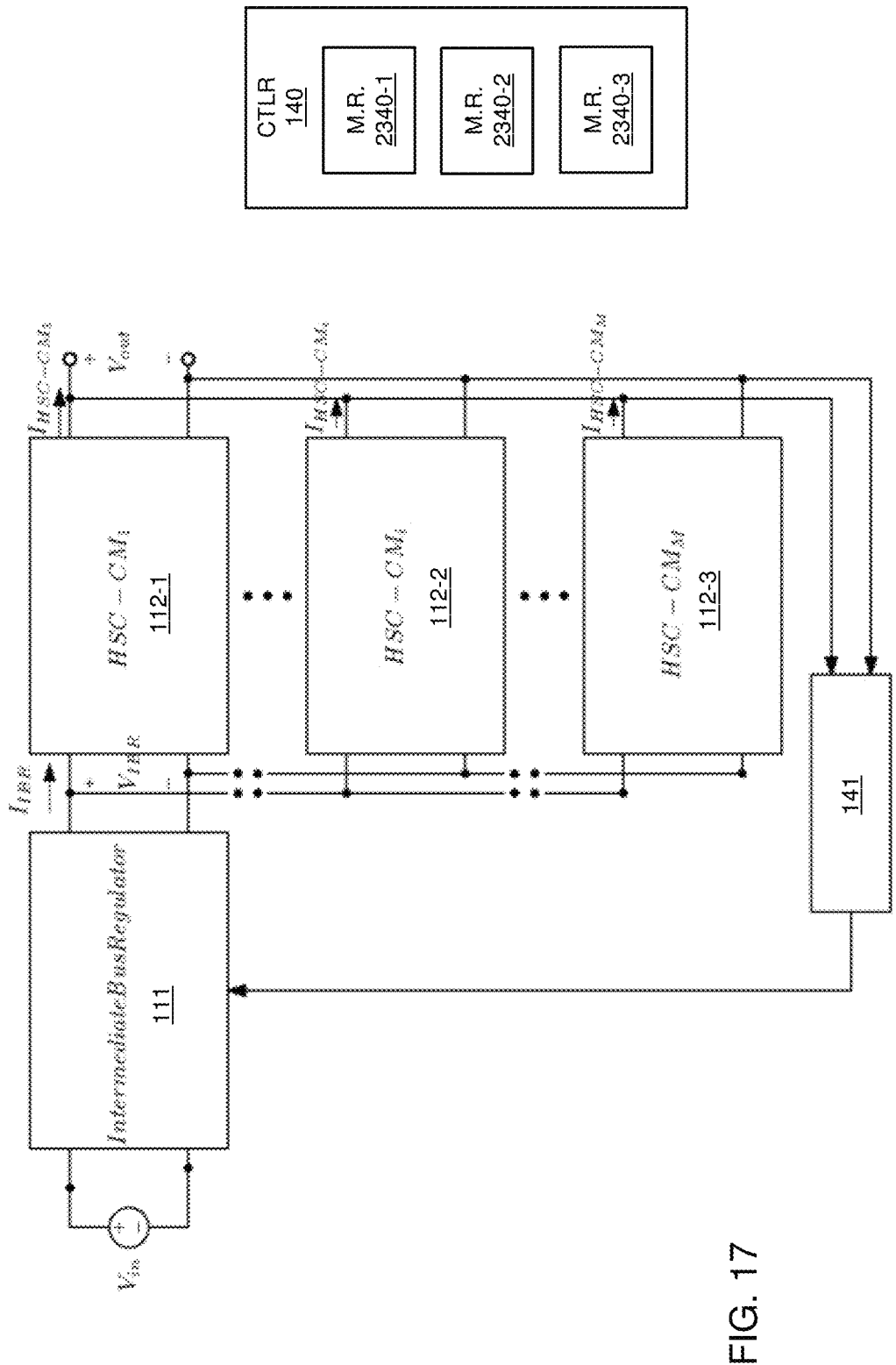
FIG. 17 is an example diagram illustrating a power supply according to embodiments herein.

In a typical multi-phase buck converter for digital loads, several power stages are parallelized in order to achieve high efficiency and high transient performance. In the proposed architecture, as shown in FIG. 14, a similar approach is needed for HSC-CM, whilst the intermediate bus regulator converter can be implemented either as one stage or in multi-stage approach. FIG. 17 is an example of the proposed power system architecture with a multi-phase approach for HSC-CM.

In the scenario depicted in FIG. 17, current sharing among paralleled HSC-CM (112-1, 1112-2, 112-3, etc.) is a function of the output impedance $R_{HSC-CM}$ of each HSC-CM. Referring to equation (2) the identical output voltage of the paralleled converter stages forces different output currents in the presence of slight impedance variations. The proposed HSC-CM converter has a high intrinsic tolerance to component variations. In other words, in a realistic design only small variations of the output impedance of paralleled stages are expected, which allows to operate the system even without individual current control in each of the phases.

However, an active current sharing control strategy can be implemented between each HSC-CM phase by an algorithm that matches all output impedance $R_{HSC-CM}$, or at least compensate the differences, by varying either switching frequency $f_{sw}$ of each power converter stage and/or the on-time powering phase (i.e., duration of the powered phase within one switching cycle). In one embodiment, the algorithm uses current information collected from each HSC-CM and the value of the output voltage.

Figure 18A:
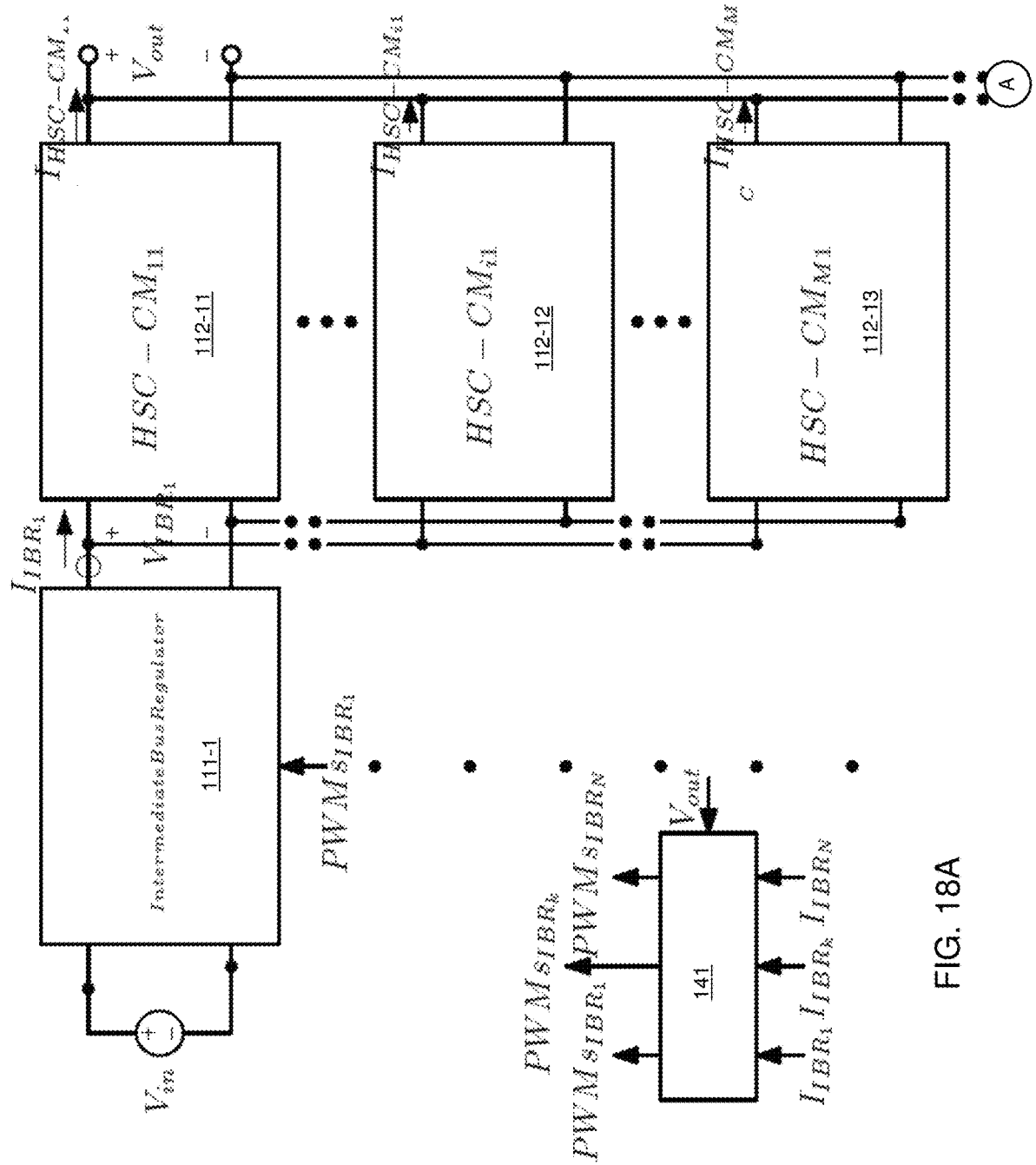
FIG. 18A and FIG. 18B combine to form an example diagram illustrating a power supply according to embodiments herein.
Figure 18B:
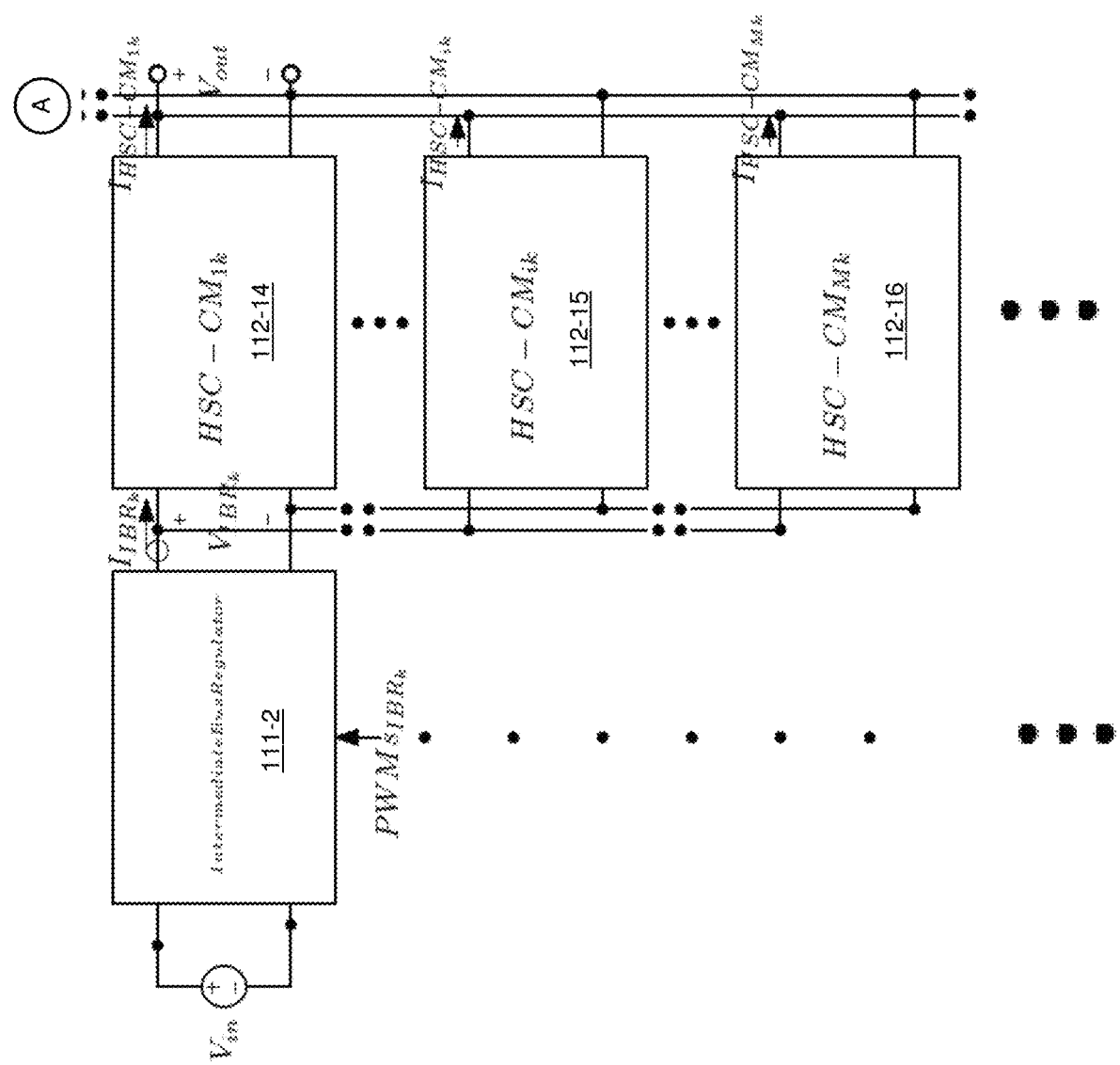

Alternatively, note that current sharing control can be implemented by using a multi-stage approach for the intermediate bus regulator as shown in FIGS. 18A and 18B. In this case, each HSC-CM or (as shown in FIGS. 18A and B), each group of paralleled HSC-CMs receives an individual regulated intermediate bus voltage. Since all HSC-CMs share the same output voltage, differences in the impedance of groups of HSC-CM stages can be regulated through varying of the respective intermediate bus voltages. This architecture strategy does not present drawbacks in the regulation system as the regulated voltage in this application is the core voltage.

Hybrid Switched Capacitor-Current Multiplier (HSC-CM)

Figure 19:
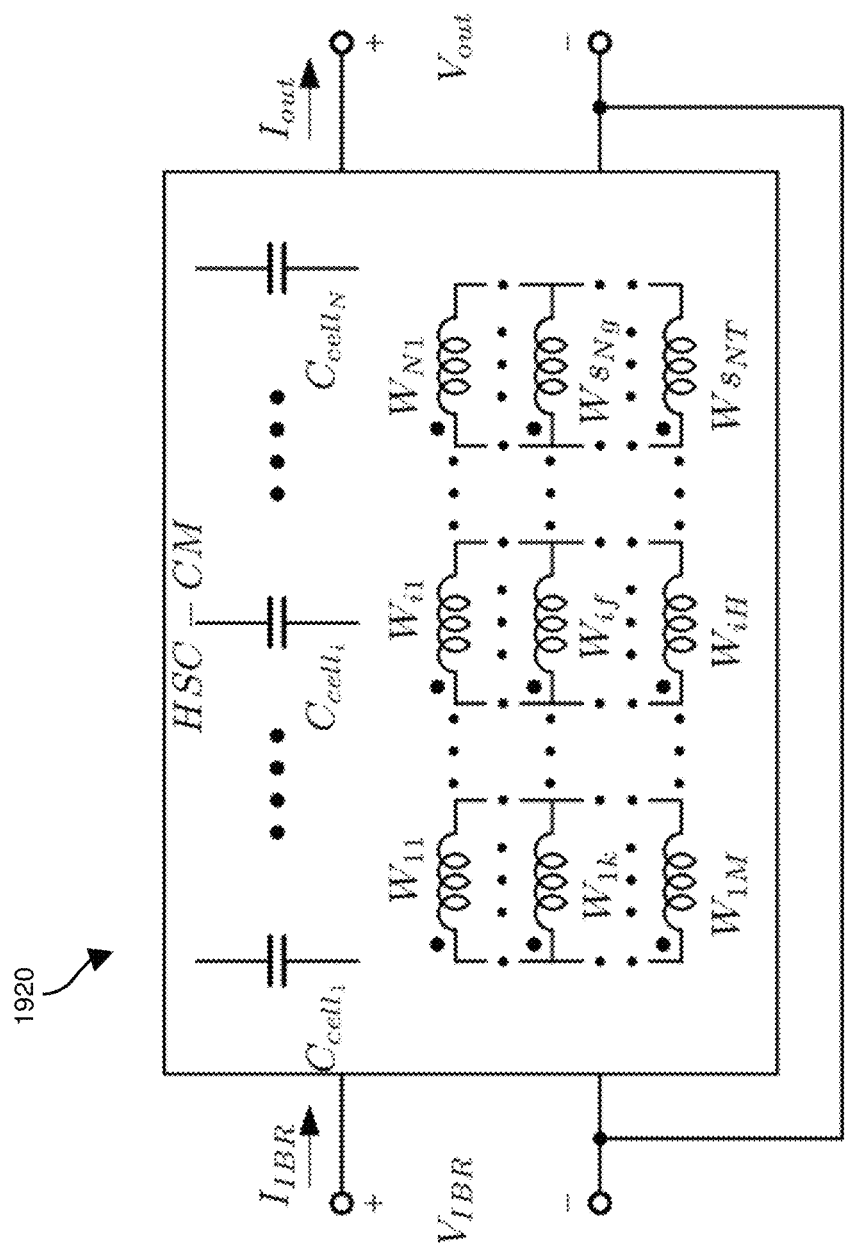
FIG. 19 is an example diagram illustrating a power supply and corresponding components according to embodiments herein.

As mentioned, the proposed HSC-CM comprises Switched Capacitor Cells (SCC) connected to a magnetic device, shown in the most general way in FIG. 19.

The Switched Capacitor Cells (SCC) include capacitors coupled to switching elements to provide a first division of the input voltage. The magnetic device comprises N windings connected in series with each winding having one or more windings physically connected in parallel as generally depicted in FIG. 19. All winding arrangements can be integrated into one magnetic core (magnetic device 160). This single core strategy creates large advantages for power density but is not required.

HSC-CM can be interpreted from its step down characteristic as a buck type converter, as it is dividing the input voltage $V_{IBR}$ to an output voltage rail $V_{out}$ with a fixed ratio n. Simultaneously, the input current of HSC-CM $I_{IBR}$ is multiplied by the same fixed ratio n so as $I_{out} = n*I_{IBC}$.

The proposed HSC-CM as shown in FIG. 19 is designed to provide high efficiency, high power density, scalability (i.e. several HSC-CM can be parallelized), low radiated electromagnetic noise (i.e. suitable for integration into the active substrate of digital loads), low output impedance and therefore high transient performance. Magnetic hardware 1920 is intended to be a generalization of HSC-CM which comprises switched capacitor cells and magnetic. The implementation of magnetic hardware 1920 such as one or more magnetic devices as shown in FIG. 19 ensures soft-charging of the switched capacitor cells reducing or eliminating short circuit losses, improving the utilization and performance of the capacitors and thus helping to achieve a high capacitive energy-density. In general a magnetic device creates an inductive impedance, whilst a switched capacitor cell presents a capacitive behavior.

In HSC-CM, merging switched capacitor cells and a magnetic device enables shaping of the current waveforms and voltage waveforms in an advantageous manner such as e.g. creating an overall resistive behavior of the converter. Moreover, the structure comprising switched capacitor cells and a magnetic device, enables two different power transferring modes, from $V_{IBR}$ to $V_{out}$, where the first one is a magnetic power transfer mode, (i.e. in an isolated dc-dc converter the power is transferred through a transformer) and the second is an electrical power transfer mode (i.e. in a classic switched capacitor converter the power is transferred between capacitance within an electric path).

HSC-CM can be designed as stand-alone stage without any regulation thus providing a division of the input voltage by a fixed ratio n and multiplying the input current by the same fixed ratio n. In this scenario, the complexity of the design can be drastically reduced. However, the HSC-CM can perform internal regulation, i.e., it can regulate its output impedance by modulating both switching-frequency f_sw and on-time (i.e. the time where the powering phase of the load is taking place), within certain boundaries. Note that the impedance regulation as described herein enables current sharing capability.

In HSC-CM high efficiency and low output impedance can be achieved by incorporating a Zero Voltage Switching ZVS and/or Zero Current Switching ZCS operation.

In accordance with further example embodiments, the HSC-CM as shown in FIG. 19, is formed by merging switching capacitor cells and a magnetic device with both elements being coupled to switching elements such as low voltage MOSFETs or GaN HEMTs. Both, switching capacitor cells and the magnetic device present non-ideal behavior (i.e. ESR losses in the capacitor, AC and DC resistance and core losses in the magnetic device). Moreover, conduction losses and switching losses in the switches (such as FETs), which from the HSC-CM, need to be taken into account, as well as PCB (Printed Circuit Board) losses. With a given amount of resistive losses in the HSC-CM converter, it is possible to define an equivalent resistive impedance of HSC-CM called $R_{HSC-CM}$ (i.e. is the open-loop output resistance of HSC-CM). A lower $R_{HSC-CM}$ will cause a smaller output voltage droop in HSC-CM under a given load current $I_{out}$, considering a fixed input voltage. Moreover, low $R_{HSC-CM}$ is advantageous in closed-loop operation since it reduces the voltage slew rate required at the input of HSC-CM, which is necessary to regulate the output voltage of HSC-CM, $V_{out}$. Thus, the preferred embodiment of a HSC-CM is realized by minimizing $R_{HSC-CM}$ by improving switching capacitor cells, magnetic device, minimizing PCB losses and using superior technology for the switching elements.

A resonant converter, being used as unregulated converter, demonstrated superior efficiency and low impedance behavior. As previously discussed, one embodiment herein includes an HSC-CM formed by switching capacitor cells and magnetic device coupled to switching elements in such a way as to form one or more series resonant circuits. One control strategy is to ensure resonant behavior of the current waveforms in HSC-CM where the switching frequency is equal or close to the resonant frequency of the tank forming the series resonant circuit. By operating at or in close vicinity to the resonant frequency of a respective voltage converter and by having all the switches running in zero voltage switching and/or zero current switching, the reactive impedances of each series resonant circuit tank are reduced or canceled. In such an instance, the output impedance of each HSC-CM presents essentially a desired resistive behavior $R_{HSC-CM}$, instead of reactive behavior.

Generally, in a series resonant tank a high Q factor defines a high reactive impedance with low resistive impedance, however, in order to achieve better transient performance, in the proposed power architecture a low Q factor (i.e. less than 10) is preferred. In such a scenario the HSC-CM is also acting as a reservoir capacitance, because a low Q factor and low resistance in the series resonant tank such as choosing a low value of the inductance and a high value for the capacitor in the series RC circuit is creating a capacitive storage element. This stored capacitive energy of the HSC-CM can provide reservoir energy during current transitions on the output of the HSC-CM.

In the HSC-CM, a high value of the Q factor (i.e. higher that 45) is not needed because soft-switching operation is guaranteed even with low Q factor. This may be beneficial since the state of the art of resonant power conversion (i.e. LLC topology) requires high Q factor in order to achieve Zero Current Switching ZCS conditions.

Current Sensing Strategy in a Hybrid Switched Capacitor-Current Multiplier

In one embodiment, implementation of current sensing protects the system against short circuit events or any abnormal overload condition. As previously discussed, the proposed HSC-CM includes switching capacitor cells and a respective one or more magnetic device. Current sensing may be incorporated either/both in the capacitor cells and/or the magnetic device. A lossless current sensing method is preferable in order to achieve high efficiency performance in the HSC-CM stage, therefore two general current sensing methods are proposed here:

- Current sensing in the switched capacitor cells: a possible good candidate, as a lossless current sensing method can be implemented, via controller 140, by sensing the voltage across the capacitors, which are forming the switched capacitor cells. In such a current sensing method the derivative part of the voltage, dV/dt, sensed across a suitable capacitor (i.e. in a switched capacitor cell the ripple voltage across one or more capacitor are useful for predicting the actual output current of the HSC-CM) is proportional with the load.
- Current sensing in the magnetic device: an alternative current sensing system can be implemented, via controller 140, by coupling one or more winding which are forming the magnetic device of one HSC-CM converter. In such scenario one or more auxiliary winding is/are connected on the magnetic device in order to measure the actual current flowing in the winding connected to the auxiliary windings.

Active Cell Impedance Control Algorithm for HSC-CM

In the HSC-CM, an active impedance optimization can be implemented by exploiting the typical symmetric behavior of the soft-switching operation for all switches such as FETs (Field Effect Transistors). In fact, in general, Hybrid Switched Capacitor can operate in Zero Voltage Switching ZVS, exploiting the presence of a magnetic device. Typically an HSC converter establish ZVS operation from the inductive energy in the magnetic device. When HSC-CM is not achieving ZVS operation the output resistance of HSC-CM can increase significantly, therefore an active algorithm should be implemented in such converter once multiple HSC-CM are placed in parallel to ensure proper ZVS operation Embodiments herein present a possible control system able to guarantee ZVS operation for paralleled HSC-CM converter (such as a control system keeping as example ZVS Tapped Hybrid SCC, but actually same concept can be applied to any Hybrid Switched Capacitor operating in ZVS) maintaining a simple control system and implementation method.

Current Sensing for ZVS Tapped Hybrid SCC Implemented with MTA

As previously discussed, the presence of a magnetic device 160 in the power converter 112 (such as HSC-CM) allows use of a lossless current sensing method. In one embodiment of the ZVS (Zero Voltage Switching) Tapped Hybrid SCC (Switched Capacitor Circuit) implemented with MTA, there are 4 windings from where it is possible to estimate the actual AC/DC (i.e. DC current if the sensing system is placed on $sec_1$ and/or $sec_2$) current flowing in the windings.

Figure 20:
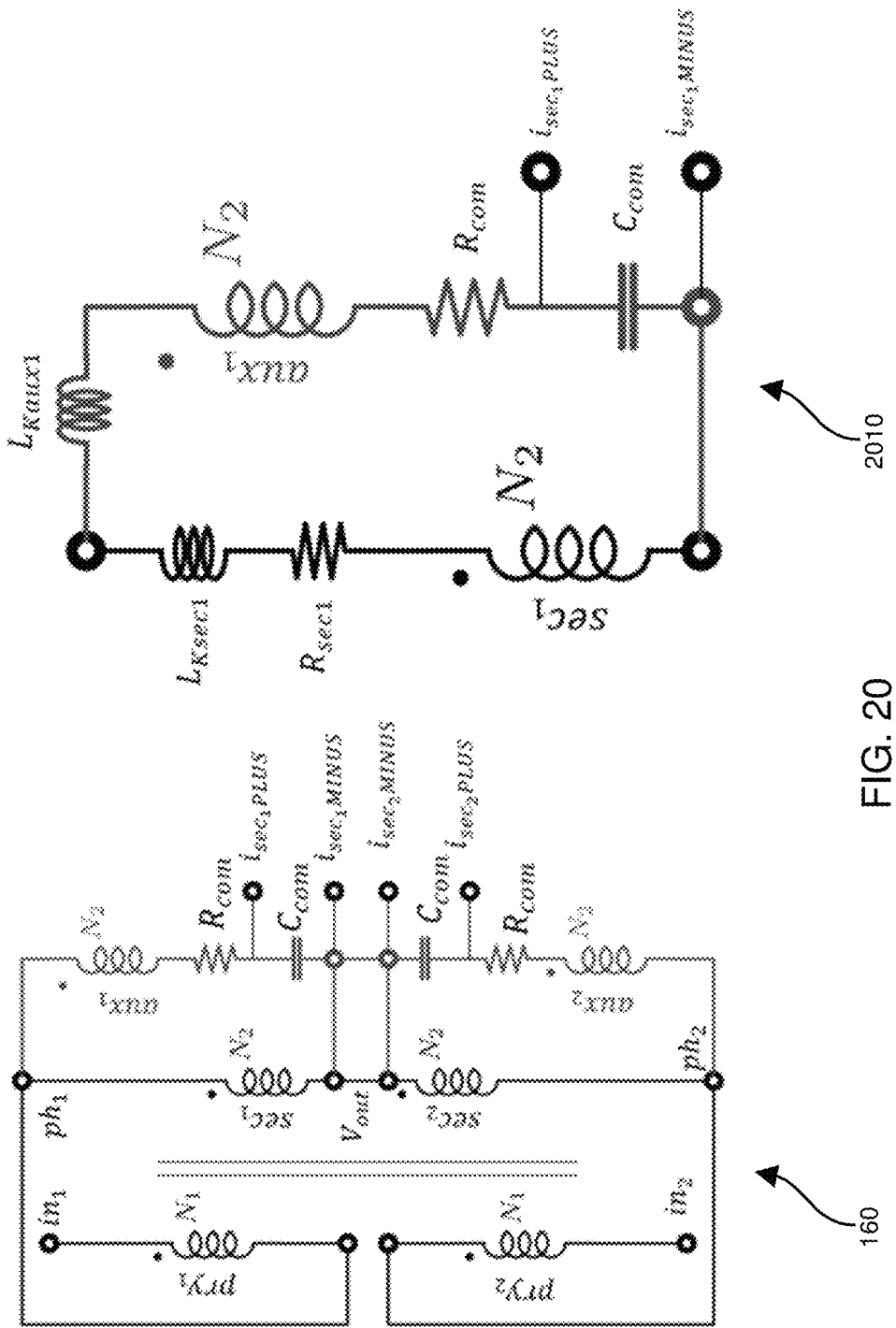
FIG. 20 is an example diagram illustrating a circuit according to embodiments herein.

In FIG. 20, the magnetic device 160 (such as implemented via an auto-transformer) is connected to two auxiliary windings (labeled aux1 and aux2), which are actually connected to their compensation network formed by $R_{com}$ and $C_{com}$. For sake of explanation, the circuit 2010 in FIG. 20 shows one output winding which is connected to an auxiliary winding.

As further shown in circuit 2010 of FIG. 20 is also shown the parasitic resistance $R_{sec1}$ (i.e. the equivalent resistance of the winding) and the parasitic inductance $L_{ksec1}$ of the winding $sec_1$. By coupling, as shown, $aux_1$ with $sec_1$, with the same winding turn, it is possible to cancel the induced voltage (i.e. in the scenario shown in magnetic device 160). The common mode voltage on the voltage across $C_{com}$ represents the output voltage and does not face the voltage ripple across $sec_1$) allowing to use a classic DCR (DC Resistance) method for magnetic device 160 (i.e. used to sense the actual current in the inductance of a buck converter with a lossless current sensing method). In such a scenario, if the network in circuit 2010 is properly compensated (i.e. $R_{com}C_{com}=L_{ksec1}/R_{sec1}$ in the example circuit 2010), a current monitor resource (such as control 140 or other suitable entity) calculates the current in the output windings by sensing the voltage across $C_{com}$. Such an approach can be applied to the input windings (pry1 and pry2), but actually—due to the higher common mode voltage—, the proposed solution of magnetic device 160 in FIG. 20, is more suitable to sense the current on the $sec_1$ and/or $sec_2$ winding. Moreover, this current sense approach can be easily extend to the multi-tapped auto transformer implementation.

ZVS Tapped Hybrid SCC as Hybrid Switched Capacitor-Current Multiplier in the Proposed Power Architecture As previously discussed, the power converter 112 in power supply 100 of FIG. 1 (and HSC-CM in FIG. 14) is implemented as an unregulated current multiplier module, which is basically dividing the output voltage 121 from the power converter 111 (such as a regulated intermediate bus $V_{IBR}$) and is multiplying the actual current at the $V_{IBR}$ node to the output voltage 123 of power converter 112 (HSC-CM $V_{out}$) with a fixed value defined by design. As previously discussed, if a ZVS Tapped Hybrid SCC is used as HSC-CM, the multiplication value of the current from the input of HSC-CM to the output is defined by the ratio $N_1/N_2$ of the MTA (Multi-Tapped Autotransformer) windings or MMTA windings. The regulation of the output voltage $V_{out}$, as previously reported, is established at the power converter 111 (Intermediate Regulator Bus stage), which can be designed with any buck buck/boost and boost or with isolated or non-isolated converter topology depending on the requirement of the application. Due to high dynamic requirements relatively high switching frequency and hence at least partial zero voltage switching operation is desired in the intermediate bus regulator (power converter 111).

As previously discussed, FIG. 15 illustrates an alternative power architecture which comprises three stages, where the first-stage can be any suitable power converter (such as an IBC unregulated buck type converter or other suitable resource) and the second-stage can be any suitable power converter such as any regulated buck, buck/boost and boost converter, etc., or other suitable resource. The advantages of this architecture is to run the regulated converter at low input voltage taking advantages by the improved FoMs of MOSFET technology with lower voltage rating.

In order to get understanding on the benefit of the proposed power system architecture only the two-stage architecture approach, reported in FIG. 14, will be explained. However, all the evidences can be applied to the second power system architecture reported in FIG. 15.

Considering the power system architecture shown in FIG. 14, in the absence of any regulation from the IBC regulated stage, and under the assumption that $V_{IBC}$ is constant for any load condition, the output voltage of HSC-CM will depend on the actual load condition because the output resistance of HSC-CM is not negligible. In order to understand the effect on the regulation of the overall system an accurate model of the output impedance is needed.

For an HSC-CM the output impedance is proportional to the overall resistance of each SC cell and the magnetic device and also switch (MOSFETs) resistance. Considering ZVS Tapped Hybrid SCC with MTA as HSC-CM, the real part of the output impedance depends on the ESR of resonant capacitors $C_{res1}$ and $C_{res2}$, MOSFET resistance $R_{ds,on}$ and the parasitic resistance of the MTA.

Output Impedance of HSC-CM in Case of Using a ZVS Tapped Hybrid SCC

Figure 21:
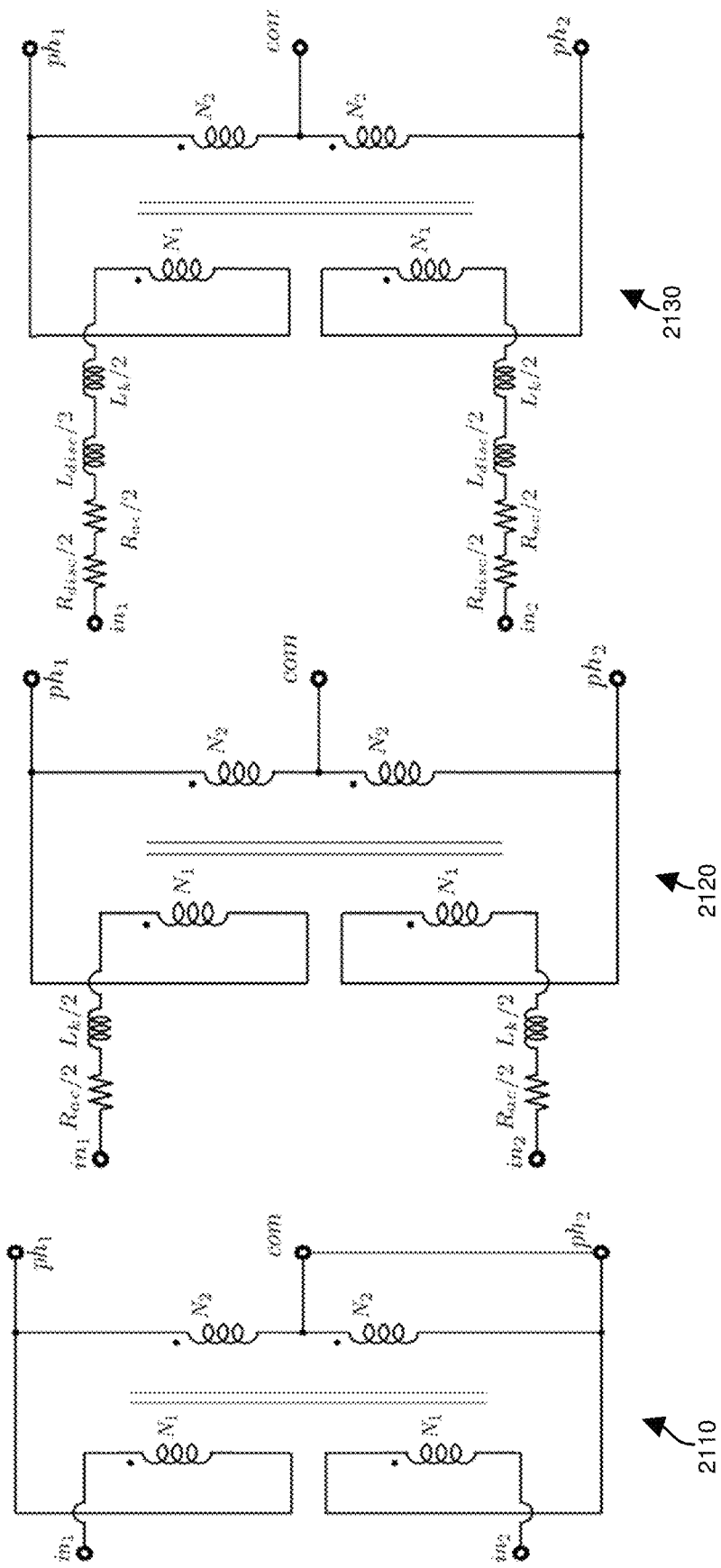
FIG. 21 is an example diagram illustrating circuit according to embodiments herein.

In order to understand the actual output impedance of HSC-CM considering ZVS Tapped Hybrid SCC with MTA as proposed topology, an equivalent model of MTA is needed. FIG. 21 includes the test circuit, which is defining the actual parasitic network of the powering phase during $t_3$-$t_4$. As shown in FIG. 21, circuit 2110, the test condition, to define the actual parasitic impedance of the MTA, is done by shorting corn with ph$_2$ node. The same test can be done to evaluate the equivalent parasitic network during phase $t_1$-$t_2$, and since, both powering phases are symmetric, the equivalent circuit can be represented as in circuit 2120 of FIG. 21, from the test condition applied to circuit 2110.

As previously discussed, in the ZVS Tapped Hybrid SCC, the soft-charging of the flying capacitor $C_{res1}$ and $C_{res2}$ is achieved by the resonance between $C_{res1}$ with $L_k/2$ and $C_{res2}$ with $L_k/2$, this is true under the assumption that $L_k$ of the MTA is dominating the equivalent loop inductance faced by both resonant transitions. In general an MTA designed as HSC-CM requires low $R_{ac}$ which is typically achieved by interleaving the windings of the MTA, which in turn leads to a low leakage inductance $L_k$. In this scenario, the resonant transition depends also on the parasitic inductance of the capacitor and FETs, therefore an improved model of ZVS Tapped Hybrid SCC, using MTA is needed.

The circuit 2130 in FIG. 21 is a final equivalent model of the MTA including the parasitics of the entire structure of the ZVS Tapped Hybrid SCC, where:
- $L_k$ is defining the leakage inductance of the MTA
- $R_{ac}$ is defining the parasitic resistance of MTA
- $L_{disc}$ is including the parasitic inductance of the FETs of ZVS Tapped Hybrid SCC and the parasitic inductance of all capacitors within the resonant loop
- $R_{disc}$ is including ESR of the ceramic capacitors, the $R_{ds,on}$ of FETs and the PCB resistance within the resonant path.

Considering the ZVS Tapped Hybrid SCC topology as HSC-CM, under the assumption that the converter is running at its resonant frequency, and both resonant transitions are matched (i.e. $C_{res1}$=$C_{res2}$) and considering that all FETs are running in soft-switching, the converter's open-loop resistance can be approximately estimated by the following equation:

$$R_{out} = \frac{\pi^2}{8} \frac{R_{cell}}{2} \text{ where } R_{cell} = \left(\frac{R_{ac}}{2} + \frac{R_{disc}}{2}\right)\left(\frac{1}{4+2\frac{N_1}{N_2}}\right)^2.$$

The mentioned output resistance, considering a fixed input voltage for HSC-CM implemented with ZVS Tapped Hybrid SCC, is causing voltage droop at the output of HSC-CM, however, due to the low $R_{ac}$ of MTA/MMTA and due to the low $R_{disc}$ (i.e. because of low voltage class FETs can be used in this application) the actual output voltage $V_{out}$ droop is mitigated. Moreover, due to the presence of two Switching Capacitor cells, the overall output impedance is further reduced, therefore, the output voltage droop is significantly reduced in this approach. This demonstrates that the ZVS Tapped Hybrid SC converter is a very suitable candidate to be used as Hybrid Switched Capacitor Current Multiplier for the proposed power architecture.

Closed Loop Behavior of the Proposed Power Architecture Using ZVS Tapped Hybrid SCC as HSC-CM Considering the power architecture depicted in FIG. 14, where the regulation of $V_{ow}$ is achieved by regulating the $V_{IBR}$ voltage, and by implementing, a ZVS Tapped Hybrid SCC as HSC-CM, the system regulation takes advantage from the low resistive output impedance under closed-loop operation. In addition the voltage slew rate required for the IBC regulated stage is significantly reduced. However, as previously reported, a preferable series resonant circuit, forming the HSC-CM, requires a low Q factor. In this scenario, the equivalent series resonant circuit of the proposed ZVS Tapped Hybrid SCC acting as HSC-CM.

In ZVS Tapped Hybrid SC converter, as already discussed, there are two resonant modes which are depending on the leakage inductance of MTA or MMTA and by the two resonant capacitors $C_{res1}$ and $C_{res2}$. Assuming both resonant circuit paths have the same parasitic inductance (i.e. each series resonant tank circuit has $$L_{res} = \frac{L_k}{2} + \frac{L_{disc}}{2})$$

and $C_{res}$=$C_{res1}$=$C_{res2}$, it follows that both series resonant circuit present the same equivalent resonant tank (and operate at a same resonant frequency. This behavior is desirable for the option to operate the HSC-CM unregulated. In this scenario the Q factor is defined by the following equation:

$$Q = \frac{1}{\frac{R_{ac}}{2} + \frac{R_{disc}}{2}} \sqrt{\frac{L_{res}}{C_{res}}}$$

As discussed, the HSC-CM power converter is also acting as a reservoir capacitor. This is true with low Q factor, since the serial capacitive energy stored is proportional to $C_{res}$. Therefore, low Q factor in the series resonant tank is reducing the voltage dump on the output of ZVS Tapped Hybrid SCC during a load current transition. Low Q factor is beneficial for high bandwidth performance of the HSC-CM.

In one embodiment, the input voltage $V_{IBR}$ (FIG. 14) or output voltage 121 (FIG. 1) needs to be regulated in order to get the target voltage 123 on the output of HSC-CM (i.e. by using ZVS Tapped Hybrid SCC); this is achieved by using a feedback signal derived from the output voltage of HSC-CM (i.e. feedback signal sensed closed to the digital load). In this scenario the overall transient performance depends also on the Intermediate Bus Regulator converter which can, e.g., be implemented in buck buck/boost or boost topology or via other suitable technology.

Figure 22:
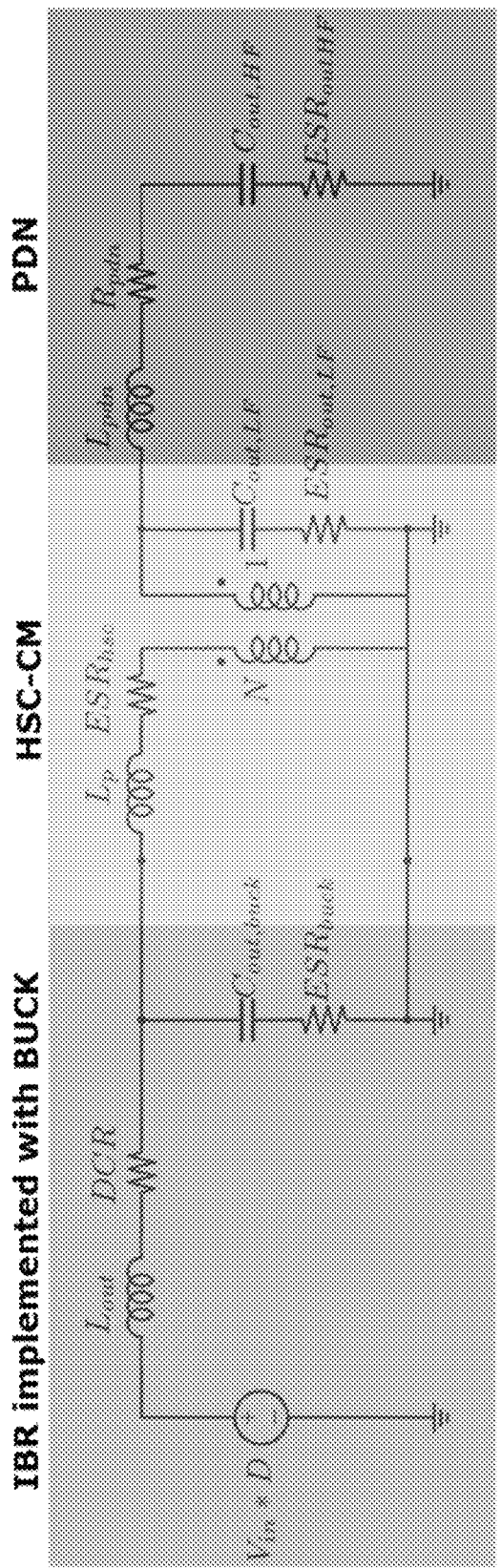
FIG. 22 is an example diagram illustrating of a circuit model according to embodiments herein.

Considering the IBC converter implemented with a buck derived topology a simplified equivalent small-signal model, of the power architecture, is shown in FIG. 22. The equivalent small signal model 2200 shown in FIG. 22 comprises an Intermediate Bus Regulator implemented with a buck converter topology (defined by the main parameters $L_{out}$, DCR, $C_{out,buck}$ and, $ESR_{buck}$). Instead, the HSC-CM, as previously discussed, presents a dominant resistive behaviour due to the resistance of each HSC-CM cell, which is modelled by $ESR_{hSC}$. However, as discussed the Q factor plays a role in the overall transient performance, therefore an inductive behaviour $L_p$ (i.e. $L_p$ comprises the inductive behaviour of the HSC-CM and the PDN inductance from the Intermediate Bus Regulator to each HSC-CM cell) needs to be added. Moreover, the reservoir capacitance behaviour of HSC-CM has to be added modelled by $C_{out,LF}$ (i.e., comprises the capacitive behaviour of HSC-CM, reported on the output of the converter, and the actual output capacitance placed on the output voltage rail of the converter). Finally, at the load, in one embodiment, there is the Power Delivery Network (PDN) impedance which can be approximately defined by an inductance $L_{pdn}$ (defines the inductance between HSC-CM and the digital load), $R_{pdn}$ (defines the resistance between HSC-CM and the digital load) and $C_{out,HF}$ (defines the actual capacitance placed nearby to the digital input power load).

From such small signal model it results that the overall transient performance depends also from the bandwidth BW of the Intermediate Bus Regulator converter, however the requirements on such stage are mitigated by the presence of the Hybrid Switched Capacitor Current Multiplier. This desirable behavior comes from the fact, that the output current at the IBR stage is by factor n lower than the output current of the HSC-CM stage.

Multiphase Approach on ZVS Tapped Hybrid SCC as HSC-CM and Current Sharing Strategy In order to achieve high efficiency and transient performance, as previously reported, individual HSC-CM stages need to be parallelized. As previously reported in the absence of an active current sharing algorithm the current sharing is provided naturally dependent on the actual output resistance of each HSC-CM. In ZVS Tapped Hybrid SCC the output impedance depends on $R_{cell}$ which is actually depends on the MTA impedance, FETs resistance, ESR resistance of capacitance and soft-switching conditions. In general, the realization of nearly identical magnetic devices (i.e. same MTA/MMTA for each cell), FETs resistance and capacitance resistance can be easily achieved at design level. However, as previously reported, in ZVS Tapped Hybrid SCC the soft-switching operation depends on the actual magnetizing inductance of MTA, MMTA or from an external inductance $L_{ZVS}$; therefore all switching are operating at least in Zero Voltage Switching. In this scenario it's easier to match the output impedance of each ZVS Tapped Hybrid SCC working as HSC-CM within a small error. Thereby, $R_{cell}$ of each of ZVS Tapped Hybrid SCC, working as HSC-CM, can be easily achieved without any additional active control algorithm if an optimal magnetizing inductance matching between different cells is achieved.

Current Sharing Optimization, in Parallel HSC-CM Implemented with ZVS Tapped Hybrid SCC As previously discussed, the multiple ZVS Tapped Hybrid SCC acting as HSC-CM can be placed in parallel without suffering too much on current sharing issue since the tolerance between components does not influence considerably the output resistance difference between ZVS Tapped Hybrid SCC (or any HSC-CM topology) placed in parallel. However, if soft switching is not achieved the output impedance would change. Therefore, an active control system, able to guarantee soft-switching, without or at least very limited, body diode conduction of the switching elements is presented for ZVS Tapped Hybrid SCC. The system algorithm here illustrated can be extended to any Hybrid Switching Capacitor converter operating in ZVS.

In ZVS Tapped Hybrid SCC, considering FIG. 3, during dead-time operation (i.e. during $t_1$-$t_2$ and $t_3$-$t_4$ referred to FIG. 5) the parasitic output capacitance of each FETs is discharged or charged respectively in order to achieve ZVS condition. This operation mode represents a non-ideal behavior.

Considering the converter depicted in FIG. 3, the inductive energy stored in $L_{zvs}$ (It can alternatively be integrated in the MTA or MMTA) ensures ZVS operation by providing the inductive energy needed to charge and discharge the parasitic capacitance of each FETs, which actually is referred to as capacitive energy. In general, in such system, the basic condition needed to achieve ZVS is that the inductive energy is higher than the capacitive energy. Now, by considering this condition there are three different scenarios how to operate the converter:

Short dead-time: if there is not enough dead-time between $PWM_A$ (signal 105-1) and $PWM_B$ (signal 105-2) the $V_{ds}$ voltages across FETs in the pc 112 do not achieve ZVS and the converter is running in partial hard-switching.

Correct dead-time: if the dead-time between $PWM_A$ and $PWM_B$ is enough to establish ZVS without having long body diode conduction of the FETs the converter is running at the best operating point.

Longer dead-time: if the dead-time between $PWM_A$ and $PWM_B$ is too long. The body diode conducts leading to additional losses in the FETs.

As highlighted, the ZVS Tapped Hybrid SCC presents a symmetrical behavior in all FETs (switches) during ZVS operation even if the FETs are residing in different voltage domains (this is a typical behavior of Hybrid Switched Capacitor converter). Thus, by sensing (monitoring) the $V_{ds}$ voltage across $Q_3$ and $Q_6$ (i.e., such as with a kelvin sense on the actual drain-to-source voltage inside/outside the package of the FETs), embodiments herein include detecting body diode conduction of all FETs in the converter. In general, note that this can be extended as general concept to any Hybrid Switched Capacitor converter by sensing their low side FETs $V_{ds}$.

Thus, embodiments herein include a monitor resource 2340 associated with controller 140. With reference to FIG. 17, the monitor resource 2340-1 monitors body diode conduction conditions of a respective switch in a first switched-capacitor converter (such as power converter 112-1), monitor resource 2340-2 monitors body diode conduction conditions associated with the second switched-capacitor converter (such as power converter 112-2), monitor resource 2340-3 monitors body diode conduction conditions associated with the third switched-capacitor converter (such as power converter 112-3), etc.

In one embodiment, the monitor resource 2340-1 and corresponding controller 140 further dynamically adjust dead-time settings of the first switched-capacitor converter (power converter 112-1) based on detected body diode conduction conditions (detected voltage across drain D and source S of switch Q3 and detected voltage across drain D and source S of switch Q6) associated with the first switched-capacitor converter in power converter 112-1; the monitor resource 2340-2 and corresponding controller 140 further dynamically adjust dead-time settings of the second switched-capacitor converter (in power converter 112-2) based on detected body diode conduction conditions associated with the second switched-capacitor converter; the monitor resource 2340-3 and controller 140 further dynamically adjust dead-time settings of the third switched-capacitor converter (power converter 112-3) based on detected body diode conduction conditions associated with the third switched-capacitor converter in power converter 112-3; and so on.

In one embodiment, as further discussed below, the dynamically adjusted frequency settings of individually controlling operation of the power converters 112-1, 112-2, 112-3, etc., equalizes an impedance of the power converters with each other.

Figure 23:
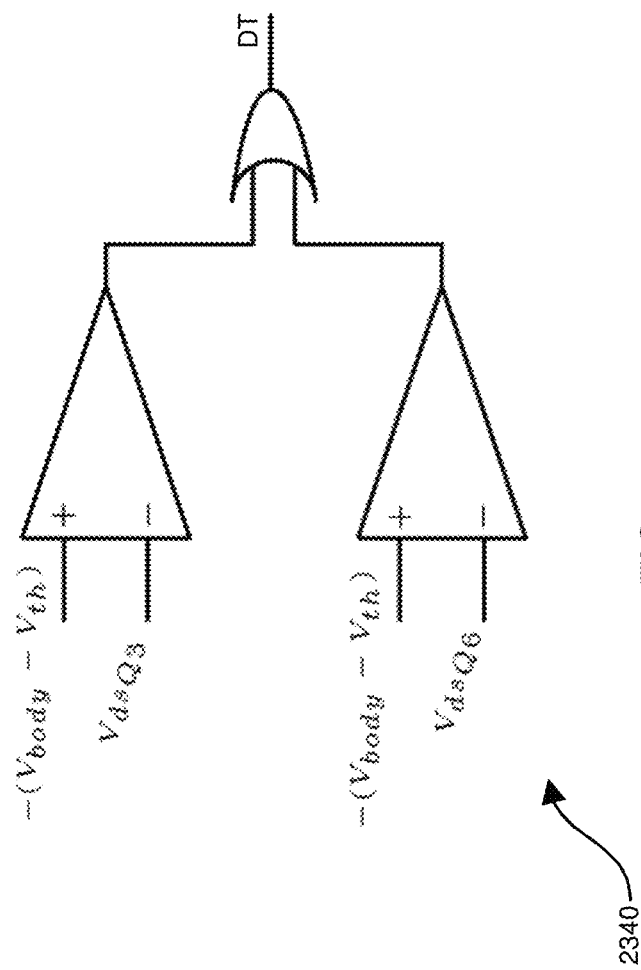
FIG. 23 is an example diagram illustrating body diode conduction monitor according to embodiments herein.

Considering the system depicted in FIG. 23, the $V_{ds_{Q3}}$ and $V_{ds_{Q6}}$ associated with each power converter 112, which are ideally filtered (i.e. only high frequency noise filtered, since the system has to detect small variations of body diode forward voltage drop), are compared with the internal body diode forward voltage $V_{body}$ (depends on the technology of the FETs, typically can be between 200 mV and 700 mV) minus a fixed threshold value $V_{th}$ (is required because the body diode voltage can change, depending on the condition the system is running or technology of the FETs). Via monitoring, the monitor resource 2340 in FIG. 23 detects when the output signal D rises. When body diode conduction occurs in one of the low side FETs, the magnitude of the signal D from monitor resource 2340 rises.

Due to the symmetry of the system, if body diode conduction takes place in switch $Q_3$ of a respective switched-capacitor converter, this is happening also in switch $Q_6$ and vice versa, within the same switching cycle. Embodiments herein include monitoring one or two switches in each monitored power converter 112 and then deducing when ZVS operation occurs in all switches for that power converter.

In an HSC-CM multiphase system, to reduce as much as possible the output voltage ripple, the powering phase of each HSC-CM placed in parallel are symmetrically phase shifted and each HSC-CM presents its master PWM called $PWM_{phase_k}$ (i.e. where k is varying from 1 to M where M are the phases in parallel). In this scenario all phases are running at the same switching frequency, reducing the implementation effort and frequency beat issue.

Now, considering only one cell which presents its own master $PWM_{phase_k}$, where the rising edge is defining the rising edge of $PWM_{A_k}$ (i.e. $PWM_{A_k}$ is referred to $Q_1$, $Q_3$ and $Q_5$ FETs considering FIG. 3) and the falling edge is defining the rising edge of $PWM_{B_k}$ (i.e. $PWM_{B_k}$ is referred to $Q_1$, $Q_3$ and $Q_5$ FETs considering FIG. 3).

Figure 24:
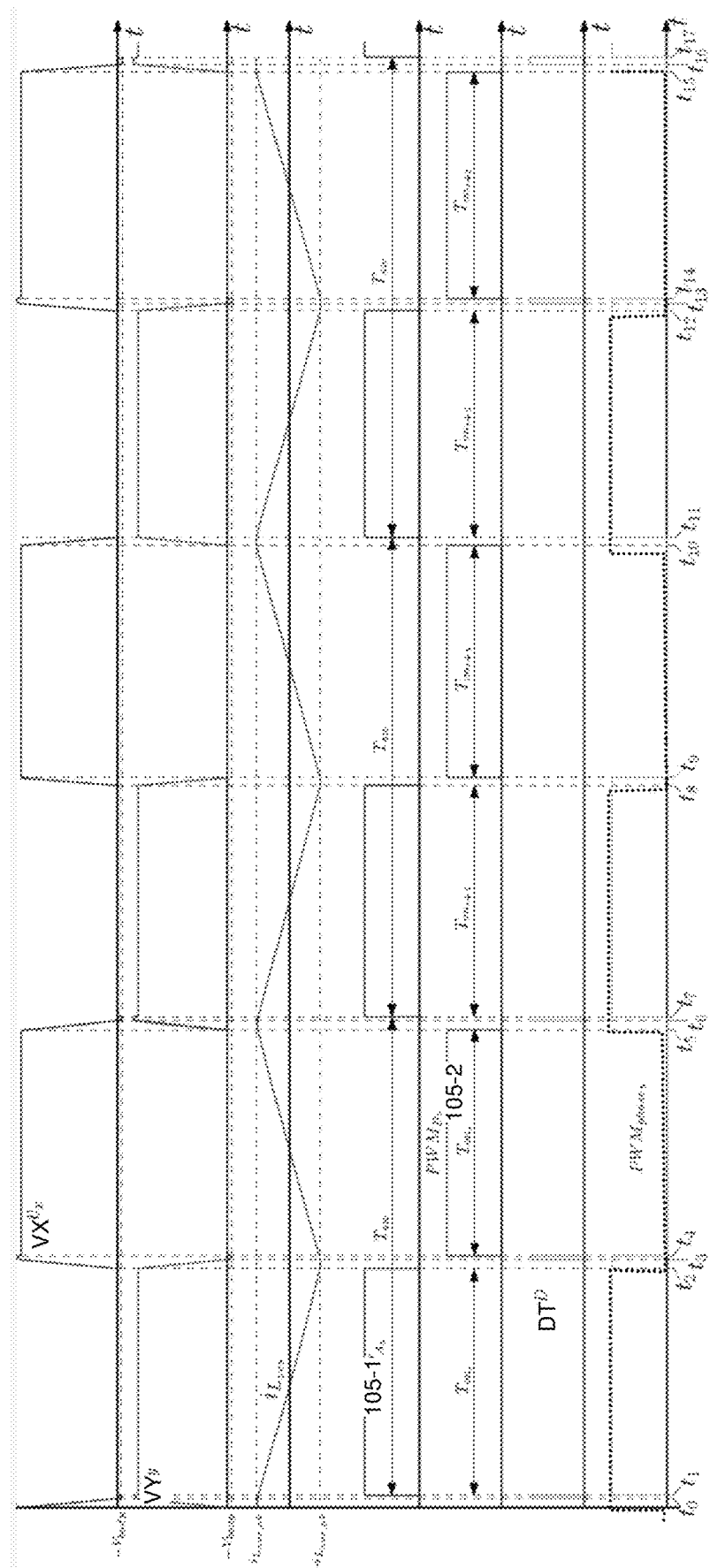
FIG. 24 is an example timing diagram according to embodiments herein.

FIG. 24 shows the main waveforms of monitoring the proposed converter in FIG. 3:

1. $t_0$-$t_1$: at t=$t_0$ all the switches are off and the parasitic capacitance of $Q_4$ is charged at $$\frac{V_{in}}{2} + V_{out}\frac{N_1}{N_2},$$

$Q_2$ is charged at the input voltage $V_{in}$, $Q_6$ is charged at $2V_{out}$, whilst the parasitic capacitance of $Q_1$, $Q_3$ and $Q_5$ are charged at zero. Between $t_0$-$t_1$ the body diode of all FETs are conducting increasing the losses, as shown in FIG. 24.

2. $t_1$-$t_2$: at t=$t_1$ switches $Q_1$, $Q_3$ and $Q_5$ are turned on in ZVS condition and the first resonant mode transition takes place between $C_{res1}$ and the leakage inductance of the multi-tapped autotransformer, whilst the second resonant mode transition takes place between $C_{res2}$ and the leakage inductance of the MTA. The duration of this mode is defined by $T_{on_i}$ as reported in FIG. 24.

3. $t_2$-$t_3$: at t=$t_2$ switches $Q_1$, $Q_3$ and $Q_5$ are turned off and the parasitic capacitance of $Q_1$ is charged to $$\frac{V_{in}}{2} + V_{out}\frac{N_1}{N_2},$$

$Q_3$ is charged to $2V_{out}$, $Q_5$ is charged at the input voltage $V_{in}$, whilst the parasitic capacitance of $Q_2$, $Q_4$ and $Q_6$ are discharged to zero. This condition is achieved at t=$t_3$ as reported in FIG. 24.

4. $t_3$-$t_4$: at t=$t_3$ all the switches are off and the parasitic capacitance of $Q_1$ is charged at $$\frac{V_{in}}{2} + V_{out}\frac{N_1}{N_2},$$

$Q_3$ is charged at $2V_{out}$, $Q_5$ is charged at the input voltage $V_{in}$, whilst the parasitic capacitance of $Q_2$, $Q_4$ and $Q_6$ are charged at zero. Between $t_3$-$t_4$ the body diode of all FETs are conducting, increasing the losses.

5. $t_4$-$t_5$: at t=$t_4$ switches $Q_2$, $Q_4$ and $Q_6$ are turned on with ZVS. After t=$t_4$ the resonant transition takes place between $C_{res1}$ and the leakage inductance of the multi-tapped autotransformer, whilst the second resonant mode transition takes place between $C_{res2}$ and the leakage inductance of the multi-tapped autotransformer. The duration of this mode is defined by $T_{on_i}$ as reported in FIG. 24.

6. $t_5$-$t_6$: at t=$t_5$ switches $Q_2$, $Q_4$ and $Q_6$ are turned off and the parasitic capacitance of $Q_4$ is charged to $$\frac{V_{in}}{2} + V_{out}\frac{N_1}{N_2},$$

$Q_2$ is charged at the input voltage $V_{in}$, $Q_6$ is charged to $2V_{out}$, whilst the parasitic capacitance of $Q_1$, $Q_3$ and $Q_5$ are discharged to zero. This condition is achieved at t=$t_6$ as reported in FIG. 24.

7. $t_6$-$t_7$: at t=$t_6$ all the switches are off and the parasitic capacitance of $Q_4$ is charged at $$\frac{V_{in}}{2} + V_{out}\frac{N_1}{N_2},$$

$Q_2$ is charged at the input voltage $V_{in}$, $Q_6$ is charged at $2V_{out}$, whilst the parasitic capacitance of $Q_1$, $Q_3$ and $Q_5$ are charged at zero volt. Between $t_6$-$t_7$ the body diode of all FETs is conducting increasing the losses and at t=$t_7$ the switching cycle is finished, as reported in FIG. 24.

Considering that the dead-time between $PWM_{A_k}$ and $PWM_{Bk}$ is equal for any cycle but actually is varying depending on the body diode conduction condition, it follows that $$DT_i = \frac{T_{sw} - 2T_{on_i}}{2}$$

and this value depends on the body diode conduction condition of the previous switching cycle $T_{on_{i-1}}$. Nevertheless, considering FIG. 24, in the previous switching cycle there is body diode conduction therefore $T_{on_i}=T_{i-1}+\Delta T$ (where $\Delta T$ is a fixed value time value i.e. 1 ns/2 ns/3 ns/ . . . /10 ns depending on the time resolution of the controller), in this scenario $DT_i=DT_{i-1}-\Delta T$. Modification to the 8. $t_7$-$t_8$: at t=$t_7$ switches $Q_1$, $Q_3$ and $Q_5$ are turned on in ZVS and the first resonant mode transition takes place between $C_{res1}$ and the leakage inductance of the multi-tapped autotransformer, whilst the second resonant mode transition takes place between $C_{res2}$ and the leakage inductance of the MTA. The duration of this mode is defined by $T_{on_{i+1}}=T_{on_i}+\Delta T$, because during the previous switching cycle the body diode conduction event took place, as reported in FIG. 24.

9. $t_8$-$t_9$: at $t=t_8$ switches $Q_1$, $Q_3$ and $Q_5$ are turned off and the parasitic capacitance of $Q_1$ is charged to $$\frac{V_{in}}{2}+V_{out}\frac{N_1}{N_2},$$

$Q_3$ is charged to $2V_{out}$, $Q_5$ is charged at the input voltage $V_{in}$, whilst the parasitic capacitance of $Q_2$, $Q_4$ and $Q_6$ are discharged to zero. This condition is achieved at $t=t_9$, and the duration of this phase is $DT_{i+1}=DT_i-\Delta T$, as reported in FIG. 24.

10. $t_9$-$t_{10}$: at $t=t_9$ switches $Q_2$, $Q_4$ and $Q_6$ are turned on with ZVS. After $t=t_9$ the resonant transition takes place between $C_{res1}$ and the leakage inductance of the multi-tapped autotransformer, whilst the second resonant mode transition takes place between $C_{res2}$ and the leakage inductance of the multi-tapped autotransformer. The duration of this mode is defined by $T_{on_{i+1}}=T_{on_i}+\Delta T$, because during the previous switching cycle the body diode conduction event took place, as reported in FIG. 24.

11. $t_{10}$-$t_{11}$: at $t=t_{10}$ switches $Q_2$, $Q_4$ and $Q_6$ are turned off and the parasitic capacitance of $Q_4$ is charged to $$\frac{V_{in}}{2}+V_{out}\frac{N_1}{N_2},$$

$Q_2$ is charged at the input voltage $V_{in}$, $Q_6$ is charged to $2V_{out}$, whilst the parasitic capacitance of $Q_1$, $Q_3$ and $Q_5$ are discharged to zero. This condition is achieved at $t=t_{11}$, and the duration of this phase is $DT_{i+1}=DT_i-\Delta T$, as reported in FIG. 24.

Is important to notice that during the dead time operation between $t_8$-$t_9$ and $t_{10}$-$t_{11}$ there is not a body diode conduction. Therefore an optimal condition is here achieved. However, the control system does not fix its operating condition at the timing condition achieved within the switching cycle concluded at $t=t_{11}$, but actually presents a jittering behaviour around the optimal running condition, moreover, possible perturbation can happen (i.e. temperature variation and output current variation or drift due to aging components).

12. $t_{11}$-$t_{12}$: at $t=t_{11}$ switches $Q_1$, $Q_3$ and $Q_5$ are turned on in ZVS and the first resonant mode transition takes place between $C_{res1}$ and the leakage inductance of the multi-tapped autotransformer, whilst the second resonant mode transition takes place between $C_{res2}$ and the leakage inductance of the MTA. The duration of this mode is defined by $T_{on_{i+2}}=T_{on_{i+1}}-\Delta T$, because during the previous switching cycle the body diode conduction event did not take place, and therefore the dead-time duration $DT_{i+2}=DT_{i+1}+\Delta T$ as reported in FIG. 24. At $t=t_{11}$ the switching cycle is concluded.

13. $t_{12}$-$t_{13}$: at $t=t_{12}$ switches $Q_1$, $Q_3$ and $Q_5$ are turned off and the parasitic capacitance of $Q_1$ is charged to $$\frac{V_{in}}{2}+V_{out}\frac{N_1}{N_2},$$

$Q_3$ is charged to $2V_{out}$, $Q_5$ is charged at the input voltage $V_{in}$, whilst the parasitic capacitance of $Q_2$, $Q_4$ and $Q_6$ are discharged to zero. This condition is achieved at $t=t_{13}$ as reported in FIG. 24.

14. $t_{13}$-$t_{14}$: at $t=t_{13}$ all the switches are off and the parasitic capacitance of $Q_1$ is charged at $$\frac{V_{in}}{2}+V_{out}\frac{N_1}{N_2},$$

$Q_3$ is charged at $2V_{out}$, $Q_5$ is charged at the input voltage $V_{in}$, whilst the parasitic capacitance of $Q_2$, $Q_4$ and $Q_6$ are charged at zero. Between $t_{13}$-$t_{14}$ the body diode of all FETs are conducting increasing the losses.

The duration of the phase between $t_{12}$-$t_{14}$ is $DT_{i+2}=DT_{i+1}+\Delta T$.

15. $t_{14}$-$t_{15}$: at $t=t_{14}$ switches $Q_2$, $Q_4$ and $Q_6$ are turned on with ZVS. After $t=t_{14}$ the resonant transition takes place between $C_{res1}$ and the leakage inductance of the multi-tapped autotransformer, whilst the second resonant mode transition takes place between $C_{res2}$ and the leakage inductance of the multi-tapped autotransformer. The duration of this mode is defined by $T_{on_{i+2}}=T_{on_{i+1}}-\Delta T$, because during the previous switching cycle the body diode conduction event did not take place, as reported in FIG. 24.

16. $t_{15}$-$t_{16}$: at $t=t_{15}$ switches $Q_7$, $Q_4$ and $Q_6$ are turned off and the parasitic capacitance of $Q_4$ is charged to $$\frac{V_{in}}{2}+V_{out}\frac{N_1}{N_2},$$

$Q_2$ is charged at the input voltage $V_{in}$, $Q_6$ is charged to $2V_{out}$, whilst the parasitic capacitance of $Q_1$, $Q_3$ and $Q_5$ are discharged to zero. This condition is achieved at $t=t_{16}$, as reported in FIG. 24.

17. $t_{16}$-$t_{17}$: at $t=t_{16}$ all the switches are off and the parasitic capacitance of $Q_4$ is charged at $$\frac{V_{in}}{2}+V_{out}\frac{N_1}{N_2},$$

$Q_2$ is charged at the input voltage $V_{in}$, $Q_6$ is charged at $2V_{out}$, whilst the parasitic capacitance of $Q_1$, $Q_3$ and $Q_5$ are charged at zero volt. Between $t_{16}$-$t_{17}$ the body diode of all FETs are conducting increasing the losses and at $t=t_{17}$ the switching cycle is finished, as reported in FIG. 24.

The operation of the example power converter 112 as shown in FIG. 24 is an example considering one cell of HSC-CM. Such an approach can be extended to M HSC-CM placed in parallel identified by the index k. That is, each of the different power converters in FIG. 17 is monitored in a similar manner to control dead times of operating the corresponding switched-capacitor converter therein.

Figure 25:
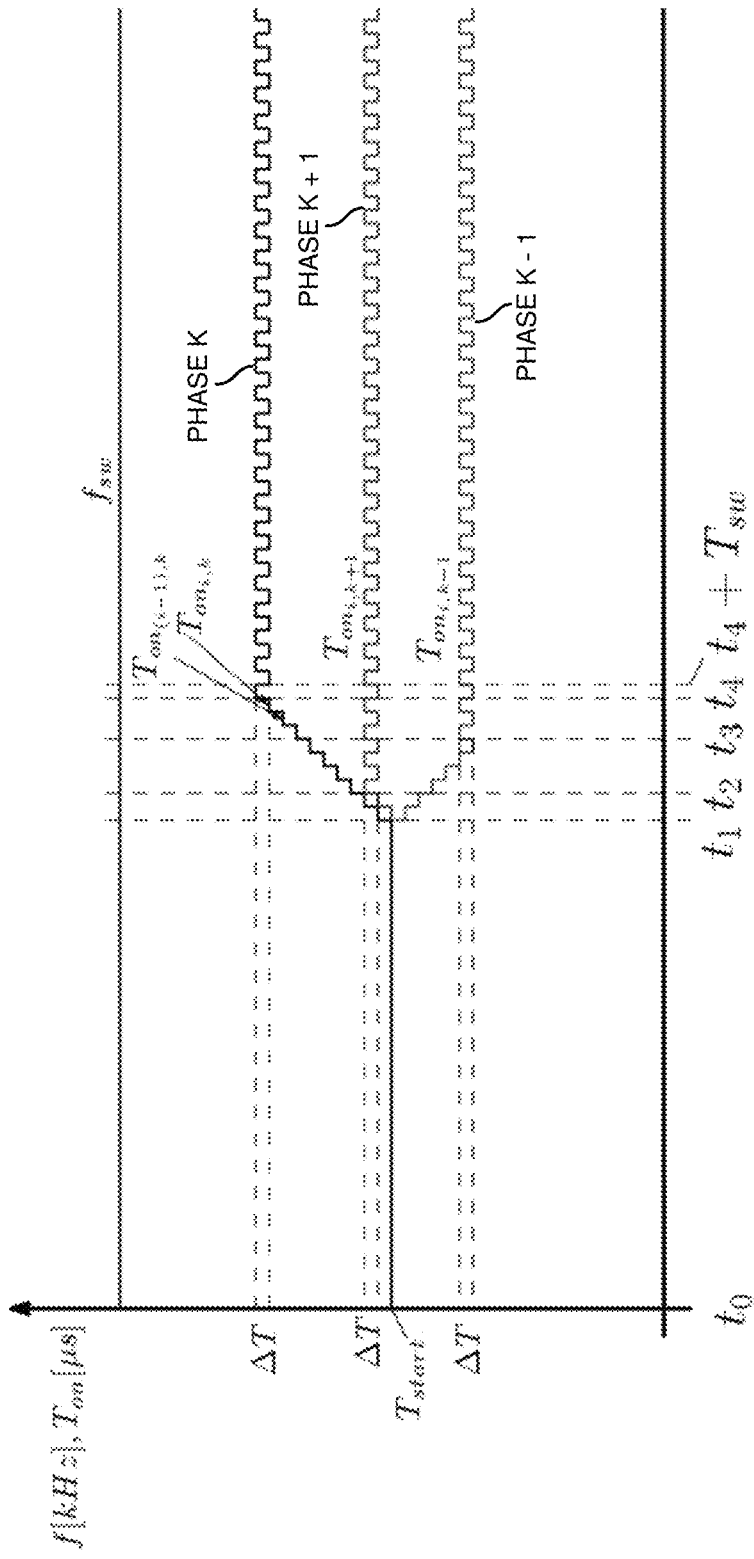
FIG. 25 is an example timing diagram illustrating control of conduction losses according to embodiments herein.

FIG. 25 shows an example operation from an enabling signal at start-up at $t=t_0$ to a steady state condition achieved for all cells after $t=t_4$ (the time scale of FIG. 20 is not the same as the time scale reference in FIG. 19). All subintervals are described as follows:

1. $t_0$-$t_1$: at t=$t_0$ the start-up of the circuit takes place (i.e. with an external Hot swap circuit or from the regulated IBC which actually has its start-up routine, in such scenario the start-up enable signal of IBC is the same for HSC-CM). From FIG. 25 it follows also that the switching frequency is constant for all switched-capacitor converters. It is therefore considered as design parameter. Moreover all the phases are started up with the same $T_{on}$=$T_{start}$ defined by design. At t=$t_1$ the start-up is completed (i.e. the converter has reach its nominal operating condition $$V_{out} = \frac{V_{in}}{n} - V_{tol},$$

where n is the convertion ratio of HSC-CM and $V_{tol}$ is a voltage tollerance fixed by design (i.e. 50 mV).

2. $t_1$-$t_2$: at t=$t_1$ the algorithm shown in FIG. 24 for each cell starts to operate. Phase k (phase k rapresents the example reported in FIG. 24) may e.g. present body diode conduction in their FETs as detected by the monitor resource 2340; therefore at t=$t_1$+$T_{sw}$ the on-time of phase k is increased. Also for phase k+1 the body diode may conduct. However, since phase k−1 does not present body diode conduction as detected by a respective monitor resource 2340 (might be in hard-switching), the on-time is reduced by ΔT. At t=$t_2$ phase k+1 reaches its steady state condition (jittering around body-diode and non body-diode conduction).

3. $t_2$-$t_3$: phase k+1 is jittering around the optimal condition point (can be perturbed any time) and a t=$t_3$ phase k−1 reaches its steady state condition.

4. $t_3$-$t_4$: phase k+1 and phase k−1 are jittering around their optimal condition point and at t=$t_4$ phase k reaches its steady state condition.

5. From t=$t_4$: all the phases presented in FIG. 25 are jittering around their optimal point, basically around body diode and non body-diode conuction as detected by the respective monitor resource 2340. In such condition the body diode conduction losses are almost zero since ΔT is mainly the resolution time of the controller (i.e. 2 ns, 5 ns, 10 ns ecc).

Thus, embodiments herein include monitoring each of multiple power converters 112-1, 112-2, 112-3, etc., operating in parallel to generate the output voltage 123. As previously discussed, the monitor resource 2340 monitors conduction conditions associated with each of the corresponding switched-capacitor converters and controls same (increases and decreases the dead time in each successive cycle of controlling the respective power converter switched-capacitor converter) as shown in FIGS. 24 and 25 based on feedback of monitoring same. For example, repeatedly adjusting the individual dead time settings associated with switching of the corresponding switches between conditions of body diode conduction and non-body diode conduction over different control cycles ensures that conduction losses for each of the parallel switched-capacitor converters in FIG. 17 is virtually zero.

HSC-CM as High Density Unregulated Current Multiplier to Supply Core Voltage Rails Using ZVS Tapped Hybrid SCC As previously reported the bandwidth of the system depends also on the Power Delivery Network from HSC-CM to the digital load, as shown in FIG. 22, therefore a reduction of the size of converter improves already the overall efficiency and transient capability, compared with a classic solution. ZVS Tapped Hybrid SCC is a valid candidate to operate as HSC-CM since it can reach high power density. In fact, in ZVS Tapped Hybrid SCC, as in any Hybrid Switched Capacitor converter, the core size is defined by the output voltage, thus, low voltage operation are enabling extremely high power density. Moreover, the core flux density is not load current dependent, therefore by reducing the current density in the windings and increasing the FETs number it is possible to achieve high power density maintaining high performance. Moreover, soft-switching operation are ensuring low radiated EMI noise.

Multi-Tapped Autotransformer Implementation in HSC-CM

In the realization of a Multi Tapped Autotransformer (magnetic device 160), the multiple tap nodes provide magnetic and electric coupling from input and output windings which are connected to the switching capacitor cells and the output capacitor of HSC-CM. As already reported, the magnetizing inductance and the leakage of the MTA respectively ensure ZVS operation for all FETs and soft-charging of the switching capacitor cells.

Magnetizing inductance and the leakage of the multi-tapped autotransformer can be independently controlled during the design or/and manufacture of the multi-tapped autotransformer. By controlling the equivalent area of the core Ae, and also by controlling the equivalent permeability of the core (i.e. having an air gap in the core or using low permeability material), for such applications which require a given $N_1$ turns and $N_2$ turns, embodiments herein enable to modulate the magnetizing inductance of the multi-tapped autotransformer. In FIG. 10, we report a multi-tapped autotransformer construction scheme. Embodiments herein include various options how to connect the nodes of the magnetic device 160, referring to the converter depicted in example FIG. 3, as follows:

Case a: node a is connected to $in_1$, b and c are shorted internally or externally in the multi-tapped autotransformer to reduce the overall copper losses and are then connected to $ph_1$ minimizing the high current path (such as in FIG. 6, high RMS current path clockwise through the combination of switch Q3, winding 162-1, and load 118). (Then d and e are shorted together internally or externally and are both connected to corn node in FIG. 10. f and g are shorted internally or externally and connected to $ph_2$ minimizing the high current path reported in FIG. 6 as previously discussed. Node h is connected to $in_2$.

Case b: node a is connected to $in_2$, b and c are shorted internally or externally in the multi-tapped autotransformer to reduce the overall copper losses and are then connected to $ph_2$ minimizing the high current path (such as in FIG. 8, high RMS current path counter clockwise through the combination of switch Q6, winding 162-2, and load 118) Then d and e are shorted together internally or externally and are both connected to corn node shown in FIG. 3. f and g are shorted internally or externally and connected to $ph_1$ minimizing the high current path reported in FIG. 8 as previously discussed. Node a is connected to $in_1$.

Generally the proposed ZVS Tapped Hybrid SCC acting as HSC-CM is providing low voltage core rails to supply digital load. In this scenario the equivalent cross-section $A_e$ needed is proportional to the actual output voltage and the duration of the switching cycle. In such a scenario, since low voltage and high frequency operation are needed, the overall system can be implemented in a small core volume reducing both core losses and copper losses. Moreover, due to the electric coupling, besides the magnetic coupling, from input and output windings the proposed MTA in HSC-CM can reduce the overall winding losses by selecting the optimal windings and core structure.

Figure 26:
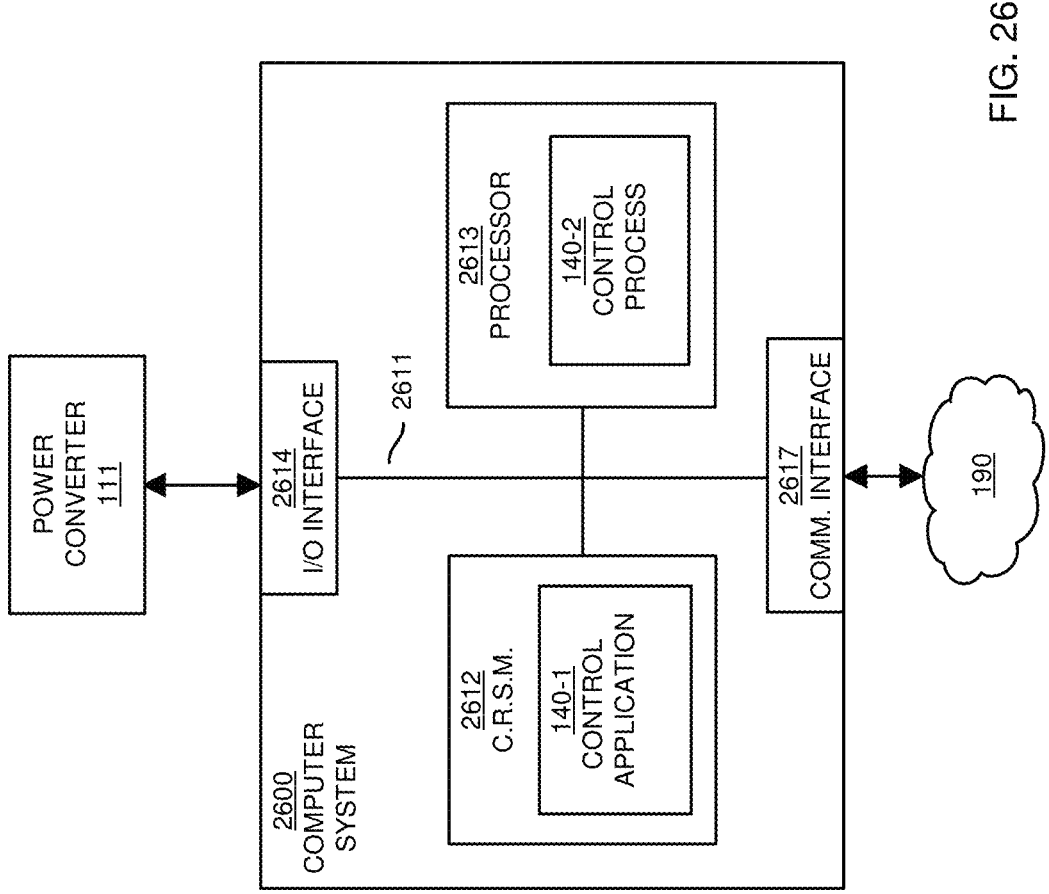
FIG. 26 is an example diagram illustrating computer architecture operable to execute one or more operations according to embodiments herein.

FIG. 26 is an example block diagram of a computer system for implementing any of the operations as previously discussed according to embodiments herein.

Any of the resources (such as controller 140, controller 141, etc.) as discussed herein can be configured to include computer processor hardware and/or corresponding executable instructions to carry out the different operations as discussed herein.

As shown, computer system 2650 of the present example includes an interconnect 2611 that couples computer readable storage media 2612 such as a non-transitory type of media (which can be any suitable type of hardware storage medium in which digital information can be stored and retrieved), a processor 2613 (computer processor hardware), I/O interface 2614, and a communications interface 2617.

I/O interface(s) 2614 supports connectivity to repository 2680 and input resource 2692.

Computer readable storage medium 2612 can be any hardware storage device such as memory, optical storage, hard drive, floppy disk, etc. In one embodiment, the computer readable storage medium 2612 stores instructions and/or data.

As shown, computer readable storage media 2612 can be encoded with controller application 140-1 (e.g., including instructions) to carry out any of the operations as discussed herein.

During operation of one embodiment, processor 2613 accesses computer readable storage media 2612 via the use of interconnect 2611 in order to launch, run, execute, interpret or otherwise perform the instructions in controller application 140-1 stored on computer readable storage medium 2612. Execution of the controller application 140-1 produces controller process 140-2 to carry out any of the operations and/or processes as discussed herein.

Those skilled in the art will understand that the computer system 2650 can include other processes and/or software and hardware components, such as an operating system that controls allocation and use of hardware resources to execute controller application 140-1.

In accordance with different embodiments, note that computer system may reside in any of various types of devices, including, but not limited to, a power supply, switched-capacitor converter, power converter, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 2650 may reside at any location or can be included in any suitable resource in any network environment to implement functionality as discussed herein.

Functionality supported by the different resources will now be discussed via flowchart in FIG. 27. Note that the steps in the flowcharts below can be executed in any suitable order.

Figure 27:
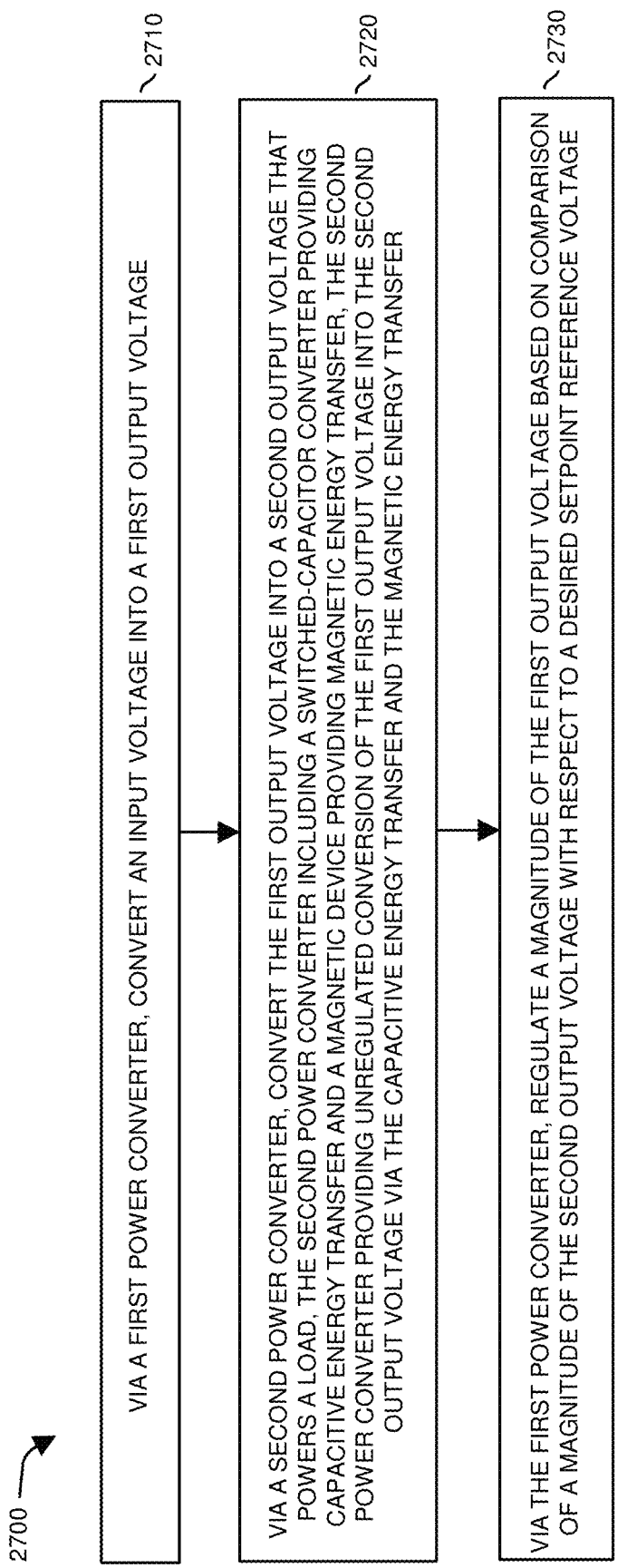
FIG. 27 is an example diagram illustrating a general method according to embodiments herein.

FIG. 27 is a flowchart 2700 illustrating an example method according to embodiments herein. Note that there will be some overlap with respect to concepts as discussed above.

In processing operation 2710, the first power converter 111 converts an input voltage 120 into a first output voltage 121.

In processing operation 2720, the second power converter 112 converts the first output voltage 121 into a second output voltage 123 that powers a load 118. As previously discussed, the second power converter 112 includes a switched-capacitor converter 131 providing capacitive energy transfer and a magnetic device 160 providing magnetic energy transfer. The second power converter 112 provides regulated or unregulated conversion of the first output voltage 121 into the second output voltage 123 via the capacitive energy transfer and the magnetic energy transfer.

In processing operation 2730, the first power converter 112 regulates a magnitude of the first output voltage 121 based on comparison of a magnitude of the second output voltage 123 with respect to a desired setpoint reference voltage 103.

Figure 28:
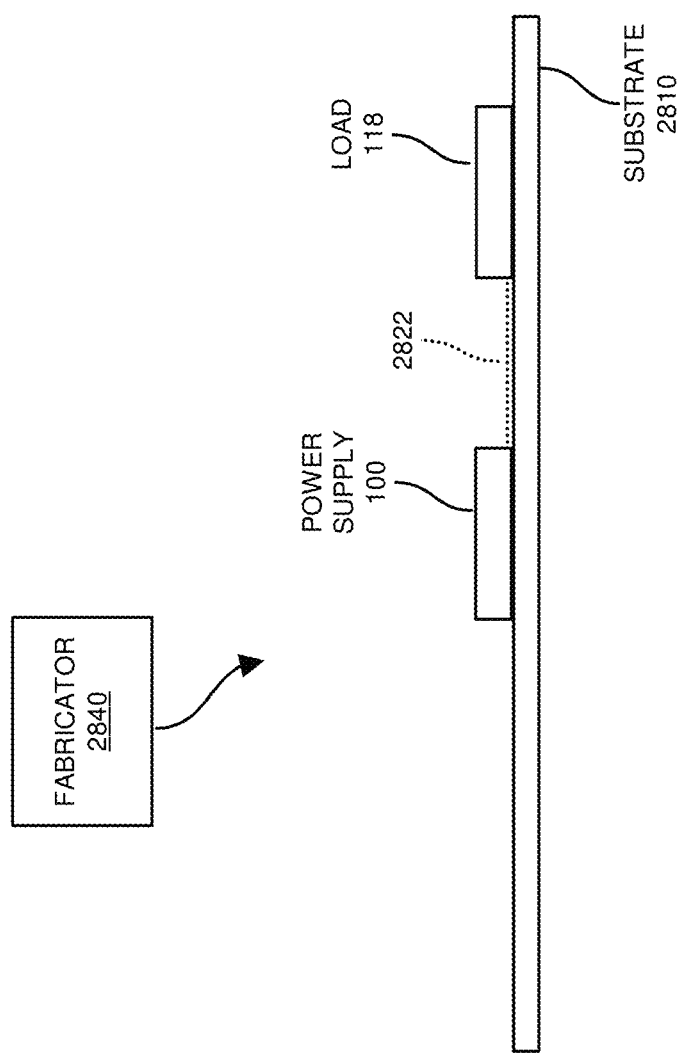
FIG. 28 is an example diagram illustrating fabrication of a power supply on a circuit board according to embodiments herein.

FIG. 28 is an example diagram illustrating fabrication of a power converter circuit on a circuit board according to embodiments herein.

In this example embodiment, fabricator 2840 receives a substrate 2810 (such as a circuit board).

The fabricator 2840 further affixes the power supply 100 (and corresponding components as previously discussed) to the substrate 2810. Via circuit paths 2822 (such as one or more traces, etc.), the fabricator 2840 couples the power supply 100 to load 118. In one embodiment, the circuit paths 2821 convey the output voltage 123 to the load 118.

Accordingly, embodiments herein include a system comprising: a substrate 2810 (such as a circuit board, standalone board, mother board, standalone board destined to be coupled to a mother board, etc.); a power supply 100 including corresponding components (such as power converter 111, power converter 112, controller 140, controller 141, etc. as described herein; and a load 118. As previously discussed, the load 118 is powered based on conveyance of output voltage 123 over one or more circuit paths 2822 from the power supply 100 to the load 118.

Note that further embodiments herein include a system (as shown in FIG. 28) comprising: the circuit substrate 2810 and the load 118 disposed on the substrate 2810. The power supply 100 (apparatus) is affixed to the circuit substrate 2810 and powers the load 118 via the output voltage 123 (such as via one or more circuit paths 2822).

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 2810 or disposed at a remote location.

Note again that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a first power converter operative to convert an input voltage into a first output voltage;
a second power converter operative to convert the first output voltage into a second output voltage that powers a load, the second power converter including a switched-capacitor converter providing capacitive energy transfer and a magnetic device providing magnetic energy transfer, the second power converter providing unregulated conversion of the first output voltage into the second output voltage via the capacitive energy transfer and the magnetic energy transfer; and
the first power converter operative to regulate a magnitude of the first output voltage based on comparison of a magnitude of the second output voltage with respect to a desired setpoint reference voltage;
wherein the magnetic device is a transformer including a first transformer winding magnetically coupled to a second transformer winding;
wherein the switched-capacitor converter includes a first switch, a second switch, and a third switch disposed in series between a first node of the second power converter receiving the first output voltage and a reference voltage node;
wherein the switched-capacitor converter includes a fourth switch, a fifth switch, and a sixth switch disposed in series between the first node of the second power converter receiving the first output voltage and the reference voltage node;
wherein the second power converter includes a second node operative to output the second output voltage;
wherein the second switch is coupled to the third switch via a third node, the first transformer winding connected between the third node and the second node;
wherein the fifth switch is coupled to the sixth switch via a fourth node, the second transformer winding connected between the fourth node and the second node;
wherein the transformer further includes a third transformer winding and a fourth transformer winding;
wherein each of the first transformer winding, the second transformer winding, the third transformer winding, and the fourth transformer winding are magnetically coupled to each other;
wherein the first switch is coupled to the second switch via a fifth node;
wherein the fourth switch is coupled to the fifth switch via a sixth node;
wherein the third transformer winding is disposed in a first series circuit path between the fifth node and the fourth node; and
wherein the fourth transformer winding is disposed in a second series circuit path between the third node and the sixth node.

2. The apparatus as in claim 1, wherein the switched-capacitor converter receives the first output voltage and the magnetic device outputs the second output voltage.

3. The apparatus as in claim 1, wherein the second power converter is a non-isolated power converter.

4. The apparatus as in claim 1, wherein the switched-capacitor converter and the magnetic device transfer energy in time intervals of equal duration.

5. The apparatus as in claim 1, wherein the second power converter provides conveyance of respective energy from the received first output voltage to the second output voltage in each switching control cycle of operating the second power converter.

6. The apparatus as in claim 1, wherein the second power converter includes a first switched-capacitor converter and a second switched-capacitor converter connected in parallel, each of the first switched-capacitor converter and the second switched-capacitor converter operative to convert the first output voltage into the second output voltage.

7. The apparatus as in claim 1, wherein switches in the switched-capacitor converter are operated in a zero voltage switching mode via energy provided by the magnetic device.

8. The apparatus as in claim 1, wherein the load is powered in each powering cycle by the capacitive energy transfer and the magnetic energy transfer, reducing overall conduction losses in passive and active components of the second power converter.

9. The apparatus as in claim 1, wherein a size of a magnetic core associated with the magnetic device does not depend on current ratings but instead on the second output voltage.

10. The apparatus as in claim 1, wherein the switched-capacitor converter includes a resonant circuit path; and
wherein operation of the resonant circuit path near its resonant frequency reduces a reactive impedance of the switched-capacitor converter in which the switched-capacitor converter becomes resistive.

11. The apparatus as in claim 1, wherein first power converter is operative to regulate conversion of the input voltage into the first output voltage based at least in part on an amount of current supplied by the second output voltage to the load.

12. The apparatus as in claim 1, wherein the first power converter provides regulated conversion of the input voltage into the first output voltage without receiving the first output voltage as feedback to control generation of the first output voltage.

13. The apparatus as in claim 1, wherein the switched-capacitor converter includes a first resonant circuit path and a second resonant circuit path coupled to the magnetic device; and
wherein the magnetic device is a multi-tapped autotransformer including the first transformer winding and the second transformer winding, the first resonant circuit path including the first transformer winding, the second resonant circuit path including the second transformer winding.

14. The apparatus as in claim 1, further comprising:
an inductor device disposed between the third node and the fourth node.

15. A method comprising:
via a first power converter, converting an input voltage into a first output voltage;
via a second power converter, converting the first output voltage into a second output voltage that powers a load, the second power converter including a switched-capacitor converter providing capacitive energy transfer and a magnetic device providing magnetic energy transfer, the second power converter providing conversion of the first output voltage into the second output voltage via the capacitive energy transfer and the magnetic energy transfer; and
via the first power converter, regulating a magnitude of the first output voltage based on comparison of a magnitude of the second output voltage with respect to a desired setpoint reference voltage;

wherein the magnetic device is a transformer including a first transformer winding magnetically coupled to a second transformer winding;

wherein the switched-capacitor converter includes a first switch, a second switch, and a third switch disposed in series between a first node of the second power converter receiving the first output voltage and a reference voltage node;

wherein the switched-capacitor converter includes a fourth switch, a fifth switch, and a sixth switch disposed in series between the first node of the second power converter receiving the first output voltage and the reference voltage node;

wherein the second power converter includes a second node operative to output the second output voltage;

wherein the second switch is coupled to the third switch via a third node, the first transformer winding connected between the third node and the second node;

wherein the fifth switch is coupled to the sixth switch via a fourth node, the second transformer winding connected between the fourth node and the second node;

wherein the transformer further includes a third transformer winding and a fourth transformer winding;

wherein each of the first transformer winding, the second transformer winding, the third transformer winding, and the fourth transformer winding are magnetically coupled to each other;

wherein the first switch is coupled to the second switch via a fifth node;

wherein the fourth switch is coupled to the fifth switch via a sixth node;

wherein the third transformer winding is disposed in a first series circuit path between the fifth node and the fourth node; and wherein the fourth transformer winding is disposed in a second series circuit path between the third node and the sixth node.

16. The method as in claim 15 further comprising:

via the switched-capacitor converter, receiving the first output voltage; and via the magnetic device, outputting the second output voltage.

17. The method as in claim 16, wherein the switched-capacitor converter stage includes multiple switched capacitor cells; and wherein the magnetic device is electrically coupled to switching elements associated with the multiple switched capacitor cells, the method further comprising:

operating a combination of the magnetic device and the multiple switched capacitor cells in a resonant circuit mode to convert the first output voltage into the second output voltage.

* * * * *